United States Patent [19]
Nodar

[11] Patent Number: 5,894,772
[45] Date of Patent: Apr. 20, 1999

[54] PORTABLE PIPE MACHINING TOOL

[76] Inventor: Felix Nodar, 430 Linden Ave., Westfield, N.J. 07090

[21] Appl. No.: 08/800,953

[22] Filed: Feb. 18, 1997

[51] Int. Cl.$^6$ .................. B23B 3/22; B23B 5/04
[52] U.S. Cl. ............................................. 82/113
[58] Field of Search .................. 82/1.11, 47, 53, 82/53.1, 59, 70.2, 72, 83, 113

[56] References Cited

U.S. PATENT DOCUMENTS

| | | | |
|---|---|---|---|
| 4,411,178 | 10/1983 | Wachs et al. | 82/4 C |
| 4,624,052 | 11/1986 | Garcia et al. | 82/113 |
| 4,677,884 | 7/1987 | Kwech et al. | 82/4 C |
| 4,770,074 | 9/1988 | Kwech | 82/113 |
| 4,813,314 | 3/1989 | Kwech | 82/113 |
| 5,020,401 | 6/1991 | Jiles | 82/113 |
| 5,054,342 | 10/1991 | Swiatowy et al. | 82/113 |
| 5,261,301 | 11/1993 | Babb et al. | 82/86 |
| 5,304,018 | 4/1994 | La Vanchy et al. | 408/1 R |
| 5,549,024 | 8/1996 | Ricci | 82/113 |

Primary Examiner—Andrea L. Pitts
Assistant Examiner—Toan Le
Attorney, Agent, or Firm—Richard L. Miller, P. E.

[57] ABSTRACT

A portable pipe machining tool that selectively simultaneously cuts a pipe and scrapes and finishes a longitudinal outer surface of the pipe. The portable pipe machining tool includes a fixed frame, a rotatable frame, a parting tool assembly that is selectively engagable and disengagable, and when engaged, has a portion thereof moving radially inwardly through the rotatable frame and progressively cutting into an adjacent portion of the pipe as the rotatable frame rotates relative to the fixed frame until the pipe has been cut, and a scrapping and finishing tool assembly that is selectively engagable and disengagable, and when engaged, has a portion thereof moving longitudinally through the rotatable frame and longitudinally along the longitudinal outer surface of the adjacent portion of the pipe and scraping and finishing the longitudinal outer surface of the adjacent portion of the pipe as the rotatable frame rotates relative to the fixed frame so as to facilitate the bonding of the pipe, and is selectively simultaneously operable with the parting tool assembly if so desired, so as to cut, scrape, and finish the adjacent portion of the pipe simultaneously as the rotatable frame rotates relative to the fixed frame.

156 Claims, 7 Drawing Sheets

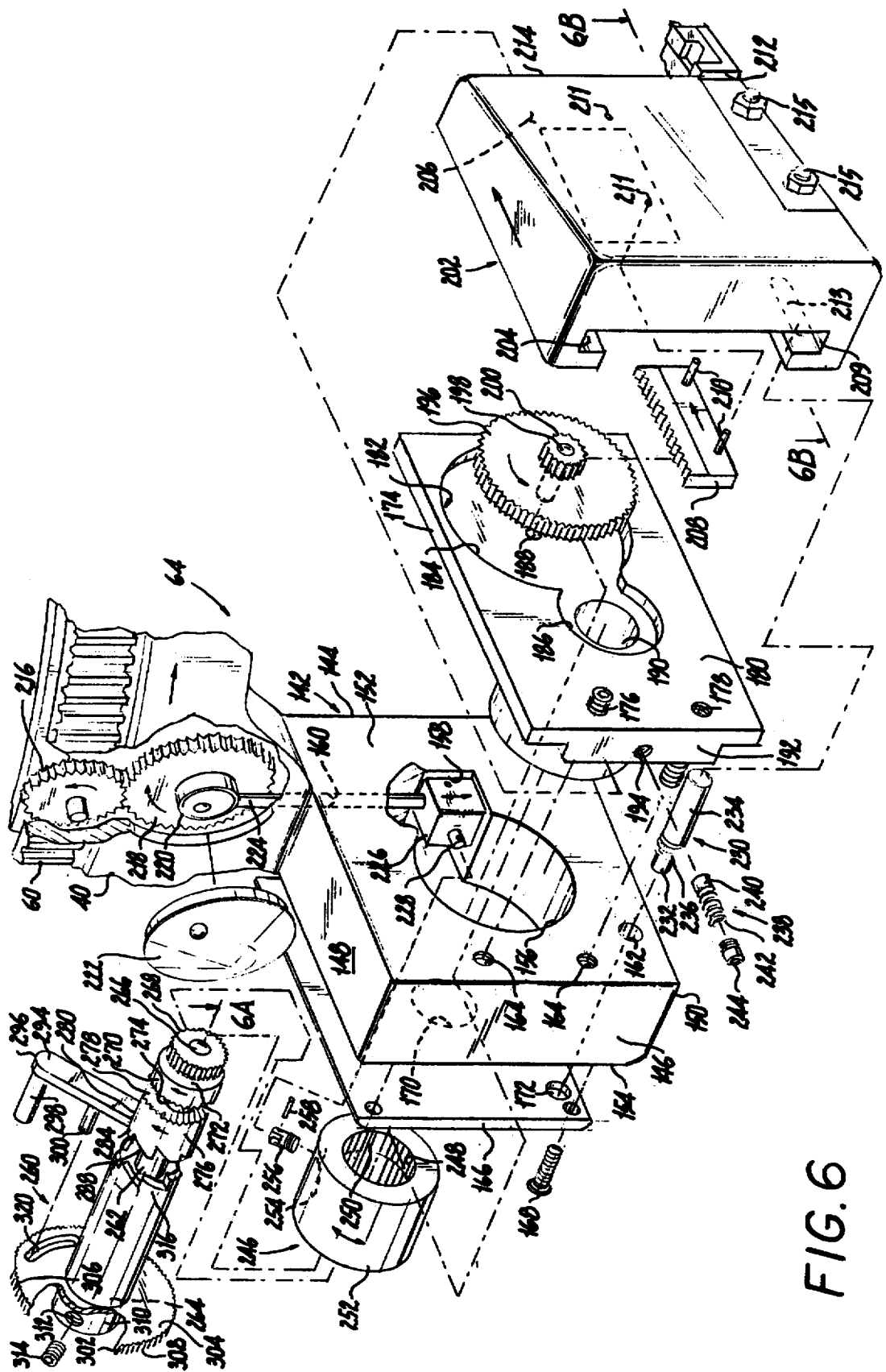

PORTABLE PIPE MACHINING TOOL

BACKGROUND OF THE INVENTION

The present invention relates to a pipe machining tool. More particularly, the present invention relates to a portable pipe machining tool that selectively simultaneously cuts a pipe and scrapes and finishes a longitudinal outer surface of the pipe that has a pair of ends so as to facilitate bonding of the pipe wherein the portable pipe machining tool is supported only by the pipe it is machining and access to the pair of ends of the pipe is not required. The portable pipe machining tool includes a fixed cylindrically-shaped frame that is fixedly attachable to a portion of the pipe, a rotatable cylindrically-shaped frame that is rotatively connected to the fixed cylindrically-shaped frame and is rotatably attachable to an adjacent portion of the pipe, a parting tool assembly that extends radially along the rotatable cylindrically-shaped frame and is selectively engagable and disengagable, and when engaged has a portion thereof moving radially inwardly through the rotatable cylindrically-shaped frame and progressively cutting into the adjacent portion of the pipe as the rotatable cylindrically-shaped frame rotates relative to the fixed cylindrically-shaped frame until the pipe has been cut, and a scrapping and finishing tool assembly that extends radially along the rotatable cylindrically-shaped frame, diametrically opposing the parting tool assembly, and is selectively engagable and disengagable, and when engaged has a portion thereof moving longitudinally through the rotatable cylindrically-shaped frame and longitudinally along the longitudinal outer surface of the adjacent portion of the pipe and scraping and finishing the longitudinal outer surface of the adjacent portion of the pipe as the rotatable cylindrically-shaped frame rotates relative to the fixed cylindrically-shaped frame so as to facilitate the bonding of the pipe, and is selectively simultaneously operable with the parting tool assembly if so desired, so as to cut, scrape, and finish the adjacent portion of the pipe simultaneously as the rotatable cylindrically-shaped frame rotates relative to the fixed cylindrically-shaped frame.

The days of cast-iron pipe have passed in fluid distribution systems for utilities, such as heating gas distributors. Today, plastic pipes are universally used. They are cheaper, lighter, can be joined by simple heating techniques, and deteriorate at a much slower pace than metal pipes.

In the repair and replacement of equipment associated with plastic pipe lines, it is frequently necessary to cut the pipe and thereafter, prepare the end of the pipe, with the pipe end preparating operations involving one or more of facing, turning, profiling, threading, or beveling. Equipment has existed for cutting the pipe and performing other operations on the pipe, such as beveling the end preparatory to making a weld connection to the pipe end.

Motor driven pipe cutting machines are known and generally include a base or fame structure having rollers which support a pipe to be cut and a motor driven cutting wheel mounted on the frame for displacement into engagement with the pipe to cut the same.

Use in the field of motor driven pipe cutters heretofore available is difficult as a result of the structural complexity and unitary construction of the pipe cutters. More particularly in this respect, the pipe cutter has to be transported to the point of use, such as in a truck, and then removed from the truck and setup on the ground or other underlying support surface for operation.

The size and weight of the pipe cutter can make the loading and unloading thereof relative to the transport vehicle physically difficult for the workman and require the use of special loading and unloading elevators or hoists as well as wheeled dollies or the like to facilitate ground transportation of the pipe cutter to the specific point of use.

In some pipe cutters, displacement of the cutting wheel is achieved by a hand operated lever which affords control of the cutting force by the operator, but such hand operation is physically fatiguing, whereby optimum force and cutting speed is likely to progressively decrease in connection with continuous use of the cutter by the operator.

Another disadvantage of prior pipe cutting machines resides in the difficulty in obtaining a quality cut and maintaining quality from one cut to another. In this respect, a quality cut requires that the axis of the pipe by maintained parallel to the axis of the cutting blade, so that the cut is in a plane transverse to the pipe axis.

Generally, the pipe to be cut is supported on rollers beneath the cutting blade and on an adjustable support spaced from the cutting machine. The latter support is adjusted laterally in an effort to align the pipe and cutting wheel axis, but the desired parallel relationship therebetween is extremely difficult to obtain and/or maintain from one cut to another. Any misalignment with respect to desired parallel relationship between the pipe and cutting wheel axis reduces the quality of the cut obtained, whereby considerable time and effort are spent to initially make the necessary adjustments of the adjustable support to assure as accurate alignment as possible, and frequent checking of the alignment is necessary in an effort to maintain the best possible alignment.

The use of portable end prep lathe, either in the field or in a shop, for performing a variety of machining operations on a pipe is well known in the art.

The end prep lathe is mounted concentrically with the pipe by means of a mast having a chuck or mandrel which is positioned within the pipe and is adjusted to lock into the pipe, with the mast extending outwardly therefrom and mounting a frame or housing and a rotatable tool head. The tool head is rotatable by means of a motor, such as a hydraulic or air motor.

In one type of machine, the advance of the tooling on the tool head towards the pipe as well as the axial movement of the frame and the tool head axially of the pipe, determines the angle of the bevel cut on the pipe. Without axial movement of the tool head and frame, there can be a cut-off or facing operation. It is known to achieve a bevel cut by use of a portable end prep lathe wherein the frame and tool head are advance axially by rotation of a hand wheel.

Numerous innovations for pipe machining tools have been provided in the prior art that will be described. Even though these innovations may be suitable for the specific individual purposes to which they address, however, they differ from the present invention in that they do not teach a portable pipe machining tool that selectively simultaneously cuts a pipe and scrapes and finishes a longitudinal outer surface of the pipe that has a pair of ends so as to facilitate bonding of the pipe wherein the portable pipe machining tool is supported only by the pipe it is machining and access to the pair of ends of the pipe is not required. The portable pipe machining tool includes a fixed cylindrically-shaped frame that is fixedly attachable to a portion of the pipe, a rotatable cylindrically-shaped frame that is rotatively connected to the fixed cylindrically-shaped frame and is rotatably attachable to an adjacent portion of the pipe, a parting tool assembly that extends radially along the rotatable cylindrically-shaped frame and is selectively engagable and disengagable, and when engaged has a portion thereof moving radially inwardly through the rotatable cylindrically-shaped frame and progressively cutting into the adjacent portion of the pipe as the rotatable cylindrically-shaped frame rotates relative to the fixed cylindrically-shaped frame until the pipe has been cut, and a scrapping and finishing tool assembly that extends radially along the rotatable cylindrically-shaped frame, diametrically opposing the parting tool assembly, and is selectively engagable and disengagable, and when engaged has a portion thereof moving longitudinally through the rotatable cylindrically-shaped frame and longitudinally along the longitudinal outer surface of the adjacent portion of the pipe and scraping and finishing the longitudinal outer surface of the adjacent portion of the pipe as the rotatable cylindrically-shaped frame rotates relative to the fixed cylindrically-shaped frame so as to facilitate the bonding of the pipe, and is selectively simultaneously operable with the parting tool assembly if so desired, so as to cut, scrape, and finish the adjacent portion of the pipe simultaneously as the rotatable cylindrically-shaped frame rotates relative to the fixed cylindrically-shaped frame.

FOR EXAMPLE, U.S. Pat. No. 4,411,178 to Wachs et al. teaches a pipe end preparation machine that includes a frame supportable in oriented relation from and beyond an end of a pipe. A tool head is mounted on the frame for rotation about an axis. A tool slide is mounted on the tool head for carrying a tool for movement along a path radial to said axis. A drive mechanism includes a remotely controllable motor for advancing the tool toward the pipe end to provide axial feed for the tool. And, a drive mechanism for advancing the tool slide to provide radial feed for the tool including a remotely controlled motor which can be controlled to vary the radial feed rate in a continuous controlled manner. The remotely controllable motors for radial and axial feed of the tool permit other operations. Circular interpolation effectively provides a third tool axis of movement as provided by the two axes of movement derived from the radial and axial feed.

ANOTHER EXAMPLE, U.S. Pat. No. 4,677,884 to Kwech et al. teaches a portable end prep lathe having presettable mechanical structure operable in response to rotation of a tool head for controlling the angle of a bevel cut on a pipe. A frame is supported relative to a pipe by a mast having a threaded section. The frame carries a rotatable tool head having a tool slide movable to advance a tool radially of the mast. The rate of radial advance of the tool slide is controlled by cam and cam follower structure mounted on the frame and tool head, respectively, and with the number of cams controlling the rate of advance per revolution of the tool head. The tool head is advanced axially of the mast and a pipe by means responsive to rotation of the tool head, including a star wheel mounted on the frame and drivingly connected to a nut threaded on the threaded section of the mast. The tool head has a plurality of circumferentially-spaced actuator pins for coaction with the star wheel to cause indexing thereof as the tool head rotates and resulting axial movement of the tool head, whereby with the radial advance of the tool slide, a bevel is cut on the pipe. The angle of the bevel can be determined by the number of actuator pins that are operable in each rotation of the tool head to index the star wheel and, if a lesser number than all of the actuator pins is initially used, additional actuator pins can be rendered operative during the machining cycle, without stopping the machine, to increase the axial feed and, therefore, the angle of the bevel that is cut on the pipe.

STILL ANOTHER EXAMPLE, U.S. Pat. No. 5,020,401 to Jiles teaches a universal tool for inspecting and processing plastic pipe includes a cylindrical chamfering element with a cylindrical wall and a pipe-receiving opening therein terminating in a base ring, the base ring carrying a tapered pin having an axis parallel to the axis of the cylindrical chamfering element, the wall of the chamfering element having a slot therein proximate the tapered pin and a four-edged cutting element mounted on the outer surface of the cylindrical wall and having one edge of the cutting element protruding through the slot in proximity to the tapered pin, the pipe to be chamfered being forced into contact with the cutting edge by axial pressure on the chamfering element and rotation thereof, an ovality-gage being carried by the chamfering element and being arcuatley rotatable, at the end of the arc rotation of the gage causing rotational forces to be applied to the chamfering element, i.e., the ovality-gage acting as a handle for the chamfering element. The ovality-gage may be separated from the chamfering element and utilized alone or in combination with a coupled second ovality-gage for checking the ovality of pipes of different nominal diameters. A wall thickness gage is carried by the ovality tool whether it is alone or in combination with a chamfering element or a dual ovality-gage.

STILL ANOTHER EXAMPLE, U.S. Pat. No. 5,261,301 to Babb et al. teaches a portable pipe cutting machine comprises a frame, an arm having opposite ends and supported on the frame for pivotal movement about a pivot axis between the opposite ends, a cutting wheel rotatably mounted on one of the ends of the arm, and a hydraulic piston and cylinder unit between the frame and the other end of the arm for pivoting the arm to displace the cutting wheel toward a pipe to be cut which is supported on rollers mounted on the frame beneath the cutting wheel. A manually operable variable displacement pump delivers fluid under pressure to the piston and cylinder unit to displace the arm toward the pipe, and an electric drive motor unit is supported on the arm for displacement therewith and includes an output end axially slidably interengaged with a drive shaft for the cutting wheel.

FINALLY, YET ANOTHER EXAMPLE, U.S. Pat. No. 5,304,018 to LaVanchy et al. teaches a universal plunge cutter for plastic pipe, pipe couplings, plastic flanges and other planar members, is provided. The plunge cutter has a cylindrical body supporting cutters, a drive shaft, a pilot mandrel for guiding the cylindrical body. The cutters are adjustably mounted in cutter slots formed in the cylindrical body so that the cutters present forwardly facing cutting edges which lie skewed relative to a radius of the cylindrical body. A method for the use of the plunge cutter is also provided.

It is apparent that numerous innovations for pipe machining tools have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a portable pipe machining tool that avoids the disadvantages of the prior art.

ANOTHER OBJECT of the present invention is to provide a portable pipe machining tool that is simple to use.

STILL ANOTHER OBJECT of the present invention is to provide a portable pipe machining tool that selectively simultaneously cuts a pipe and scrapes and finishes a longitudinal outer surface of the pipe that has a pair of ends so as to facilitate bonding of the pipe wherein the portable pipe machining tool is supported only by the pipe it is machining and access to the pair of ends of the pipe is not required.

BRIEFLY STATED, YET ANOTHER OBJECT of the present invention is to provide a portable pipe machining tool wherein the portable pipe machining tool includes a fixed cylindrically-shaped frame, fixed frame pivoting apparatus, fixed frame securing apparatus, a rotatable cylindrically-shaped frame, a ring gear, a track, rotatable frame pivoting apparatus, rotatable frame securing apparatus, a parting tool assembly, and a scrapping and finishing tool assembly.

STILL YET ANOTHER OBJECT of the present invention is to provide a portable pipe machining tool wherein the fixed cylindrically-shaped frame is fixedly attachable to a portion of the pipe and has a circular-shaped and open distal end with a circumferentially-disposed track disposed circumferentially therearound, a first semi-cylindrically-shaped portion, and a second semi-cylindrically-shaped portion that is pivotally mounted to the first semi-cylindrically-shaped portion of the fixed cylindrically-shaped frame.

YET STILL ANOTHER OBJECT of the present invention is to provide a portable pipe machining tool wherein the circumferentially-disposed track in the circular-shaped and open distal end of the fixed cylindrically-shaped frame has gear teeth disposed circumferentially therearound that extend longitudinally therein.

STILL YET ANOTHER OBJECT of the present invention is to provide a portable pipe machining tool wherein the fixed frame pivoting apparatus pivotally mounts the second semi-cylindrically-shaped the fixed cylindrically-shaped frame to the first semi-cylindrically-shaped portion of the fixed cylindrically-shaped frame and allows the fixed cylindrically-shaped frame to have an open position where the fixed cylindrically-shaped frame is placable around the pipe without having to have an end of the pipe accessible and a closed portion where the fixed cylindrically-shaped frame is fixedly abutted against, and supported only by, the pipe.

YET STILL ANOTHER OBJECT of the present invention is to provide a portable pipe machining tool wherein the fixed frame securing apparatus selectively maintains the fixed cylindrically-shaped frame in the closed position.

STILL YET ANOTHER OBJECT of the present invention is to provide a portable pipe machining tool wherein the rotatable cylindrically-shaped frame is rotatably attachable to an adjacent portion of the pipe and rotatably connected to the fixed cylindrically-shaped frame and has a first semi-cylindrically-shaped portion, a second semi-cylindrically-shaped portion that is pivotally mounted to the first semi-cylindrically-shaped portion of the rotatable cylindrically-shaped frame, and a circular-shaped and open proximal end with a collar disposed circumferentially therearound that extends longitudinally outwardly therefrom.

YET STILL ANOTHER OBJECT of the present invention is to provide a portable pipe machining tool wherein the ring gear is disposed circumferentially around, and extends coaxially and longitudinally from, the collar on the circular-shaped and open proximal end of the rotatable cylindrically-shaped frame.

STILL YET ANOTHER OBJECT of the present invention is to provide a portable pipe machining tool wherein the track is disposed circumferentially around, and extends coaxially and longitudinally from, the ring gear and has at least a portion thereof rotatably engaging the circumferentially-disposed track in the circular-shaped and open distal end of the fixed cylindrically-shaped frame so as to allow the rotatable cylindrically-shaped frame to rotate relative to the fixed cylindrically-shaped frame.

YET STILL ANOTHER OBJECT of the present invention is to provide a portable pipe machining tool wherein the rotatable frame pivoting apparatus pivotally mounts the second semi-cylindrically-shaped portion of the rotatable cylindrically-shaped frame to the first semi-cylindrically-shaped portion of the rotatable cylindrically-shaped frame and allows the rotatable cylindrically-shaped frame to have an open position where the rotatable cylindrically-shaped frame is placable around the adjacent portion of the pipe without having to have an end of the pipe accessible and a closed portion where the rotatable cylindrically-shaped frame is rotatably abutted against, and supported only by, the adjacent portion of the pipe.

STILL YET ANOTHER OBJECT of the present invention is to provide a portable pipe machining tool wherein the rotatable frame securing apparatus selectively maintains the rotatable cylindrically-shaped frame in the closed position.

YET STILL ANOTHER OBJECT of the present invention is to provide a portable pipe machining tool wherein the parting tool assembly extends radially along the first semi-cylindrically-shaped portion of the rotatable cylindrically-shaped frame and is selectively engagable and disengagable, and when engaged has a portion thereof moving radially inwardly through the first semi-cylindrically-shaped portion of the rotatable cylindrically-shaped frame and progressively cutting into the adjacent portion of the pipe as the rotatable cylindrically-shaped frame rotates relative to the fixed cylindrically-shaped frame until the pipe has been cut.

STILL YET ANOTHER OBJECT of the present invention is to provide a portable pipe machining tool wherein the scrapping and finishing tool assembly extends radially along the second semi-cylindrically-shaped portion of the rotatable cylindrically-shaped frame, diametrically opposing the parting tool assembly, and is selectively engagable and disengagable, and when engaged has a portion thereof moving longitudinally through the second semi-cylindrically-shaped portion of the rotatable cylindrically-shaped frame and longitudinally along the longitudinal outer surface of the adjacent portion of the pipe and scraping and finishing the longitudinal outer surface of the adjacent portion of the pipe as the rotatable cylindrically-shaped frame rotates relative to the fixed cylindrically-shaped frame so as to facilitate the bonding of the pipe, and is selectively simultaneously operable with the parting tool assembly if so desired, so as to cut, scrape, and finish the adjacent portion of the pipe simultaneously as the rotatable cylindrically-shaped frame rotates relative to the fixed cylindrically-shaped frame.

YET STILL ANOTHER OBJECT of the present invention is to provide a portable pipe machining tool wherein the second semi-cylindrically-shaped portion of the fixed cylindrically-shaped frame is pivotally mounted, at a pivot longitudinal face of the second semi-cylindrically-shaped portion of the fixed cylindrically-shaped frame, to a pivot longitudinal face of the first semi-cylindrically-shaped portion of the fixed cylindrically-shaped frame.

STILL YET ANOTHER OBJECT of the present invention is to provide a portable pipe machining tool wherein the fixed frame securing apparatus is disposed at an opposing securing longitudinal face of the first semi-cylindrically-shaped portion of the fixed cylindrically-shaped frame, which is diametrically opposite to the pivot longitudinal face of the first semi-cylindrically-shaped portion of the fixed cylindrically-shaped frame, and at an opposing securing longitudinal face of the second semi-cylindrically-shaped portion of the fixed cylindrically-shaped frame, which is diametrically opposite to the pivot longitudinal face of the second semi-cylindrically-shaped portion of the fixed cylindrically-shaped frame.

YET STILL ANOTHER OBJECT of the present invention is to provide a portable pipe machining tool wherein the second semi6 cylindrically-shaped portion of the rotatable cylindrically7 shaped frame is pivotally mounted, at a pivot longitudinal face of the second semi-cylindrically-shaped portion of the rotatable cylindrically-shaped frame, to a pivot longitudinal face of the first semi-cylindrically-shaped portion of the rotatable cylindrically-shaped frame.

STILL YET ANOTHER OBJECT of the present invention is to provide a portable pipe machining tool wherein the rotatable frame securing apparatus is disposed at an opposing securing longitudinal face of the first semi-cylindrically-shaped portion of the rotatable cylindrically-shaped frame, which is diametrically opposite to the pivot longitudinal face of the first semi-cylindrically-shaped portion of the rotatable cylindrically-shaped frame, and at an opposing securing longitudinal face of the second semi-cylindrically-shaped portion of the rotatable cylindrically-shaped frame, which is diametrically opposite to the pivot longitudinal face of the second semi-cylindrically-shaped portion of the rotatable cylindrically-shaped frame.

YET STILL ANOTHER OBJECT of the present invention is to provide a portable pipe machining tool wherein the fixed cylindrically-shaped frame further has a substantially semi-cylindrically-shaped power housing portion that extends radially from the circular-shaped and open distal end of the fixed cylindrically-shaped frame, on the first semi-cylindrically-shaped portion of the fixed cylindrically-shaped frame, and terminates in a cylindrically-shaped aperture that extends longitudinally therein.

STILL YET ANOTHER OBJECT of the present invention is to provide a portable pipe machining tool that further includes a cylindrically-shaped motor that is one of hydraulic and air and has a slender motor shaft that extends coaxially therefrom and terminates with a motor driver gear.

YET STILL ANOTHER OBJECT of the present invention is to provide a portable pipe machining tool wherein the cylindrically-shaped motor is longitudinally disposed and replaceably attached to the substantially semi-cylindrically-shaped power housing portion, with the motor driver gear on the slender motor shaft of the cylindrically-shaped motor replaceably positioned in the cylindrically-shaped aperture in the substantially semi-cylindrically-shaped power housing portion on the circular-shaped and open distal end of the fixed cylindrically-shaped frame and rotatably engages the ring gear.

STILL YET ANOTHER OBJECT of the present invention is to provide a portable pipe machining tool wherein the track disposed circumferentially around, and extending longitudinally from, the ring gear is a substantially I-shape in profile track and the circumferentially-disposed track in the fixed cylindrically-shaped frame is a substantially "+" shape in profile track.

YET STILL ANOTHER OBJECT of the present invention is to provide a portable pipe machining tool wherein the first semi-cylindrically-shaped portion of the rotatable cylindrically-shaped frame has an inner surface with a pair of longitudinally-oriented roller bearings rotatably mounted therein that straddle the portion of the parting tool assembly so as to facilitate rotation of the rotatable cylindrically-shaped frame on the adjacent portion of the pipe.

STILL YET ANOTHER OBJECT of the present invention is to provide a portable pipe machining tool wherein the second semi-cylindrically-shaped portion of the rotatable cylindrically-shaped frame has an inner surface with a pair of longitudinally-oriented roller bearings rotatably mounted therein that straddle the portion of the scrapping and finishing tool assembly so as to facilitate rotation of the rotatable cylindrically-shaped frame on the adjacent portion of the pipe.

YET STILL ANOTHER OBJECR of the present invention is to provide a portable pipe machining tool wherein the first semi-cylindrically-shaped portion of the fixed cylindrically-shaped frame has an inner surface with a semi-circular-shaped band of alternating trapezoidal-shaped hills and valleys disposed circumferentially therealong, in proximity to the circular-shaped and open distal end of the fixed cylindrically-shaped frame, and which extends to a circular-shaped and open proximal end of the fixed cylindrically-shaped frame, and eliminates damage to the pipe when the fixed cylindrically-shaped frame is fixedly abutted against the pipe.

STILL YET ANOTHER OBJECT of the present invention is to provide a portable pipe machining tool wherein the second semi-cylindrically-shaped portion of the fixed cylindrically-shaped frame has an inner surface with a semi-circular-shaped band of alternating trapezoidal-shaped hills and valleys disposed circumferentially therealong, in proximity to the circular-shaped and open distal end of the fixed cylindrically-shaped frame, and which extends to a circular-shaped and open proximal end of the fixed cylindrically-shaped frame, and eliminates damage to the pipe when the fixed cylindrically-shaped frame is fixedly abutted against the pipe.

YET STILL ANOTHER OBJECT of the present invention is to provide a portable pipe machining tool wherein the fixed frame pivoting apparatus includes a pair of parallel, and slightly spaced-apart, and longitudinally disposed tabs that extend radially outwardly from the first semi-cylindrically-shaped portion of the fixed cylindrically-shaped frame, substantially flush with the pivot longitudinal face of the first semi-cylindrically-shaped portion of the fixed cylindrically-shaped frame, and in proximity to the circular-shaped and open distal end of the fixed cylindrically-shaped frame.

STILL YET ANOTHER OBJECT of the present invention is to provide a portable pipe machining tool wherein each tab of the pair of parallel, and slightly spaced-apart, and longitudinally disposed tabs of the fixed frame pivoting apparatus has a longitudinally aligned throughbore that extends longitudinally therethrough.

YET STILL ANOTHER OBJECT of the present invention is to provide a portable pipe machining tool wherein the fixed frame pivoting apparatus further includes a tab that extends substantially radially outwardly from the second semi-cylindrically-shaped portion of the fixed cylindrically-shaped frame, substantially flush with, and extending circumferentially past, the pivot longitudinal face of the second semi-cylindrically-shaped portion of the fixed cylindrically-shaped frame, and in proximity to the circular-shaped and open distal end of the fixed cylindrically-shaped frame.

STILL YET ANOTHER OBJECT of the present invention is to provide a portable pipe machining tool wherein the tab of the fixed frame pivoting apparatus has a longitudinally-oriented throughbore that extends longitudinally therethrough.

YET STILL ANOTHER OBJECT of the present invention is to provide a portable pipe machining tool wherein the pair of parallel, and slightly spaced-apart, and longitudinally disposed tabs of the fixed frame pivoting apparatus replaceably receive therebetween the tab of the fixed frame pivoting apparatus, and is replaceably maintained therebetween by a pivot pin of the fixed frame pivoting apparatus that passes frictionally and replaceably through the longitudinally aligned throughbore in each tab of the pair of parallel, and slightly spaced-apart, and longitudinally disposed tabs of the fixed frame pivoting apparatus and frictionally and replaceably through the longitudinally-oriented throughbore in the tab of the fixed frame pivoting apparatus.

STILL YET ANOTHER OBJECT of the present invention is to provide a portable pipe machining tool wherein rotatable frame pivoting apparatus includes a pair of parallel, and spaced-apart, and longitudinally disposed tabs that extend radially outwardly from the first semi-cylindrically-shaped portion of the rotatable cylindrically-shaped frame, substantially flush with the pivot longitudinal face of the first semi-cylindrically-shaped portion of the rotatable cylindrically-shaped frame.

YET STILL ANOTHER OBJECT of the present invention is to provide a portable pipe machining tool wherein one tab of the pair of parallel, and spaced-apart, and longitudinally disposed tabs of the rotatable frame pivoting apparatus on the first semi-cylindrically-shaped portion of the rotatable cylindrically-shaped frame is disposed in proximity to the circular-shaped and open proximal end of the rotatable cylindrically-shaped frame and another tab of the pair of parallel, and spaced-apart, and longitudinally disposed tabs of the rotatable frame pivoting apparatus on the first semi-cylindrically-shaped portion of the rotatable cylindrically-shaped frame is disposed in proximity to a circular-shaped and open distal end of the rotatable cylindrically-shaped frame.

STILL YET ANOTHER OBJECT of the present invention is to provide a portable pipe machining tool wherein each tab of the pair of parallel, and slightly spaced-apart, and longitudinally disposed tabs of the rotatable frame pivoting apparatus on the first semi-cylindrically-shaped portion of the rotatable cylindrically-shaped frame has a longitudinally aligned throughbore that extends longitudinally therethrough.

YET STILL ANOTHER OBJECT of the present invention is to provide a portable pipe machining tool wherein the rotatable frame pivoting apparatus further includes a pair of parallel, and slightly spaced-apart, and longitudinally disposed tabs that extend substantially radially outwardly from the second semi-cylindrically-shaped portion of the rotatable cylindrically-shaped frame, substantially flush with, and extending circumferentially past, the pivot longitudinal face of the second semi-cylindrically-shaped portion of the rotatable cylindrically-shaped frame.

STILL YET ANOTHER OBJECT of the present invention is to provide a portable pipe machining tool wherein one tab of the pair of parallel, and spaced-apart, and longitudinally disposed tabs of the rotatable frame pivoting apparatus on the second semi-cylindrically-shaped portion of the rotatable cylindrically-shaped frame is disposed in proximity to the circular-shaped and open proximal end of the rotatable cylindrically-shaped frame and another tab of the pair of parallel, and spaced-apart, and longitudinally disposed tabs of the rotatable frame pivoting apparatus on the second semi-cylindrically-shaped portion of the rotatable cylindrically-shaped frame is disposed in proximity to the circular-shaped and open distal end of the rotatable cylindrically-shaped frame.

YET STILL ANOTHER OBJECT of the present invention is to provide a portable pipe machining tool wherein each tab of the pair of parallel, and spaced-apart, and longitudinally disposed tabs of the rotatable frame pivoting apparatus on the second semi-cylindrically-shaped portion of the rotatable cylindrically-shaped frame has a longitudinally aligned throughbore that extends longitudinally therethrough.

STILL YET ANOTHER OBJECT of the present invention is to provide a portable pipe machining tool wherein the pair of parallel, and slightly spaced-apart, and longitudinally disposed tabs of the rotatable frame pivoting apparatus on the first semi-cylindrically-shaped portion of the rotatable cylindrically-shaped frame replaceably receive therebetween the pair of parallel, and spaced-apart, and longitudinally disposed tabs of the rotatable frame pivoting apparatus on the second semi-cylindrically-shaped portion of the rotatable cylindrically-shaped frame, with each tab of the pair of parallel, and spaced-apart, and longitudinally disposed tabs of the rotatable frame pivoting apparatus on the second semi-cylindrically-shaped portion of the rotatable cylindrically-shaped frame abutting against a respective tab of the pair of parallel, and slightly spaced-apart, and longitudinally disposed tabs of the rotatable frame pivoting apparatus on the first semi-cylindrically-shaped portion of the rotatable cylindrically-shaped frame, and are replaceably maintained therebetween by a pivot pin that passes frictionally and replaceably through the longitudinally aligned throughbore in each tab of the pair of parallel, and slightly spaced-apart, and longitudinally disposed tabs of the rotatable frame pivoting apparatus on the first semi-cylindrically-shaped portion of the rotatable cylindrically-shaped frame and frictionally and replaceably through the longitudinally aligned throughbore in each tab of the pair of parallel, and spaced-apart, and longitudinally disposed tabs of the rotatable frame pivoting apparatus on the second semi-cylindrically-shaped portion of the rotatable cylindrically-shaped frame.

YET STILL ANOTHER OBJECT of the present invention is to provide a portable pipe machining tool wherein the fixed frame securing apparatus includes a substantially trapezoidal-shaped catch part that is integrally formed with the first semi-cylindrically-shaped portion of the fixed cylindrically-shaped frame, in proximity to the opposing securing longitudinal face of the first semi-cylindrically-shaped portion of the fixed cylindrically-shaped frame.

STILL YET ANOTHER OBJECT of the present invention is to provide a portable pipe machining tool wherein the fixed frame securing apparatus further includes a latch part that is pivotally mounted to the second semi-cylindrically-shaped portion of the fixed cylindrically-shaped frame, in proximity to the opposing securing longitudinal face of the second semi-cylindrically-shaped portion of the fixed cylindrically-shaped frame, and selectively and replaceably engages the substantially trapezoidal-shaped catch part of the fixed frame securing apparatus.

YET STILL ANOTHER OBJECT of the present invention is to provide a portable pipe machining tool wherein the rotatable frame securing apparatus includes a substantially trapezoidal-shaped catch part that is integrally formed with the first semi-cylindrically-shaped portion of the rotatable cylindrically-shaped frame, in proximity to the opposing securing longitudinal face of the first semi-cylindrically-shaped portion of the rotatable cylindrically-shaped frame.

STILL YET ANOTHER OBJECT of the present invention is to provide a portable pipe machining tool wherein the rotatable frame securing apparatus further includes a latch part that is pivotally mounted to the second semi-cylindrically-shaped portion of the rotatable cylindrically-shaped frame, in proximity to the opposing securing longitudinal face of the second semi-cylindrically-shaped portion of the rotatable cylindrically-shaped frame, and selectively and replaceably engages the substantially trapezoidal-shaped catch part of the rotatable frame securing apparatus.

YET STILL ANOTHER OBJECT of the present invention is to provide a portable pipe machining tool wherein the latch part of the fixed frame securing apparatus has a first square-shaped pivot link that is pivotally mounted to the second semi-cylindrically-shaped portion of the fixed cylindrically-shaped frame, by a first pivot pin that passes through a longitudinal throughbore in a substantially trapezoidal-shaped block that is integrally formed with the second semi-cylindrically-shaped portion of the fixed cylindrically-shaped frame, in proximity to the opposing securing longitudinal face of the second semi-cylindrically-shaped portion of the fixed cylindrically-shaped frame.

STILL YET ANOTHER OBJECT of the present invention is to provide a portable pipe machining tool wherein the first square-shaped pivot link of the latch part of the fixed frame securing apparatus securely and replaceably engages the substantially trapezoidal-shaped catch part of the fixed frame securing apparatus when the fixed cylindrically-shaped frame is in the closed position so as to maintain the fixed cylindrically-shaped frame in the closed position.

YET STILL ANOTHER OBJECT of the present invention is to provide a portable pipe machining tool wherein the latch part of the fixed frame securing apparatus further has a second rectangular-shaped handle pivot link that is pivotally mounted, by a second pivot pin, to the first square-shaped pivot link of the latch part of the fixed frame securing apparatus, and assists in selective engagement, when pushed down, and selective disengagement, when pulled up, of the first square-shaped pivot link of the latch part of the fixed frame securing apparatus relative to the substantially trapezoidal-shaped catch part of the fixed frame securing apparatus.

STILL YET ANOTHER OBJECT of the present invention is to provide a portable pipe machining tool wherein the latch part of the rotatable frame securing apparatus has a first square-shaped pivot link that is pivotally mounted, by a first pivot pin that passes through a longitudinal throughbore in a substantially trapezoidal-shaped block that is integrally formed with the second semi-cylindrically-shaped portion of the rotatable cylindrically-shaped frame, in proximity to the opposing securing longitudinal face of the second semi-cylindrically-shaped portion of the rotatable cylindrically-shaped frame.

YET STILL ANOTHER OBJECT of the present invention is to provide a portable pipe machining tool wherein the first square-shaped pivot link of the latch part of the rotatable frame securing apparatus securely and replaceably engages the substantially trapezoidal-shaped catch part of the rotatable frame securing apparatus when the rotatable cylindrically-shaped frame is in the closed position so as to maintain the rotatable cylindrically-shaped frame in the closed position.

STILL YET ANOTHER OBJECT of the present invention is to provide a portable pipe machining tool wherein the latch part of the rotatable frame securing apparatus further has a second rectangular-shaped handle pivot link that is pivotally mounted, by a second pivot pin, to the first square-shaped pivot link of the latch part of the rotatable frame securing apparatus, and assists in selective engagement, when pushed down, and selective disengagement, when pulled up, of the first square-shaped pivot link of the latch part of the rotatable frame securing apparatus relative to the substantially trapezoidal-shaped catch part of the rotatable frame securing apparatus.

YET STILL ANOTHER OBJECT of the present invention is to provide a portable pipe machining tool wherein the parting tool assembly includes a rectangular-parallelepiped-shaped housing that extends radially outwardly from the first semi-cylindrically-shaped portion of the rotatable cylindrically-shaped frame.

STILL YET ANOTHER OBJECT of the present invention is to provide a portable pipe machining tool wherein the rectangular-parallelepiped-shaped housing of the parting tool assembly has an innermost face disposed on the first semi-cylindrically-shaped portion of the rotatable cylindrically-shaped frame, and an outermost face that is spaced from, and parallel to, the innermost face of the rectangular-parallelepiped-shaped housing of the parting tool assembly.

YET STILL ANOTHER OBJECT of the present invention is to provide a portable pipe machining tool wherein the rectangular-parallelepiped-shaped housing of the parting tool assembly further has a forwardmost face, and a rearwardmost face that is spaced from, and parallel to, the forwardmost face of the rectangular-parallelepiped-shaped housing of the parting tool assembly.

STILL YET ANOTHER OBJECT of the present invention is to provide a portable pipe machining tool wherein the rectangular-parallelepiped-shaped housing of the parting tool assembly further has an upper face, and a lower face that is spaced from, and parallel to, the upper face of the rectangular-parallelepiped-shaped housing of the parting tool assembly.

YET STILL ANOTHER OBJECT of the present invention is to provide a portable pipe machining tool wherein the rectangular-parallelepiped-shaped housing of the parting tool assembly further has a centrally-disposed and cylindrically-shaped longitudinal throughbore that extends longitudinal therethrough, from and opening into, the upper face of the rectangular-parallelepiped-shaped housing of the parting tool assembly, to and opening into, the lower face of the rectangular-parallelepiped-shaped housing of the parting tool assembly.

STILL YET ANOTHER OBJECT of the present invention is to provide a portable pipe machining tool wherein the rectangular-parallelepiped-shaped housing of the parting tool assembly further has a cubic-shaped internal chamber that opens into the centrally-disposed and cylindrically-shaped longitudinal throughbore in the rectangular-parallelepiped-shaped housing of the parting tool assembly, the lower face of the rectangular-parallelepiped-shaped housing of the parting tool assembly, and the upper face of the rectangular-parallelepiped-shaped housing of the parting tool assembly.

YET STILL ANOTHER OBJECT of the present invention i3 to provide a portable pipe machining tool wherein the rectangular-parallelepiped-shaped housing of the parting tool assembly further has an elongated, slender, and cylindrically-shaped guide bore that extends from, and opening into both, the cubic-shaped internal chamber in the rectangular-parallelepiped-shaped housing of the parting tool assembly and the rearwardmost face of the rectangularparallelepiped-shaped housing of the parting tool assembly, and is parallel to the innermost face of the rectangular-parallelepiped-shaped housing of the parting tool assembly.

STILL YET ANOTHER OBJECT of the present invention is to provide a portable pipe machining tool wherein the rectangular-parallelepiped-shaped housing of the parting tool assembly further has a longitudinal throughbore that extends longitudinal therethrough, from and opening into, the upper face of the rectangular-parallelepiped-shaped housing of the parting tool assembly, to and opening into, the lower face of the rectangular-parallelepiped-shaped housing of the parting tool assembly.

YET STILL ANOTHER OBJECT of the present invention is to provide a portable pipe machining tool wherein the upper face of the rectangular-parallelepiped-shaped housing of the parting tool assembly has a pair of threaded bores that extend longitudinally therein, and are disposed between the centrally-disposed and cylindrically-shaped longitudinal throughbore in the rectangular-parallelepiped-shaped housing of the parting tool assembly and the outermost face of the rectangular-parallelepiped-shaped housing of the parting tool assembly.

STILL YET ANOTHER OBJECT of the present invention is to provide a portable pipe machining tool wherein the rectangular-parallelepiped-shaped housing of the parting tool assembly further has a rectangular-shaped upper cover that is replaceably secured to the lower face of the rectangular-parallelepiped-shaped housing of the parting tool assembly, by screws.

YET STILL ANOTHER OBJECT of the present invention is to provide a portable pipe machining tool wherein the rectangular-shaped upper cover of the rectangular-parallelepiped-shaped housing of the parting tool assembly has a centrally-disposed throughbore that extends longitudinally therethrough, and is smaller than, and coaxial and communicates with, the centrally-disposed and cylindrically-shaped longitudinal throughbore in the rectangular-parallelepiped-shaped housing of the parting tool assembly.

STILL YET ANOTHER OBJECT of the present invention is to provide a portable pipe machining tool wherein the rectangular-shaped upper cover of the rectangular-parallelepiped-shaped housing of the parting tool assembly further has a throughbore that extends longitudinally therethrough, and is coaxial and communicates with the longitudinal throughbore in the rectangular-parallelepiped-shaped housing of the parting tool assembly.

YET STILL ANOTHER OBJECT of the present invention is to provide a portable pipe machining tool wherein the parting tool assembly further includes a rectangular-shaped and T-shape in profile intermediate plate that is fixedly attached to the upper face of the rectangular-parallelepiped-shaped housing of the parting tool assembly, by screws that pass through throughbores in the rectangular-shaped and T-shape in profile intermediate plate of the parting tool assembly and threadably engage the threaded bores in the upper face of the rectangular-parallelepiped-shaped housing of the parting tool assembly.

STILL YET ANOTHER OBJECT of the present invention is to provide a portable pipe machining tool wherein the rectangular-shaped and T-shape in profile intermediate plate of the parting tool assembly further has an upper face with a figure 8-shaped recess therein with a major circle portion and a minor circle portion.

YET STILL ANOTHER OBJECT of the present invention is to provide a portable pipe machining tool wherein the rectangular-shaped and T-shape in profile intermediate plate of the parting tool assembly further has a throughbore that passes centrally through the major circle portion of the figure 8-shaped recess in the upper face of the rectangular-shaped and T-shape in profile intermediate plate of the parting tool assembly.

STILL YET ANOTHER OBJECT of the present invention is to provide a portable pipe machining tool wherein the rectangular-shaped and T-shape in profile intermediate plate of the parting tool assembly further has a throughbore that is smaller than, and passes centrally through the minor circle portion of the face figure 8-shaped recess in the upper face of the rectangular-shaped and T-shape in profile intermediate plate of the parting tool assembly, and is smaller than, and coaxial with, the centrally-disposed and cylindrically-shaped longitudinal throughbore in the rectangular-parallelepiped-shaped housing of the parting tool assembly.

YET STILL ANOTHER OBJECT of the present invention is to provide a portable pipe machining tool wherein the rectangular1 shaped and T-shape in profile intermediate plate of the parting tool assembly further has a T-shaped outermost face with a threaded throughbore that extends into, and communicates with, the throughbore in the minor circle portion of the figure 8-shaped recess in the upper face of the rectangular-shaped and T-shape in profile intermediate plate of the parting tool assembly.

STILL YET ANOTHER OBJECT of the present invention is to provide a portable pipe machining tool wherein the parting tool assembly further includes a large gear that is fixedly attached to a gear shaft that passes rotatably in the throughbore in the major circle portion of the figure 8-shaped recess in the upper face of the rectangular-shaped and T-shape in profile intermediate plate of the parting tool assembly, and with the large gear of the parting tool assembly resting flush in the major circle portion of the figure 8-shaped recess in the upper face of the rectangular-shaped and T-shape in profile intermediate plate of the parting tool assembly.

YET STILL ANOTHER OBJECT of the present invention is to provide a portable pipe machining tool wherein the parting tool assembly further includes a small gear that is fixedly attached to the gear shaft of the parting tool assembly and is coaxial with, is forward of, and is smaller than, the large gear of the parting tool assembly, and extends past the upper face of the rectangular-shaped and T-shape in profile intermediate plate of the parting tool assembly.

STILL YET ANOTHER OBJECT of the present invention is to provide a portable pipe machining tool wherein the parting tool assembly further includes a generally trapezoidal-shaped upper cover that has a T-shaped track that extends radially thereacross and radially slidingly engages the rectangular-shaped and T-shape in profile intermediate plate of the parting tool assembly.

YET STILL ANOTHER OBJECT of the present invention is to provide a portable pipe machining tool wherein the trapezoidal-shaped upper cover of the parting tool assembly further has an inner surface with a pair of throughbores and an elongated and slender stop recess that is disposed in proximity to, and tapers towards, an outermost face of the generally trapezoidal-shaped upper cover of the parting tool assembly.

STILL YET ANOTHER OBJECT of the present invention is to provide a portable pipe machining tool wherein the parting tool assembly further includes a rack gear that has pins that extend perpendicularly forwardly therefrom and which are fixedly received in the pair of throughbores in the inner surface of the trapezoidal-shaped upper cover of the parting tool assembly, with the small gear of the parting tool assembly rotatably engaging the rack gear of the parting tool assembly.

YET STILL ANOTHER OBJECT of the present invention is to provide a portable pipe machining tool wherein the parting tool assembly further includes a parting tool bit that is fixedly attached by screws and nuts to, for movement with, the generally trapezoidal-shaped upper cover of the parting tool assembly, and extends radially inwardly from an innermost face of the generally trapezoidal-shaped upper cover, and is a part of the portion of the parting tool assembly that moves radially inwardly through the first semi-cylindrically-shaped portion of the rotatable cylindrically-shaped frame and progressively cuts into the adjacent portion of the pipe as the rotatable cylindrically-shaped frame rotates relative to the fixed cylindrically-shaped frame.

STILL YET ANOTHER OBJECT of the present invention is to provide a portable pipe machining tool wherein the parting tool assembly further includes a first gear that is rotatably mounted to the first semi-cylindrically-shaped portion of the rotatable cylindrically-shaped frame, inward of the ring gear of the circular-shaped and open proximal end of the rotatable cylindrically-shaped frame, and rotatably engaging the gear teeth in the circumferentially-disposed track in the circular-shaped and open distal end of the fixed cylindrically-shaped frame.

YET STILL ANOTHER OBJECT of the present invention is to provide a portable pipe machining tool wherein the parting tool assembly further includes a second gear that is rotatably mounted in the first semi-cylindrically-shaped portion of the rotatable cylindrically-shaped frame, forward of, and rotatably engaging, the first gear of the parting tool assembly.

STILL YET ANOTHER OBJECT of the present invention is to provide a portable pipe machining tool wherein the parting tool assembly further includes an eccentric that is disposed on, outward of, and for rotation with, the second gear of the parting tool assembly.

YET STILL ANOTHER OBJECT of the present invention is to provide a portable pipe machining tool wherein the second gear of the parting tool assembly and the eccentric of the parting tool assembly are accessible via a threaded cap that threadably engages the first semi-cylindrically-shaped portion of the rotatable cylindrically-shaped frame.

STILL YET ANOTHER OBJECT of the present invention is to provide a portable pipe machining tool wherein the parting tool assembly further includes a reciprocating rod that is pivotally mounted at one end to the eccentric of the parting tool assembly, and extends movably through the elongated, slender, and cylindrically-shaped guide bore in the rectangula-parallelepiped-shaped housing of the parting tool assembly, and into the cubic-shaped internal chamber in the rectangular-parallelepiped-shaped housing of the parting tool assembly.

YET STILL ANOTHER OBJECT of the present invention is to provide a portable pipe machining tool wherein the parting tool assembly further includes a reciprocating block that is pivotally attached to another end of the reciprocating rod of the parting tool assembly for reciprocation therewith, and is movably disposed in the cubic-shaped internal chamber in the rectangular-parallelepiped-shaped housing of the parting tool assembly, and has a pin that extends radially towards the centrally-disposed and cylindrically-shaped longitudinal throughbore in the rectangular-parallelepiped-shaped housing of the parting tool assembly.

STILL YET ANOTHER OBJECT of the present invention is to provide a portable pipe machining tool wherein the parting tool assembly further includes a cylindrically-shaped release assembly that has a narrow portion that passes movably through the longitudinal throughbore in the rectangular-parallelepiped-shaped housing of the parting tool assembly and movably through the throughbore in the rectangular-shaped upper cover of the rectangular-parallelepiped-shaped housing of the parting tool assembly.

YET STILL ANOTHER OBJECT of the present invention is to provide a portable pipe machining tool wherein the cylindrically-shaped release assembly of the parting tool assembly further has a wide portion that extends coaxially upwardly from the narrow portion of the cylindrically-shaped release assembly of the parting tool assembly, and is biased in the elongated and slender stop recess in the generally trapezoidal-shaped upper cover of the parting tool assembly, by a spring.

STILL YET ANOTHER OBJECT of the present invention is to provide a portable pipe machining tool wherein the parting tool assembly further has a resistance assembly that has a plunger that passes movably into the threaded throughbore in the T-shaped outermost face of the rectangular-shaped and T-shape in profile intermediate plate of the parting tool assembly.

YET STILL ANOTHER OBJECT of the present invention is to provide a portable pipe machining tool wherein the resistance assembly of the parting tool assembly further has a spring that biases the plunger of the resistance assembly of the parting tool assembly inwardly in the throughbore in the T-shaped outermost face of the rectangular-shaped and T-shape in profile intermediate plate of the parting tool assembly.

STILL YET ANOTHER OBJECT of the present invention is to provide a portable pipe machining tool wherein the resistance assembly of the parting tool assembly further has a set screw that threadably engages the threaded throughbore in the T-shaped outermost face of the rectangular-shaped and T-shape in profile intermediate plate of the parting tool assembly and regulates amount of biasing of the spring of the resistance assembly of the parting tool assembly.

YET STILL ANOTHER OBJECT of the present invention is to provide a portable pipe machining tool wherein the parting tool assembly further includes a cylindrically-shaped collar that is disposed coaxially in, for reciprocating movement in, the centrally-disposed and cylindrically-shaped longitudinal throughbore in the rectangular-parallelepiped-shaped housing of the parting tool assembly.

STILL YET ANOTHER OBJECT of the present invention is to provide a portable pipe machining tool wherein the cylindrically-shaped collar of the parting tool assembly has a cylindrically-shaped inner surface with a ratchet surface disposed therearound.

YET STILL ANOTHER OBJECT of the present invention is to provide a portable pipe machining tool wherein the cylindrically-shaped collar of the parting tool assembly further has a cylindrically-shaped outer surface with a radially-oriented and threaded bore that extends radially therein.

STILL YET ANOTHER OBJECT of the present invention is to provide a portable pipe machining tool wherein the parting tool assembly further has a threaded yoke that threadably engages, and extends outwardly from, the radially-oriented and threaded bore in the cylindrically-shaped outer surface of the cylindrically-shaped collar of the parting tool assembly, and is pivotally mounted to the pin on the reciprocating block of the parting tool assembly, by a pivot pin.

YET STILL ANOTHER OBJECT of the present invention is to provide a portable pipe machining tool wherein the parting tool assembly further includes an engagement assembly that passes through the cylindrically-shaped collar of the parting tool assembly, and selectively engages and disengages the parting tool assembly.

STILL YET ANOTHER OBJECT of the present invention is to provide a portable pipe machining tool wherein the engagement assembly of the parting tool assembly includes an elongated, slender, and cylindrically-shaped shaft that has a proximal end and a distal end.

YET STILL ANOTHER OBJECT of the present invention is to provide a portable pipe machining tool wherein the engagement assembly of the parting tool assembly further includes a gear that is fixedly and coaxially attached to, for rotation with, the distal end of the elongated, slender, and cylindrically-shaped shaft of the engagement assembly of the parting tool assembly, passes through the throughbore in the minor circle portion of the face figure 8-shaped recess in the upper face of the rectangular-shaped and T-shape in profile intermediate plate of the parting tool assembly, sits flush in the minor circle portion of the face figure 8-shaped recess in the upper face of the rectangular-shaped and T-shape in profile intermediate plate of the parting tool assembly, and rotatably engages the large gear of the parting tool assembly.

STILL YET ANOTHER OBJECT of the present invention is to provide a portable pipe machining tool wherein the engagement assembly of the parting tool assembly further includes a fixed and cylindrically-shaped clutch part that has a flat distal end and a serrated proximal end, and is fixedly and coaxially attached to, for rotation with, the elongated, slender, and cylindrically-shaped shaft of the engagement assembly of the parting tool assembly, with the flat distal end of the fixed and cylindrically-shaped clutch part of the engagement assembly of the parting tool assembly abutting against the gear of the engagement assembly of the parting tool assembly.

YET STILL ANOTHER OBJECT of the present invention is to provide a portable pipe machining tool wherein the engagement assembly of the parting tool assembly further includes a rotatable and cylindrically-shaped clutch part that contacts the ratchet surface on the cylindrically-shaped inner surface of the cylindrically-shaped collar of the parting tool assembly, and rotates via the reciprocating movement of the cylindrically-shaped collar of the parting tool assembly, by virtue of the plunger of the resistance assembly of the parting tool assembly being biased, by the spring of the resistance assembly of the parting tool assembly, against the cylindrically-shaped clutch part of the engagement assembly of the parting tool assembly and thereby preventing the rotatable and cylindrically-shaped clutch part of the engagement assembly of the parting tool assembly from rotating back and reciprocating with the cylindrically-shaped collar of the parting tool assembly as the ratchet surface on the cylindrically-shaped inner surface of the cylindrically-shaped collar of the parting tool assembly reciprocates.

STILL YET ANOTHER OBJECT of the present invention is to provide a portable pipe machining tool wherein the rotatable and cylindrically-shaped clutch part of the engagement assembly of the parting tool assembly is rotatably and coaxially attached to, for rotation with when the parting tool assembly is engaged, the elongated, slender, and cylindrically-shaped shaft of the engagement assembly of the parting tool assembly.

YET STILL ANOTHER OBJECT of the present invention is to provide a portable pipe machining tool wherein the rotatable and cylindrically-shaped clutch part of the engagement assembly of the parting tool assembly has a serrated distal end and a flat proximal end.

STILL YET ANOTHER OBJECT of the present invention is to provide a portable pipe machining tool wherein the serrated distal end of the rotatable and cylindrically-shaped clutch part of the engagement assembly of the parting tool assembly is in selective engagement with, and disengagement from, the serrated proximal end of the fixed and cylindrically-shaped clutch part of the engagement assembly of the parting tool assembly.

YET STILL ANOTHER OBJECT of the present invention is to provide a portable pipe machining tool wherein the engagement assembly of the parting tool assembly further includes a first spring that is coaxially disposed on the elongated, slender, and cylindrically-shaped shaft of the engagement assembly of the parting tool assembly, between the fixed and cylindrically-shaped clutch part of the engagement assembly of the parting tool assembly and the rotatable and cylindrically-shaped clutch part of the engagement assembly of the parting tool assembly, and biases the rotatable and cylindrically-shaped clutch part of the engagement assembly of the parting tool assembly away from the fixed and cylindrically-shaped clutch part of the engagement assembly of the parting tool assembly.

STILL YET ANOTHER OBJECT of the present invention is to provide a portable pipe machining tool wherein the engagement assembly of the parting tool assembly further includes a rotatable and cylindrically-shaped cam part that is rotatably and coaxially attached to, for rotation with when the parting tool assembly is engaged, the elongated, slender, and cylindrically-shaped shaft of the engagement assembly of the parting tool assembly.

YET STILL ANOTHER OBJECT of the present invention is to provide a portable pipe machining tool wherein the rotatable and cylindrically-shaped cam part of the engagement assembly of the parting tool assembly has a flat distal end and a cammed proximal end with flats thereon.

STILL YET ANOTHER OBJECT of the present invention is to provide a portable pipe machining tool wherein the flat distal end of the rotatable and cylindrically-shaped cam part of the engagement assembly of the parting tool assembly is abuttable against, for rotation with when the parting tool assembly is engaged, the flat proximal end of the rotatable and cylindrically-shaped clutch part of the engagement assembly of the parting tool assembly.

YET STILL ANOTHER OBJECT of the present invention is to provide a portable pipe machining tool wherein the engagement assembly of the parting tool assembly further includes a second spring that is coaxially disposed on the elongated, slender, and cylindrically-shaped shaft of the engagement assembly of the parting tool assembly, between, and biases apart, the rotatable and cylindrically-shaped clutch part of the engagement assembly of the parting tool assembly and the rotatable and cylindrically-shaped cam part of the engagement assembly of the parting tool assembly.

STILL YET ANOTHER OBJECT of the present invention is to provide a portable pipe machining tool wherein the engagement assembly of the parting tool assembly further includes a flat and elongated arm that extends fixedly outwardly from, for rotation with, the rotatable and cylindrically-shaped cam part of the engagement assembly of the parting tool assembly, and has a free end.

YET STILL ANOTHER OBJECT of the present invention is to provide a portable pipe machining tool wherein the flat and elongated arm of the engagement assembly of the parting tool assembly further has a first pin that extends fixedly and perpendicularly from the free end of the flat and elongated arm of the engagement assembly of the parting tool assembly, towards the proximal end of the elongated, slender, and cylindrically-shaped shaft of the engagement assembly of the parting tool assembly.

STILL YET ANOTHER OBJECT of the present invention is to provide a portable pipe machining tool wherein the flat and elongated arm of the engagement assembly of the parting tool assembly further has a second pin that extends fixedly and perpendicularly from the flat and elongated arm of the engagement assembly of the parting tool assembly, towards the proximal end of the elongated, slender, and cylindrically-shaped shaft of the engagement assembly of the parting tool assembly, inboard of, parallel to, and shorter than, the first pin of the flat and elongated arm of the engagement assembly of the parting tool assembly.

YET STILL ANOTHER OBJECT of the present invention is to provide a portable pipe machining tool wherein the engagement assembly of the parting tool assembly further includes a flat and circular-shaped disk that has a distal surface, a proximal surface, and a circular-shaped periphery, and is replaceably attached to the proximal end of the elongated, slender, and cylindrically-shaped shaft of the engagement assembly of the parting tool assembly.

STILL YET ANOTHER OBJECT of the present invention is to provide a portable pipe machining tool wherein the flat and circular-shaped disk of the engagement assembly of the parting tool assembly further has a collar that is fixedly and coaxially attached to, for rotation with, the proximal surface of the flat and circular-shaped disk of the engagement assembly of the parting tool assembly, and which receives the proximal end of the elongated, slender, and cylindrically-shaped shaft of the engagement assembly of the parting tool assembly.

YET STILL ANOTHER OBJECT of the present invention is to provide a portable pipe machining tool wherein the collar of the flat and circular-shaped disk of the engagement assembly of the parting tool assembly has a radially-oriented and threaded throughbore that extends radially therethrough and receives a set screw for maintaining the flat and circular-shaped disk of the engagement assembly of the parting tool assembly on the proximal end of the elongated, slender, and cylindrically-shaped shaft of the engagement assembly of the parting tool assembly.

STILL YET ANOTHER OBJECT of the present invention is to provide a portable pipe machining tool wherein the flat and circular-shaped disk of the engagement assembly of the parting tool assembly further has a cammed part that is fixedly and coaxially attached to the distal surface of the flat and circular-shaped disk of the engagement assembly of the parting tool assembly, and has flats thereon.

YET STILL ANOTHER OBJECT of the present invention is to provide a portable pipe machining tool wherein the cammed part of the distal surface of the flat and circular-shaped disk of the engagement assembly of the parting tool assembly is complementary to the cammed proximal end of the rotatable and cylindrically-shaped cam part of the engagement assembly of the parting tool assembly, with the flats of the cammed part of the distal surface of the flat and circular-shaped disk of the engagement assembly of the parting tool assembly being abuttable against, for rotation with when the parting tool assembly is engaged, the flats of the cammed proximal end of the rotatable and cylindrically-shaped cam part of the engagement assembly of the parting tool assembly.

STILL YET ANOTHER OBJECT of the present invention is to provide a portable pipe machining tool wherein the flat and circular-shaped disk of the engagement assembly of the parting tool assembly further has an arcuate-shaped throughslot that extends circumferentially therethrough, in proximity and parallel to, the circular-shaped periphery of the flat and circular-shaped disk of the engagement assembly of the parting tool assembly, and selectively receives the second pin of the flat and elongated arm of the engagement assembly of the parting tool assembly when the parting tool assembly is disengaged.

YET STILL ANOTHER OBJECT of the present invention is to provide a portable pipe machining tool wherein the scrapping and finishing tool assembly includes a rectangular-parallelepiped-shaped housing that extends radially outwardly from the second semi-cylindrically-shaped portion of the rotatable cylindrically-shaped frame.

STILL YET ANOTHER OBJECT of the present invention is to provide a portable pipe machining tool wherein the rectangular-parallelepiped-shaped housing of the scrapping and finishing tool assembly has an innermost face disposed on the second semi-cylindrically-shaped portion of the rotatable cylindrically-shaped frame, and an outermost face that is spaced from, and parallel to, the innermost face of the rectangular-parallelepiped-shaped housing of the scrapping and finishing tool assembly.

YET STILL ANOTHER OBJECT of the present invention is to provide a portable pipe machining tool wherein the rectangular-parallelepiped-shaped housing of the scrapping and finishing tool assembly further has a rearwardmost face with a pair of threaded bores disposed at opposing corners thereof, and a forwardmost face that is spaced from, and parallel to, the rearwardmost face of the rectangular-parallelepiped-shaped housing of the scrapping and finishing tool assembly.

STILL YET ANOTHER OBJECT of the present invention is to provide a portable pipe machining tool wherein the rectangular-parallelepiped-shaped housing of the scrapping and finishing tool assembly further has an upper face, and a lower face that is spaced from, and parallel to, the upper face of the rectangular-parallelepiped-shaped housing of the scrapping and finishing tool assembly.

YET STILL ANOTHER OBJECT of the present invention is to provide a portable pipe machining tool wherein the rectangular-parallelepiped-shaped housing of the scrapping and finishing tool assembly further has a centrally-disposed and cylindrically-shaped longitudinal throughbore that extends longitudinally therethrough, from and opening into, the rearwardmost face of the rectangular-parallelepiped-shaped housing of the scrapping and finishing tool assembly, to and opening into, the forwardmost face of the rectangular-parallelepiped-shaped housing of the scrapping and finishing tool assembly.

STILL YET ANOTHER OBJECT of the present invention is to provide a portable pipe machining tool wherein the rectangular-parallelepiped-shaped housing of the scrapping and finishing tool assembly further has a wide and rectangular-parallelepiped-shaped recess that opens into both the outermost face of the rectangular-parallelepiped-shaped housing of the scrapping and finishing tool assembly and the innermost face of the rectangular-parallelepiped-shaped housing of the scrapping and finishing tool assembly, and opens into, and extends longitudinally rearwardly from, the forwardmost face of the rectangular-parallelepiped-shaped housing of the scrapping and finishing tool assembly to an intermediate face of the rectangular-parallelepiped-shaped housing of the scrapping and finishing tool assembly.

YET STILL ANOTHER OBJECT of the present invention is to provide a portable pipe machining tool wherein the rectangular-parallelepiped-shaped housing of the scrapping and finishing tool assembly further has a narrow and rectangular-parallelepiped-shaped recess that opens into, and extends upwardly from the wide and rectangular-parallelepiped-shaped recess in the rectangular-parallelepiped-shaped housing of the scrapping and finishing tool assembly towards the upper face of the rectangular-parallelepiped-shaped housing of the scrapping and finishing tool assembly, and longitudinally from the forwardmost face of the rectangular-parallelepiped-shaped housing of the scrapping and finishing tool assembly to the intermediate face of the rectangular-parallelepiped-shaped housing of the scrapping and finishing tool assembly, where it communicates with the centrally-disposed and cylindrically-shaped longitudinal throughbore in the rectangular-parallelepiped-shaped housing of the scrapping and finishing tool assembly.

STILL YET ANOTHER OBJECT of the present invention is to provide a portable pipe machining tool wherein the rectangular-parallelepiped-shaped housing of the scrapping and finishing tool assembly further has an elongated, slender, and cylindrically-shaped guide bore that extends longitudinally from, and opens into, the rearwardmost face of the rectangular-parallelepiped-shaped housing of the scrapping and finishing tool assembly to, and opens into, the intermediate face of the rectangular-parallelepiped-shaped housing of the scrapping and finishing tool assembly, and is parallel to the centrally-disposed and cylindrically-shaped longitudinal throughbore in the rectangular-parallelepiped-shaped housing of the scrapping and finishing tool assembly.

YET STILL ANOTHER OBJECT of the present invention is to provide a portable pipe machining tool wherein the rectangular-parallelepiped-shaped housing of the scrapping and finishing tool assembly further has a threaded bore that extends from, and opens into, the outermost face of the rectangular-parallelepiped-shaped housing of the scrapping and finishing tool assembly to, and communicates with, the centrally-disposed and cylindrically-shaped longitudinal throughbore in the rectangular-parallelepiped-shaped housing of the scrapping and finishing tool assembly.

STILL YET ANOTHER OBJECT of the present invention is to provide a portable pipe machining tool wherein the scrapping and finishing tool assembly further includes a rectangular-shaped plate that is parallel to, and spaced rearwardly from, the rearwardmost face of the rectangular-parallelepiped-shaped housing of the scrapping and finishing tool assembly, and forms therebetween a space.

YET STILL ANOTHER OBJECT of the present invention is to provide a portable pipe machining tool wherein the rectangular-shaped plate of the scrapping and finishing tool assembly is attached to the rearwardmost face of the rectangular-parallelepiped-shaped housing of the scrapping and finishing tool assembly, by a pair of screws that pass through a pair of throughbores in a pair of opposing corners of the rectangular-shaped plate of the scrapping and finishing tool assembly, and threadably engage the pair of threaded bores in the rearwardmost face of the rectangular-parallelepiped-shaped housing of the scrapping and finishing tool assembly.

STILL YET ANOTHER OBJECT of the present invention is to provide a portable pipe machining tool wherein the rectangular-shaped plate of the scrapping and finishing tool assembly further has a centrally disposed longitudinal throughbore that extends longitudinally therethrough, and is in longitudinal alignment with the centrally-disposed and cylindrically-shaped longitudinal throughbore in the rectangular-parallelepiped-shaped housing of the scrapping and finishing tool assembly.

YET STILL ANOTHER OBJECT of the present invention is to provide a portable pipe machining tool wherein the rectangular-shaped plate of the scrapping and finishing tool assembly further has a corner longitudinal throughbore that extends longitudinally therethrough in a corner thereof, and is in longitudinal alignment with the elongated, slender, and cylindrically-shaped guide bore in the rectangular-parallelepiped-shaped housing of the scrapping and finishing tool assembly.

STILL YET ANOTHER OBJECT of the present invention is to provide a portable pipe machining tool wherein the scrapping and finishing tool assembly further includes a rectangular-shaped and T-shape in profile plate that is longitudinally slidably mounted in the wide and rectangular-parallelepiped-shaped recess in the rectangular-parallelepiped-shaped housing of the scrapping and finishing tool assembly, and has an upper face and a lower face.

YET STILL ANOTHER OBJECT of the present invention is to provide a portable pipe machining tool wherein the rectangular-shaped and T-shape in profile plate of the scrapping and finishing tool assembly further has a collar that is integrally formed on the upper face of the rectangular-shaped and T-shape in profile plate of the scrapping and finishing tool assembly.

STILL YET ANOTHER OBJECT of the present invention is to provide a portable pipe machining tool wherein the collar of the rectangular-shaped and T-shape in profile plate of the scrapping and finishing tool assembly is longitudinally slidably mounted in the narrow and rectangular-parallelepiped-shaped recess in the rectangular-parallelepiped-shaped housing of the scrapping and finishing tool assembly, and has a threaded throughbore that passes longitudinally therethrough.

YET STILL ANOTHER OBJECT of the present invention is to provide a portable pipe machining tool wherein the rectangular-shaped and T-shape in profile plate of the scrapping and finishing tool assembly further has a pair of threaded rods that are fixedly attached to, and extend perpendicularly outwardly from, the lower face of the rectangular-shaped and T-shape in profile plate of the scrapping and finishing tool assembly.

STILL YET ANOTHER OBJECT of the present invention is to provide a portable pipe machining tool wherein the scrapping and finishing tool assembly further includes a scrapping and finishing tool bit assembly that is radially slidably mounted to the rectangular-shaped and T-shape in profile plate of the scrapping and finishing tool assembly.

YET STILL ANOTHER OBJECT of the present invention is to provide a portable pipe machining tool wherein the scrapping and finishing tool bit assembly of the scrapping and finishing tool assembly includes a generally rectangular-parallelepiped-shaped body.

STILL YET ANOTHER OBJECT of the present invention is to provide a portable pipe machining tool wherein the generally rectangular-parallelepiped-shaped body of the scrapping and finishing tool bit assembly of the scrapping and finishing tool assembly has an upper face with a recess that radially slidably receives the lower face of the rectangular-shaped and T-shape in profile plate of the scrapping and finishing tool assembly.

YET STILL ANOTHER OBJECT of the present invention is to provide a portable pipe machining tool wherein the generally rectangular-parallelepiped-shaped body of the scrapping and finishing tool bit assembly of the scrapping and finishing tool assembly further has a pair of elongated and radially-aligned throughbores that extend therethrough, from and opening into, the recess in the upper face of the generally rectangular-parallelepiped-shaped body of the scrapping and finishing tool bit assembly of the scrapping and finishing tool assembly to, and opening into, a lower face of the generally rectangular-parallelepiped-shaped body of the scrapping and finishing tool bit assembly of the scrapping and finishing tool assembly, and radially movably receive the pair of threaded rods of the rectangular-shaped and T-shape in profile plate of the scrapping and finishing tool assembly.

STILL YET ANOTHER OBJECT of the present invention is to provide a portable pipe machining tool wherein the scrapping and finishing tool bit assembly of the scrapping and finishing tool assembly further includes a rack gear that is fixedly attached in, for movement with, an outermost throughbore of the pair of elongated and radially-aligned throughbores in the generally rectangular-parallelepiped-shaped body of the scrapping and finishing tool bit assembly of the scrapping and finishing tool assembly.

YET STILL ANOTHER OBJECT of the present invention is to provide a portable pipe machining tool wherein the scrapping and finishing tool bit assembly of the scrapping and finishing tool assembly further includes a crank that has a throughbore that freely receives an outermost rod of the pair of threaded rods of the rectangular-shaped and T-shape in profile plate of the scrapping and finishing tool assembly for rotation relative thereto, and a gear that is fixedly attached thereto, for rotation therewith, and which passes through the outermost throughbore of the pair of elongated and radially-aligned throughbores in the generally rectangular-parallelepiped-shaped body of the scrapping and finishing tool bit assembly of the scrapping and finishing tool assembly and engages the rack gear of the scrapping and finishing tool bit assembly of the scrapping and finishing tool assembly.

STILL YET ANOTHER OBJECT of the present invention is to provide a portable pipe machining tool wherein the scrapping and finishing tool bit assembly of the scrapping and finishing tool assembly further includes a pair of wing nuts that threadably engage the pair of threaded rods of the rectangular-shaped and T-shape in profile plate of the scrapping and finishing tool assembly.

YET STILL ANOTHER OBJECT of the present invention is to provide a portable pipe machining tool wherein the scrapping and finishing tool bit assembly of the scrapping and finishing tool assembly further includes a tool bit head block that is fixedly attached to, extends inwardly and rearwardly from, and is coplanar with, the generally rectangular-parallelepiped-shaped body of the scrapping and finishing tool bit assembly of the scrapping and finishing tool assembly.

STILL YET ANOTHER OBJECT of the present invention is to provide a portable pipe machining tool wherein the tool bit head block of the scrapping and finishing tool bit assembly of the scrapping and finishing tool assembly has an innermost face with a rectangular-parallelepiped-shaped recess.

YET STILL ANOTHER OBJECT of the present invention is to provide a portable pipe machining tool wherein the tool bit head block of the scrapping and finishing tool bit assembly of the scrapping and finishing tool assembly further has a clearance throughbore that extends from, and opens into, the rectangular-parallelepiped-shaped recess in the innermost face of the tool bit head block of the scrapping and finishing tool bit assembly of the scrapping and finishing tool assembly to, and opens into, an outermost face of the tool bit head block of the scrapping and finishing tool bit assembly of the scrapping and finishing tool assembly.

STILL YET ANOTHER OBJECT of the present invention is to provide a portable pipe machining tool wherein the scrapping and finishing tool bit assembly of the scrapping and finishing tool assembly further includes a tool bit head that is movably mounted to the tool bit head block of the scrapping and finishing tool bit assembly of the scrapping and finishing tool assembly, and has an outermost face.

YET STILL ANOTHER OBJECT of the present invention is to provide a portable pipe machining tool wherein the tool bit head of the scrapping and finishing tool bit assembly of the scrapping and finishing tool assembly further has a rectangular-parallelepiped-shaped slide block that extends perpendicularly from the outermost face of the tool bit head of the scrapping and finishing tool bit assembly of the scrapping and finishing tool assembly, and is movably received in the rectangular-parallelepiped-shaped recess in the innermost face of the tool bit head block of the scrapping and finishing tool bit assembly of the scrapping and finishing tool assembly.

STILL YET ANOTHER OBJECT of the present invention is to provide a portable pipe machining tool wherein the tool bit head of the scrapping and finishing tool bit assembly of the scrapping and finishing tool assembly further has an allen bolt that passes freely through the clearance throughbore in the tool bit head block of the scrapping and finishing tool bit assembly of the scrapping and finishing tool assembly, from the outermost face of the tool bit head block of the scrapping and finishing tool bit assembly of the scrapping and finishing tool assembly, and threadably engages the rectangular-parallelepiped-shaped slide block of the tool bit head of the scrapping and finishing tool bit assembly of the scrapping and finishing tool assembly.

YET STILL ANOTHER OBJECT of the present invention is to provide a portable pipe machining tool wherein the scrapping and finishing tool bit assembly of the scrapping and finishing tool assembly further includes a spring that is coaxially disposed on the allen bolt of the tool bit head of the scrapping and finishing tool bit assembly of the scrapping and finishing tool assembly, rests in the rectangular-parallelepiped-shaped recess in the innermost face of the tool bit head block of the scrapping and finishing tool bit assembly of the scrapping and finishing tool assembly, and biases the tool bit head of the scrapping and finishing tool bit assembly of the scrapping and finishing tool assembly away from the tool bit head block of the scrapping and finishing tool bit assembly of the scrapping and finishing tool assembly.

STILL YET ANOTHER OBJECT of the present invention is to provide a portable pipe machining tool wherein the tool bit head of the scrapping and finishing tool bit assembly of the scrapping and finishing tool assembly further has an innermost face with a slot that extends therealong.

YET STILL ANOTHER OBJECT of the present invention is to provide a portable pipe machining tool wherein the scrapping and finishing tool bit assembly of the scrapping and finishing tool assembly further includes a guide roller that is rotatably mounted in the slot in the innermost face of the tool bit head of the scrapping and finishing tool bit assembly of the scrapping and finishing tool assembly, by a pivot pin that extends longitudinally therethrough.

STILL YET ANOTHER OBJECT of the present invention is to provide a portable pipe machining tool wherein the scrapping and finishing tool bit assembly of the scrapping and finishing tool assembly further includes a generally square-shaped scrapping and finishing tool bit that is rotatably mounted in a recess in the tool bit head of the scrapping and finishing tool bit assembly of the scrapping and finishing tool assembly, by a pivot pin.

YET STILL ANOTHER OBJECT of the present invention is to provide a portable pipe machining tool wherein the generally square-shaped scrapping and finishing tool bit of the scrapping and finishing tool bit assembly of the scrapping and finishing tool assembly is forward of, and extends slightly past, the guide roller of the scrapping and finishing tool bit assembly of the scrapping and finishing tool assembly.

STILL YET ANOTHER OBJECT of the present invention is to provide a portable pipe machining tool wherein the scrapping and finishing tool assembly further includes a first gear that is rotatably mounted to the second semi-cylindrically-shaped portion of the rotatable cylindrically-shaped frame, behind the ring gear of the circular-shaped and open proximal end of the rotatable cylindrically-shaped frame, and rotatably engaging the gear teeth in the circumferentially-disposed track in the circular-shaped and open distal end of the fixed cylindrically-shaped frame.

YET STILL ANOTHER OBJECT of the present invention is to provide a portable pipe machining tool wherein the scrapping and finishing tool assembly further includes a second gear that is rotatably mounted in the second semi-cylindrically-shaped portion of the rotatable cylindrically-shaped frame, forward of, and rotatably engaging, the first gear of the scrapping and finishing tool assembly.

STILL YET ANOTHER OBJECT of the present invention is to provide a portable pipe machining tool wherein the scrapping and finishing tool assembly further includes an eccentric that is fixedly disposed on, outward of, and for rotation with, the second gear.

YET STILL ANOTHER OBJECT of the present invention is to provide a portable pipe machining tool wherein the second gear of the scrapping and finishing tool assembly and the eccentric of the scrapping and finishing tool assembly are accessible via a threaded cap that threadably engages the second semi-cylindrically-shaped portion of the rotatable cylindrically-shaped frame.

STILL YET ANOTHER OBJECT of the present invention is to provide a portable pipe machining tool wherein the scrapping and finishing tool assembly further includes a reciprocating rod that is pivotally mounted at one end to the eccentric of the scrapping and finishing tool assembly, and extends into the space in the scrapping and finishing tool assembly.

YET STILL ANOTHER OBJECT of the present invention is to provide a portable pipe machining tool wherein the scrapping and finishing tool assembly further includes a reciprocating flat arm that is pivotally attached to another end of the reciprocating rod of the scrapping and finishing tool assembly for reciprocation therewith, and is movably disposed in the space in the scrapping and finishing tool assembly.

STILL YET ANOTHER OBJECT of the present invention is to provide a portable pipe machining tool wherein the scrapping and finishing tool assembly further includes a release assembly that has a cylindrically-shaped rod that passes movably through the elongated, slender, and cylindrically-shaped guide bore in the rectangular-parallelepiped-shaped housing of the scrapping and finishing tool assembly and movably through the corner longitudinal throughbore in the rectangular-shaped plate of the scrapping and finishing tool assembly.

YET STILL ANOTHER OBJECT of the present invention is to provide a portable pipe machining tool wherein the cylindrically-shaped rod of the release assembly of the scrapping and finishing tool assembly is biased from extending past the rectangular-shaped plate of the scrapping and finishing tool assembly, by a spring that is disposed coaxially around the cylindrically-shaped rod of the release assembly of the scrapping and finishing tool assembly, and is positioned in the space in the scrapping and finishing tool assembly.

STILL YET ANOTHER OBJECT of the present invention is to provide a portable pipe machining tool wherein the scrapping and finishing tool assembly further includes a resistance assembly that has a plunger that passes movably into the threaded bore in the rectangular-parallelepiped-shaped housing of the scrapping and finishing tool assembly.

YET STILL ANOTHER OBJECT of the present invention is to provide a portable pipe machining tool wherein the resistance assembly of the scrapping and finishing tool assembly further has a spring that biases the plunger of the resistance assembly of the scrapping and finishing tool assembly inwardly in the threaded bore in the rectangular-parallelepiped-shaped housing of the scrapping and finishing tool assembly.

STILL YET ANOTHER OBJECT of the present invention is to provide a portable pipe machining tool wherein the resistance assembly of the scrapping and finishing tool assembly further has a set screw that threadably engages the threaded bore in the rectangular-parallelepiped-shaped housing of the scrapping and finishing tool assembly, and whose rotation regulates biasing of the spring of the resistance assembly of the scrapping and finishing tool assembly.

YET STILL ANOTHER OBJECT of the present invention is to provide a portable pipe machining tool wherein the scrapping and finishing tool assembly further includes a cylindrically-shaped collar that is disposed coaxially in, for reciprocating movement in, the centrally-disposed and cylindrically-shaped longitudinal throughbore in the rectangular-parallelepiped-shaped housing of the scrapping and finishing tool assembly.

STILL YET ANOTHER OBJECT of the present invention is to provide a portable pipe machining tool wherein the cylindrically-shaped collar of the scrapping and finishing tool assembly has a cylindrically-shaped inner surface with a ratchet surface disposed therearound.

YET STILL ANOTHER OBJECT of the present invention is to provide a portable pipe machining tool wherein the cylindrically-shaped collar of the scrapping and finishing tool assembly further has a proximal end.

STILL YET ANOTHER OBJECT of the present invention is to provide a portable pipe machining tool wherein the scrapping and finishing tool assembly further includes a tab that extends outwardly from the proximal end of the cylindrically-shaped collar of the scrapping and finishing tool assembly, is disposed in the space in the scrapping and finishing tool assembly, and is pivotally mounted to the reciprocating flat arm of the scrapping and finishing tool assembly, by a pivot pin.

YET STILL ANOTHER OBJECT of the present invention is to provide a portable pipe machining tool wherein the scrapping and finishing tool assembly further includes an engagement assembly that passes coaxially through the cylindrically-shaped collar of the scrapping and finishing tool assembly, and selectively engages and disengages the scrapping and finishing tool assembly.

STILL YET ANOTHER OBJECT of the present invention is to provide a portable pipe machining tool wherein the engagement assembly of the scrapping and finishing tool assembly includes an elongated, slender, and cylindrically-shaped shaft that has a proximal end and a threaded distal portion that extends longitudinally through the narrow and rectangular-parallelepiped-shaped recess in the rectangular-parallelepiped-shaped housing of the scrapping and finishing tool assembly and threadably engages the threaded throughbore in the collar of the rectangular-shaped and T-shape in profile plate of the scrapping and finishing tool assembly.

YET STILL ANOTHER OBJECT of the present invention is to provide a portable pipe machining tool wherein the engagement assembly of the scrapping and finishing tool assembly further includes a fixed and cylindrically-shaped clutch part that has a flat distal end and a serrated proximal end, and is fixedly attached to, for rotation with, the threaded distal portion of the elongated, slender, and cylindrically-shaped shaft of the engagement assembly of the scrapping and finishing tool assembly, with the flat distal end of the fixed and cylindrically-shaped clutch part of the engagement assembly of the scrapping and finishing tool assembly abutting against the intermediate face in the rectangular-parallelepiped-shaped housing of the scrapping and finishing tool assembly.

STILL YET ANOTHER OBJECT of the present invention is to provide a portable pipe machining tool wherein the engagement assembly of the scrapping and finishing tool assembly further includes a rotatable and cylindrically-shaped clutch part that contacts the ratchet surface on the cylindrically-shaped inner surface of the cylindrically-shaped collar of the scrapping and finishing tool assembly, and rotates via reciprocating movement of the cylindrically-shaped collar of the scrapping and finishing tool assembly, by virtue of the plunger of the resistance assembly of the scrapping and finishing tool assembly being biased, by the spring of the resistance assembly of the scrapping and finishing tool assembly, against the rotatable and cylindrically-shaped clutch part of the engagement assembly of the scrapping and finishing tool assembly and thereby preventing the rotatable and cylindrically-shaped clutch part of the engagement assembly of the scrapping and finishing tool assembly from rotating back and reciprocating with the cylindrically-shaped collar of the scrapping and finishing tool assembly as the ratchet surface on the cylindrically-shaped inner surface of the cylindrically-shaped collar of the scrapping and finishing tool assembly reciprocates.

YET STILL ANOTHER OBJECT of the present invention is to provide a portable pipe machining tool wherein the rotatable and cylindrically-shaped clutch part of the engagement assembly of the scrapping and finishing tool assembly has a serrated distal end and a flat proximal end, and is rotatably and coaxially attached to, for rotation with when the scrapping and finishing tool assembly is engaged, the elongated, slender, and cylindrically-shaped shaft of the engagement assembly of the scrapping and finishing tool assembly, with the serrated distal end of the rotatable and cylindrically-shaped clutch part of the engagement assembly of the scrapping and finishing tool assembly being in selective engagement with, and disengagement from, the serrated proximal end of the fixed and cylindrically-shaped clutch part of the engagement assembly of the scrapping and finishing tool assembly.

STILL YET ANOTHER OBJECT of the present invention is to provide a portable pipe machining tool wherein the engagement assembly of the scrapping and finishing tool assembly further includes a first spring that is coaxially disposed on the elongated, slender, and cylindrically-shaped shaft of the engagement assembly of the scrapping and finishing tool assembly, between the fixed and cylindrically-shaped clutch part of the engagement assembly of the scrapping and finishing tool assembly and the rotatable and cylindrically-shaped clutch part of the engagement assembly of the scrapping and finishing tool assembly, and biases the rotatable and cylindrically-shaped clutch part of the engagement assembly of the scrapping and finishing tool assembly away from the fixed and cylindrically-shaped clutch part of the engagement assembly of the scrapping and finishing tool assembly.

YET STILL ANOTHER OBJECT of the present invention is to provide a portable pipe machining tool wherein the engagement assembly of the scrapping and finishing tool assembly further includes a rotatable and cylindrically-shaped cam part that has a flat distal end and a cammed proximal end with flats thereon, and is rotatably and coaxially attached to, for rotation with when the scrapping and finishing tool assembly is engaged, the elongated, slender, and cylindrically-shaped shaft of the engagement assembly of the scrapping and finishing tool assembly, with the flat distal end of the rotatable and cylindrically-shaped cam part of the engagement assembly of the scrapping and finishing tool assembly abuttable against, for rotation with when the scrapping and finishing tool assembly is engaged, the flat proximal end of the rotatable and cylindrically-shaped clutch part of the engagement assembly of the scrapping and finishing tool assembly.

STILL YET ANOTHER OBJECT of the present invention is to provide a portable pipe machining tool wherein the engagement assembly of the scrapping and finishing tool assembly further includes a second spring that is coaxially disposed on the elongated, slender, and cylindrically-shaped shaft of the engagement assembly of the scrapping and finishing tool assembly, between, and biases apart, the rotatable and cylindrically-shaped clutch part of the engagement assembly of the scrapping and finishing tool assembly and the rotatable and cylindrically-shaped cam part of the engagement assembly of the scrapping and finishing tool assembly.

YET STILL ANOTHER OBJECT of the present invention is to provide a portable pipe machining tool wherein the engagement assembly of the scrapping and finishing tool assembly further includes a flat and elongated arm that extends fixedly and outwardly from, for rotation with, the rotatable and cylindrically-shaped cam part of the engagement assembly of the scrapping and finishing tool assembly, and has a free end.

STILL YET ANOTHER OBJECT of the present invention is to provide a portable pipe machining tool wherein the flat and elongated arm of the engagement assembly of the scrapping and finishing tool assembly has a first pin that extends fixedly and substantially perpendicularly from the free end of the flat and elongated arm of the engagement assembly of the scrapping and finishing tool assembly, towards the proximal end of the elongated, slender, and cylindrically-shaped shaft of the engagement assembly of the scrapping and finishing tool assembly.

YET STILL ANOTHER OBJECT of the present invention is to provide a portable pipe machining tool wherein the flat and elongated arm of the engagement assembly of the scrapping and finishing tool assembly further has a second pin that extends fixedly and perpendicularly from the flat and elongated arm of the engagement assembly of the scrapping and finishing tool assembly, towards the proximal end of the elongated, slender, and cylindrically-shaped shaft of the engagement assembly of the scrapping and finishing tool assembly, and is inboard of, parallel to, and longer than, the first pin of the flat and elongated arm of the engagement assembly of the scrapping and finishing tool assembly.

STILL YET ANOTHER OBJECT of the present invention is to provide a portable pipe machining tool wherein the engagement assembly of the scrapping and finishing tool assembly further includes a flat and circular-shaped disk that has a distal surface, a proximal surface, and a circular-shaped periphery, and is attached to the proximal end of the elongated, slender, and cylindrically-shaped shaft of the engagement assembly of the scrapping and finishing tool assembly.

YET STILL ANOTHER OBJECT of the present invention is to provide a portable pipe machining tool wherein the flat and circular-shaped disk of the engagement assembly of the scrapping and finishing tool assembly further has a cammed part that is fixedly and coaxially attached to the distal surface of the flat and circular-shaped disk of the engagement assembly of the scrapping and finishing tool assembly, and has flats thereon.

STILL YET ANOTHER OBJECT of the present invention is to provide a portable pipe machining tool wherein the cammed part of the flat and circular-shaped disk of the engagement assembly of the scrapping and finishing tool assembly is complementary to the cammed proximal end of the rotatable and cylindrically-shaped cam part of the engagement assembly of the scrapping and finishing tool assembly, with the flats of the cammed part of the distal surface of the flat and circular-shaped disk of the engagement assembly of the scrapping and finishing tool assembly being abuttable against, for rotation with when the scrapping and finishing tool assembly is engaged, the flats of the cammed proximal end of the rotatable and cylindrically-shaped cam part of the engagement assembly of the scrapping and finishing tool assembly.

YET STILL ANOTHER OBJECT of the present invention is to provide a portable pipe machining tool wherein the flat and circular-shaped disk of the engagement assembly of the scrapping and finishing tool assembly further has an arcuate-shaped throughslot that extends therethrough, in proximity and parallel to, the circular-shaped periphery of the flat and circular-shaped disk of the engagement assembly of the scrapping and finishing tool assembly, and selectively receives the second pin of the flat and elongated arm of the engagement assembly of the scrapping and finishing tool assembly when the scrapping and finishing tool assembly is disengaged.

STILL YET ANOTHER OBJECT of the present invention is to provide a method of operating a parting tool assembly of a portable pipe machining tool to progressively cut a pipe with ends without requiring access to the ends of the pipe that includes the steps of grabbing a first pin of a flat and elongated arm of a engagement assembly of the parting tool assembly in one hand of a user; grabbing a flat and circular-shaped disk of the engagement assembly in another hand of the user; rotating the flat and circular-shaped disk; causing a cammed part of a distal surface of the flat and circular-shaped disk to ride along a cammed proximal end of a rotatable and cylindrically-shaped cam part of the engagement assembly, until flats of the cammed part abut against, for rotation with, flats of the cammed proximal end of the cylindrically-shaped cam part; causing a second pin of the flat and elongated arm to leave an arcuate-shaped through-slot in the flat and circular-shaped disk; causing the rotatable and cylindrically-shaped cam part to separate from the cammed part of the flat and circular-shaped disk, against biasing of a first spring of the engagement assembly and against biasing of a second spring of the engagement assembly; causing the first spring to compress; causing the second spring to compress; causing a flat distal end of the rotatable and cylindrically-shaped cam part to abut against, for rotation with, a flat proximal end of a rotatable and cylindrically-shaped clutch part of the engagement assembly; causing a serrated distal end of the rotatable and cylindrically-shaped clutch part to engage, for rotation with, a serrated proximal end of a fixed and cylindrically-shaped clutch part of the engagement assembly, so that the parting tool assembly is now engaged and ready to progressively cut the pipe; rotating a rotatable cylindrically-shaped frame relative to a fixed cylindrically-shaped frame; causing a first gear of the parting tool assembly to rotate, by virtue of its rotative engagement with gear teeth in a circumferentially-disposed track in a circular-shaped and open distal end of the fixed cylindrically-shaped frame; causing a second gear of the parting tool assembly to rotate, by virtue of its rotative engagement with the first gear; causing an eccentric of the parting tool assembly to rotate, by virtue of it being fixedly attached to the second gear; causing a reciprocating rod of the parting tool assembly to reciprocate in an elongated, slender, and cylindrically-shaped guide bore in a rectangular-parallelepiped-shaped housing of the parting tool assembly, by virtue of it being pivotally mounted at one end to the eccentric; causing a reciprocating block of the parting tool assembly to reciprocate in a cubic-shaped internal chamber in the rectangular-parallelepiped-shaped housing, by virtue of it being pivotally attached to another end of the reciprocating rod; causing a pin of the reciprocating block to reciprocate in the cubic-shaped internal chamber, by virtue of it being attached to the reciprocating block; causing a cylindrically-shaped collar of the parting tool assembly to reciprocate in a centrally-disposed and cylindrically-shaped longitudinal throughbore in the rectangular-parallelepiped-shaped housing of the parting tool assembly, by virtue of a threaded yoke of the parting tool assembly threadably engaging a radially-oriented and threaded bore in a cylindrically-shaped outer surface of the cylindrically-shaped collar which is pivotally mounted to the pin of the reciprocating block by a pivot pin; causing the rotatable and cylindrically-shaped clutch part to rotate, via reciprocating movement of the cylindrically-shaped collar, by virtue of a plunger of a resistance assembly of the parting tool assembly being biased, by a spring of the resistance assembly, against the cylindrically-shaped clutch part and thereby preventing the rotatable and cylindrically-shaped clutch part from rotating back and reciprocating with the cylindrically-shaped collar as a ratchet surface on a cylindrically-shaped inner surface of the cylindrically-shaped collar reciprocates; causing the fixed and cylindrically-shaped clutch part to rotate, by virtue of its engagement with the rotatable and cylindrically-shaped clutch part; causing an elongated, slender, and cylindrically-shaped shaft of the parting tool assembly to rotate, by virtue of it being fixedly attached to the fixed and cylindrically-shaped clutch part; causing an end gear on a distal end of the elongated, slender, and cylindrically-shaped shaft to rotate, by virtue of it being fixedly attached to the elongated, slender, and cylindrically-shaped shaft; causing a large gear of the parting tool assembly to rotate, by virtue of its rotatable engagement with the gear on the distal end of the elongated, slender, and cylindrically-shaped shaft; causing a gear shaft of the parting tool assembly to rotate, by virtue of it being fixedly attached to the large gear; causing a small gear of the parting tool assembly to rotate, by virtue of it being fixedly attached to the gear shaft; causing a rack gear of the parting tool assembly to traverse radially inwardly, by virtue of its engagement with the small gear; causing a generally trapezoidal-shaped upper cover of the parting tool assembly to slide radially along a rectangular-shaped and T-shape in profile intermediate plate of the parting tool assembly, by virtue of it being fixedly attached to the rack gear and having a T-shaped track thereacross that slidingly engages the rectangular-shaped and T-shape in profile intermediate plate; causing a parting tool bit of the parting tool assembly to move radially inwardly, by virtue of it being fixedly attached to the generally trapezoidal-shaped upper cover; causing a wide portion of a cylindrically-shaped release assembly of the parting tool assembly to move radially outwardly in an elongated and slender stop recess in the trapezoidal-shaped upper cover, against biasing of a spring of the cylindrically-shaped release assembly, until the wide portion of the cylindrically-shaped release assembly reaches a tapered portion therein; causing the wide portion of the cylindrically-shaped release assembly to move, against the biasing of the spring of the cylindrically-shaped release assembly; causing the spring of the cylindrically-shaped release assembly to compress; causing a narrow portion of the cylindrically-shaped release assembly to extend past a throughbore in a rectangular-shaped upper cover of the rectangular-parallelepiped-shaped housing; causing the narrow portion of the cylindrically-shaped release assembly to obstruct the flat and elongated arm, and stop its rotation; causing the flats of the cammed part of the distal surface of the flat and circular-shaped disk to ride along the flats of the cammed proximal end of the rotatable and cylindrically-shaped cam part; causing the cammed part of the distal surface of the flat and circular-shaped disk to engage the cammed proximal end of the rotatable and cylindrically-shaped cam part; causing the second pin of the flat and elongated arm to enter the arcuate-shaped throughslot in the flat and circular-shaped disk; causing the second spring of the parting tool assembly to expand; causing the first spring of the parting tool assembly to expand; and, causing the serrated distal end of the rotatable and cylindrically-shaped clutch part to disengage from the serrated proximal end of the fixed and cylindrically-shaped clutch part, by virtue of the first spring of the parting tool assembly expanding, so that the parting tool assembly is now disengaged and the pipe has been progressively cut.

FINALLY, YET STILL ANOTHER OBJECT of the present invention is to provide a method of operating a scrapping and finishing tool assembly of a portable pipe machining tool to scrap and finish a longitudinal outer surface of a pipe with ends without requiring access to the ends of the pipe that includes the steps of loosening a pair of wing nuts of a scrapping and finishing tool bit assembly of the scrapping and finishing tool assembly; rotating a crank of the scrapping and finishing tool bit assembly; causing a crank gear of the scrapping and finishing tool bit assembly to rotate, by virtue of it being fixedly attached to the crank; causing a generally rectangular-parallelepiped-shaped body of the scrapping and finishing tool bit assembly to move radially inwardly on a rectangular-shaped and T-shape in profile plate of the scrapping and finishing tool assembly, by virtue of a rack gear of the scrapping and finishing tool bit assembly being fixedly attached to the generally rectangular-parallelepiped-shaped body which in turn engages the crank gear, until a guide roller of the scrapping and finishing tool bit assembly contacts the longitudinal outer surface of the pipe and a generally square-shaped scrapping and finishing tool bit of the scrapping and finishing tool bit assembly pierces the longitudinal outer surface of the pipe, by virtue of it extending slightly past the guide roller; tightening the pair of wing nuts so as to secure the scrapping and finishing tool bit assembly to the rectangular-shaped and T-shape in profile plate; grabbing a first pin of a flat and elongated arm of an engagement assembly of the scrapping and finishing tool assembly in one hand of a user; grabbing a flat and circular-shaped disk of the engagement assembly in another hand of the user; rotating the flat and circular-shaped disk; causing a cammed part of a distal surface of the flat and circular-shaped disk to ride along a cammed proximal end of a rotatable and cylindrically-shaped cam part of the engagement assembly, until flats of the cammed part abut against, for rotation with, flats of the cammed proximal end of the rotatable and cylindrically-shaped cam part; causing a second pin of the flat and elongated arm to leave an arcuate-shaped throughslot in the flat and circular-shaped disk; causing the cammed proximal end of the rotatable and cylindrically-shaped cam part to separate from the cammed part of the distal surface of the flat and circular-shaped disk, against biasing of a first spring of the engagement assembly and against biasing of a second spring of the engagement assembly; causing the first spring to compress; causing the second spring to compress; causing a flat distal end of the rotatable and cylindrically-shaped cam pact to abut against, for rotation with, a flat proximal end of a rotatable and cylindrically-shaped clutch part of the engagement assembly; causing a serrated distal end of the rotatable and cylindrically-shaped clutch part to engage, for rotation with, a serrated proximal end of a fixed and cylindrically-shaped clutch part of the engagement assembly, so that the scrapping and finishing tool assembly is engaged; rotating a rotatable cylindrically-shaped frame of the portable pipe machining tool relative to a fixed cylindrically-shaped frame of the portable pipe machining tool; causing a first gear of the scrapping and finishing tool assembly to rotate, by virtue of its rotative engagement with gear teeth in a circumferentially-disposed track in a circular-shaped and open distal end of the fixed cylindrically-shaped frame; causing a second gear of the scrapping and finishing tool assembly to rotate, by virtue of its rotative engagement with the first gear; causing an eccentric of the scrapping and finishing tool assembly to rotate, by virtue of it being fixedly attached to the second gear; causing a reciprocating rod of the scrapping and finishing tool assembly to reciprocate in a space in the scrapping and finishing tool assembly, by virtue of it being pivotally mounted at one end to the eccentric; causing a reciprocating flat arm of the scrapping and finishing tool assembly to reciprocate in the space in the scrapping and finishing tool assembly, by virtue of it being pivotally attached to another end of the reciprocating rod; causing a tab of the scrapping and finishing tool assembly to reciprocate in the space in the scrapping and finishing tool assembly, by virtue it being pivotally attached to the reciprocating flat arm; causing a cylindrically-shaped collar of the scrapping and finishing tool assembly to reciprocate in a centrally-disposed and cylindrically-shaped longitudinal throughbore in a rectangular-parallelepiped-shaped housing of the scrapping and finishing tool assembly, by virtue of it being attached to the tab of the scrapping and finishing tool assembly; causing the rotatable and cylindrically-shaped clutch part to rotate, via reciprocating movement of the cylindrically-shaped collar, by virtue of a plunger of a resistance assembly of the scrapping and finishing tool assembly being biased, by a spring of the resistance assembly, against the rotatable and cylindrically-shaped clutch part and thereby preventing the rotatable and cylindrically-shaped clutch part from reciprocating with the cylindrically-shaped collar as a ratchet surface on a cylindrically-shaped inner surface of the cylindrically-shaped collar reciprocates; causing a fixed and cylindrically-shaped clutch part of the engagement assembly to rotate, by virtue of its engagement with the rotatable and cylindrically-shaped clutch part; causing a threaded distal portion of an elongated, slender, and cylindrically-shaped shaft of the engagement assembly to rotate, by virtue of it being fixedly attached to the fixed and cylindrically-shaped clutch part; causing a collar of the rectangular-shaped and T-shape in profile plate to thread along the threaded distal portion of the elongated, slender, and cylindrically-shaped shaft, by virtue of it threadably receiving the threaded distal portion of the elongated, slender, and cylindrically-shaped shaft, and slide longitudinally in a narrow and rectangular-parallelepiped-shaped recess in the rectangular-parallelepiped-shaped housing, by virtue of it being longitudinally slidably mounted in the narrow and rectangular-parallelepiped-shaped recess in the rectangular-parallelepiped-shaped housing; causing the rectangular-shaped and T-shape in profile plate to slide longitudinally in a wide and rectangular-parallelepiped-shaped recess in the rectangular-parallelepiped-shaped housing, by virtue of it being fixedly attached to the collar of the rectangular-shaped and T-shape in profile plate and being longitudinally slidable in the wide and rectangular-parallelepiped-shaped recess in the rectangular-parallelepiped-shaped housing; causing the scrapping and finishing tool bit assembly to slide longitudinally in the wide and rectangular-parallelepiped-shaped recess in the rectangular-parallelepiped-shaped housing, by virtue of it being secured to the rectangular-shaped and T-shape in profile plate; causing a guide roller of the scrapping and finishing tool bit assembly to move longitudinally and roll along the longitudinal outer surface of the pipe, by virtue of it being rotatably mounted in the tool bit head of the scrapping and finishing tool bit assembly; causing a generally square-shaped scrapping and finishing tool bit of the scrapping and finishing tool bit assembly to move longitudinally and rotate and scrap and finish the longitudinal outer surface of the pipe, by virtue of it being rotatably mounted in the tool bit head of the tool bit assembly of the scrapping and finishing tool assembly, until the generally rectangular-parallelepiped-shaped body contacts a cylindrically-shaped rod of a release assembly; causing the cylindrically-shaped rod to move longitudinally in a elongated, slender, and cylindrically-shaped guide bore in the rectangular-parallelepiped-shaped housing and to move longitudinally in a corner longitudinal throughbore in a rectangular-shaped plate of the scrapping and finishing tool assembly, and extend past the rectangular-shaped plate, against the biasing of a spring of the release assembly; causing the spring of the release assembly to compress; causing the cylindrically-shaped rod of the release assembly to obstruct the flat and elongated arm, and stop its rotation; causing the flats of the cammed part of the distal surface of the flat and circular-shaped disk to ride along the flats of the cammed proximal end of the rotatable and cylindrically-shaped cam part; causing the cammed part of the distal surface of the flat and circular-shaped disk to engage the cammed proximal end of the rotatable and cylindrically-shaped cam part; causing the second pin of the flat and elongated arm to enter the arcuate-shaped throughslot in the flat and circular-shaped disk; causing the second spring to expand; causing the first spring to expand; and, causing the serrated distal end of the rotatable and cylindrically-shaped clutch part to disengage from the proximal end of the fixed and cylindrically-shaped clutch part, by virtue of the first spring expanding, so that the scrapping and finishing tool assembly is disengaged and the longitudinal outer surface of the pipe is scrapped and finished.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

FIG. 6 is an enlarged exploded perspective view of the parting tool assembly of the present generally enclosed by the dotted circle identified by arrow 6 in FIG. 1;

Figure 1:
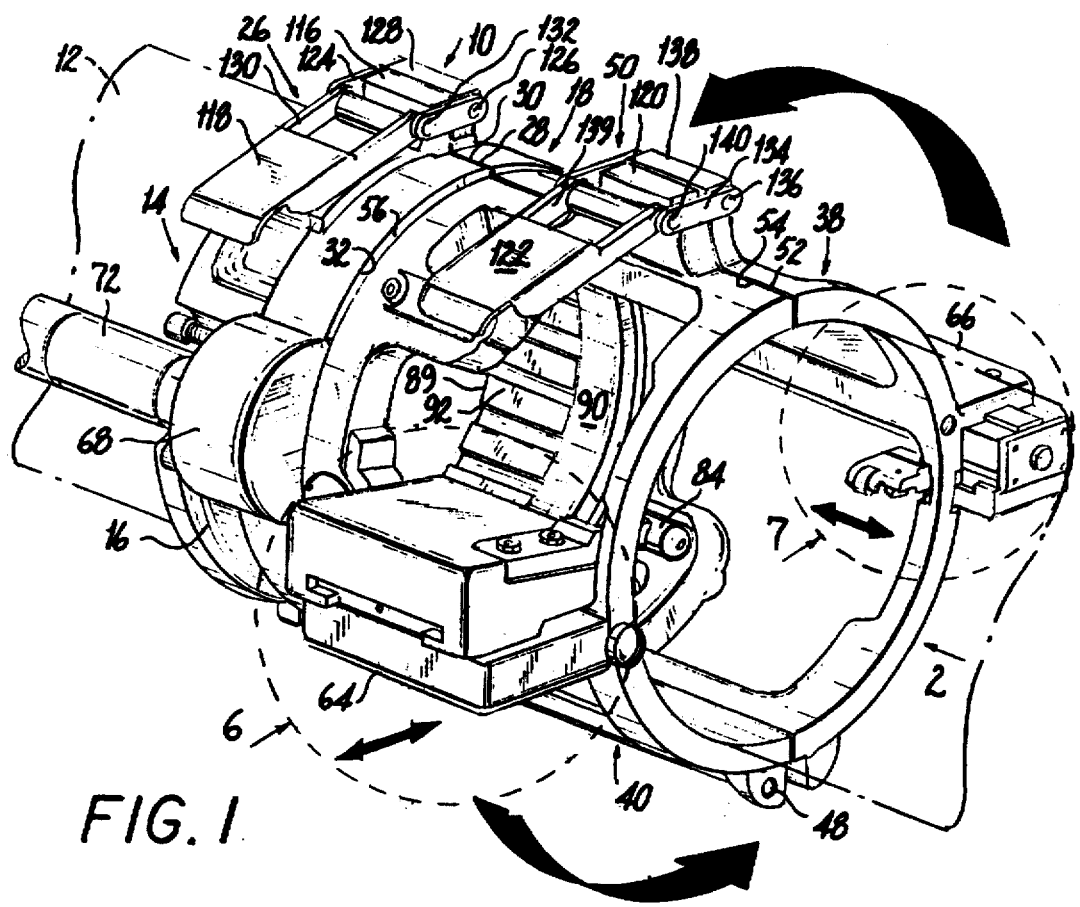
FIG. 1 is a diagrammatic perspective view of the present invention in the closed position and being supported only by a pipe it is simultaneously cutting and scraping.
Figure 4:
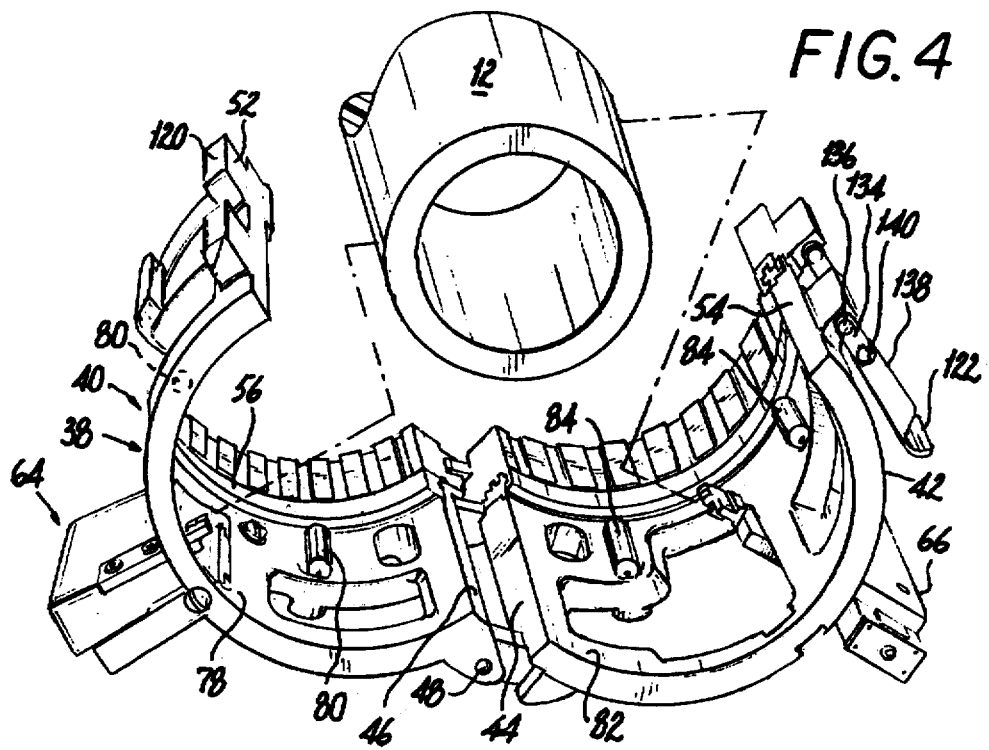
FIG. 4 is a diagrammatic perspective view of the present invention in the open position and being positioned on a pipe.

LIST OF REFERENCE NUMERALS UTILIZED IN THE DRAWING 10 portable pipe machining tool of the present invention
12 pipe
14 fixed cylindrically-shaped frame
16 fixed frame first semi-cylindrically-shaped portion
18 fixed frame second semi-cylindrically-shaped portion
20 fixed frame second portion pivot longitudinal face
22 fixed frame first portion pivot longitudinal face
24 fixed frame pivoting means
26 fixed frame securing means
28 fixed frame first portion opposing securing longitudinal face 30 fixed frame second portion opposing securing longitudinal face
32 fixed frame circular-shaped and open distal end
34 fixed frame distal end circumferentially-disposed track
36 gear teeth
38 rotatable cylindrically-shaped frame
40 rotatable frame first semi-cylindrically-shaped portion
42 rotatable frame second semi-cylindrically-shaped portion
44 rotatable frame second portion pivot longitudinal face
46 rotatable frame first portion pivot longitudinal face
48 rotatable frame pivoting means
50 rotatable frame securing means
52 rotatable frame first portion opposing securing longitudinal face
54 rotatable frame second portion opposing securing longitudinal face
56 circular-shaped and open proximal end
58 rotatable frame proximal end collar
60 rotatable frame proximal end ring gear
62 rotatable frame proximal end substantially I-shaped track
64 parting tool assembly
66 scrapping and finishing tool assembly
68 substantially semi-cylindrically-shaped power housing portion
70 power housing portion cylindrically-shaped aperture
72 cylindrically-shaped motor
74 motor slender motor shaft
76 motor shaft motor driver gear
78 rotatable frame first portion inner surface
80 rotatable frame first portion inner surface pair of longitudinally-oriented roller bearings
82 rotatable frame second portion inner surface
84 rotatable frame second portion inner surface pair of longitudinally-oriented roller bearings
86 fixed frame first portion inner surface
88 fixed frame first portion inner surface semi-circular-shaped band of alternating trapezoidal-shaped hills and valleys
90 fixed frame circular-shaped and open proximal end
92 fixed frame second portion inner surface fixed frame second portion inner surface semi-circular-shaped band of alternating trapezoidal-shaped hills and valleys
94 fixed frame pivoting means first portion pair of parallel, and slightly spaced-apart, and longitudinally disposed tabs
96 fixed fame pivoting means first portion tab longitudinally aligned throughbore
98 fixed frame pivoting means second portion tab
100 fixed frame pivoting means second portion tab longitudinally-oriented throughbore
102 fixed frame pivoting means pivot pin
104 rotatable frame pivoting means first portion pair of parallel, and spaced-apart, and longitudinally disposed tabs
106 rotatable frame circular-shaped and open distal end
108 rotatable fame pivoting means first portion tab longitudinally aligned throughbore
110 rotatable frame pivoting means second portion pair of parallel, and slightly spaced-apart, and longitudinally disposed tabs 110
112 rotatable frame pivoting means second portion tab longitudinally aligned throughbore
114 rotatable frame pivoting means pivot pin
116 fixed frame securing means first portion substantially trapezoidal-shaped catch part
118 fixed frame securing means second portion latch part
120 rotatable frame securing means first portion substantially trapezoidal-shaped catch part
122 rotatable frame securing means second portion latch part
124 fixed frame securing means second portion latch part first square-shaped pivot link
126 fixed frame securing means second portion latch part first pivot link first pivot pin
128 fixed frame securing means second portion latch part pivot link substantially trapezoidal-shaped block
130 fixed frame securing means second portion latch part second rectangular-shaped handle pivot link
132 fixed frame securing means second portion latch part second pivot link second pivot pin
134 rotatable frame securing means second portion latch part first square-shaped pivot link
136 rotatable frame securing means second portion latch part first pivot link first pivot pin
138 a rotatable frame securing means second portion latch part pivot link substantially trapezoidal-shaped block
139 rotatable frame securing means second portion latch part second rectangular-shaped handle pivot link
140 rotatable frame securing means second portion latch part second pivot link second pin
142 parting tool assembly rectangular-parallelepiped-shaped housing
144 parting tool assembly housing innermost face
146 parting tool assembly outermost face
148 parting tool assembly housing rearwardmost face
150 parting tool assembly housing forwardmost face
152 parting tool assembly housing upper face
154 parting tool assembly housing lower face
156 parting tool assembly housing centrally-disposed and cylindrically-shaped longitudinal throughbore
158 parting tool assembly housing cubic-shaped internal chamber
160 parting tool assembly housing elongated, slender, and cylindrically-shaped guide bore
162 parting tool assembly housing longitudinal throughbore
164 parting tool assembly housing upper face pair of threaded bores
168 parting tool assembly housing rectangular-shaped lower cover
170 parting tool assembly housing lower cover screws parting tool assembly housing lower cover centrally-disposed throughbore
172 parting tool assembly housing lower cover throughbore
174 parting tool assembly rectangular-shaped and T-shape in profile intermediate plate
176 parting tool assembly intermediate plate mounting screws
178 parting tool assembly intermediate plate mounting throughbores
180 parting tool assembly intermediate plate upper face
182 parting tool assembly intermediate plate upper face figure 8-shaped recess
184 parting tool assembly intermediate plate upper face figure 8-shaped recess major circle portion
186 parting tool assembly intermediate plate upper face figure 8-shaped recess minor circle portion
188 parting tool assembly intermediate plate upper face figure 8-shaped recess major circle portion throughbore
190 parting tool assembly intermediate plate upper face figure 8-shaped recess minor circle portion throughbore
192 parting tool assembly intermediate plate T-shaped outermost face
194 parting tool assembly intermediate plate outermost face threaded throughbore
196 parting tool assembly large gear 198 parting tool assembly gear shaft
200 parting tool assembly small gear
202 parting tool assembly generally trapezoidal-shaped upper cover
204 parting tool assembly upper cover T-shaped track
206 parting tool assembly upper cover inner surface
208 parting tool assembly rack gear
209 parting tool assembly upper cover outermost face
210 that has parting tool assembly rack gear pins
211 pair of parting tool assembly upper cover inner surface throughbores
212 parting tool assembly parting tool bit
213 parting tool assembly upper cover inner surface elongated and slender stop recess
214 parting tool assembly upper cover innermost face
215 parting tool assembly parting tool mounting screws and nuts
216 parting tool assembly rotatable frame first gear
218 parting tool assembly rotatable frame second gear
220 parting tool assembly rotatable frame second gear eccentric
222 rotatable frame threaded cap
224 parting tool assembly reciprocating rod
226 parting tool assembly reciprocating block
228 parting tool assembly reciprocating block pin
230 parting tool assembly cylindrically-shaped release assembly
232 parting tool assembly release assembly narrow portion
234 parting tool assembly release assembly wide portion
236 parting tool assembly release assembly spring
238 parting tool assembly resistance assembly
240 parting tool assembly resistance assembly plunger
242 parting tool assembly resistance assembly spring
244 parting tool assembly resistance assembly set screw
246 parting tool assembly cylindrically-shaped collar
248 parting tool assembly collar cylindrically-shaped inner surface
250 parting tool assembly collar cylindrically-shaped inner surface ratchet surface
252 parting tool assembly collar cylindrically-shaped outer surface
254 parting tool assembly collar outer surface radially-oriented and threaded bore
256 parting tool assembly threaded yoke
258 parting tool assembly yoke pivot pin
260 parting tool assembly engagement assembly
262 parting tool assembly engagement assembly elongated, slender, and cylindrically-shaped shaft
264 parting tool assembly engagement assembly shaft proximal end
266 parting tool assembly engagement assembly shaft distal end
268 parting tool assembly engagement assembly distal end gear
270 parting tool assembly engagement assembly fixed and cylindrically-shaped clutch part
272 parting tool assembly engagement assembly fixed clutch part flat distal end
274 parting tool assembly engagement assembly fixed clutch part serrated proximal end
276 parting tool assembly engagement assembly rotatable and cylindrically-shaped clutch part
278 parting tool assembly engagement assembly rotatable clutch part serrated distal end
280 parting tool assembly engagement assembly rotatable clutch part flat proximal end
282 parting tool assembly engagement assembly first spring
284 parting tool assembly engagement assembly rotatable and cylindrically-shaped cam part
286 parting tool assembly engagement assembly rotatable cam part flat distal end
288 parting tool assembly engagement assembly rotatable cam part cammed proximal end
290 parting tool assembly engagement assembly rotatable cam part cammed proximal end flats
292 parting tool assembly engagement assembly second spring
294 parting tool assembly engagement assembly flat and elongated arm
296 parting tool assembly engagement assembly arm free end
298 parting tool assembly engagement assembly arm free end first pin
300 parting tool assembly engagement assembly arm second pin
302 parting tool assembly engagement assembly flat and circular-shaped disk
304 parting tool assembly engagement assembly disk distal surface
306 parting tool assembly engagement assembly disk proximal surface
308 parting tool assembly engagement assembly disk circular-shaped periphery
310 parting tool assembly engagement assembly disk proximal surface collar
312 parting tool assembly engagement assembly collar radially-oriented and threaded throughbore
314 parting tool assembly engagement assembly collar set screw
316 parting tool assembly engagement assembly disk distal surface cammed part
318 parting tool assembly engagement assembly disk distal surface cammed part flats
320 parting tool assembly engagement assembly disk arcuate-shaped throughslot
322 scrapping and finishing tool assembly rectangular-parallelepiped-shaped housing
324 scrapping and finishing tool housing innermost face
326 scrapping and finishing tool assembly housing outermost face
328 scrapping and finishing tool assembly housing rearwardmost face
329 scrapping and finishing tool assembly housing rearwardmost face pair of threaded bores
330 scrapping and finishing tool assembly housing forwardmost face
332 scrapping and finishing tool assembly housing upper face
334 scrapping and finishing tool assembly housing lower Lace
336 scrapping and finishing tool assembly housing centrally-disposed and cylindrically-shaped longitudinal throughbore
338 scrapping and finishing tool assembly housing wide and rectangular-parallelepiped-shaped recess
340 scrapping and finishing tool assembly housing wide recess intermediate face
342 scrapping and finishing tool assembly housing narrow and rectangular-parallelepiped-shaped recess
344 scrapping and finishing tool assembly housing elongated, slender, and cylindrically-shaped guide bore
345 scrapping and finishing tool assembly housing threaded bore
346 scrapping and finishing tool assembly rectangular-shaped plate 348 scrapping and finishing tool assembly plate space
350 scrapping and finishing tool assembly plate pair of screws
352 scrapping and finishing tool assembly plate pair of throughbores
354 scrapping and finishing tool assembly plate centrally disposed longitudinal throughbore
356 scrapping and finishing tool assembly plate corner longitudinal throughbore
358 scrapping and finishing tool assembly rectangular-shaped and T-shape in profile plate
360 scrapping and finishing tool assembly plate upper face
362 scrapping and finishing tool assembly plate lower face
364 scrapping and finishing tool assembly plate collar
366 scrapping and finishing tool assembly plate collar threaded throughbore
368 scrapping and finishing tool assembly plate pair of threaded rods
370 scrapping and finishing tool assembly scrapping and finishing tool bit assembly
372 scrapping and finishing tool assembly scrapping and finishing tool bit assembly generally rectangular-parallelepiped-shaped body
374 scrapping and finishing tool assembly scrapping and finishing tool bit assembly body upper face
376 scrapping and finishing tool assembly scrapping and finishing tool bit assembly body upper face recess
378 scrapping and finishing tool assembly scrapping and finishing tool bit assembly body pair of elongated and radially-aligned throughbores
380 scrapping and finishing tool assembly scrapping and finishing tool bit assembly body lower face
382 scrapping and finishing tool assembly scrapping and finishing tool bit assembly rack gear
384 scrapping and finishing tool assembly scrapping and finishing tool bit assembly crank
386 scrapping and finishing tool assembly scrapping and finishing tool bit assembly crank throughbore
388 scrapping and finishing tool assembly scrapping and finishing tool bit assembly crank gear
390 scrapping and finishing tool assembly scrapping and finishing tool bit assembly pair of wing nuts
392 scrapping and finishing tool assembly scrapping and finishing tool bit assembly tool bit head block
394 scrapping and finishing tool assembly scrapping and finishing tool bit assembly tool bit head block innermost face
396 scrapping and finishing tool assembly scrapping and finishing tool bit assembly tool bit head block innermost face rectangular-parallelepiped-shaped recess
398 scrapping and finishing tool assembly scrapping and finishing tool bit assembly tool bit head block clearance throughbore
400 scrapping and finishing tool assembly scrapping and finishing tool bit assembly tool bit head block outermost face
402 scrapping and finishing tool assembly scrapping and finishing tool bit assembly tool bit head
404 scrapping and finishing tool assembly scrapping and finishing tool bit assembly tool bit head outermost face
406 scrapping and finishing tool assembly scrapping and finishing tool bit assembly tool bit head rectangularparallele-piped-shaped slide block
408 scrapping and finishing tool assembly scrapping and finishing tool bit assembly tool bit head allen bolt
410 scrapping and finishing tool assembly scrapping and finishing tool bit assembly spring
412 scrapping and finishing tool assembly scrapping and finishing tool bit assembly tool bit head innermost face
414 scrapping and finishing tool assembly scrapping and finishing tool bit assembly tool bit head innermost face slot
416 scrapping and finishing tool assembly scrapping and finishing tool bit assembly guide roller
418 scrapping and finishing tool assembly scrapping and finishing tool bit assembly guide ring pivot pin
420 scrapping and finishing tool assembly scrapping and finishing tool bit assembly generally square-shaped scrapping and finishing tool bit
422 scrapping and finishing tool assembly scrapping and finishing tool bit assembly tool bit head recess
424 scrapping and finishing tool assembly scrapping and finishing tool bit assembly tool bit pivot pin
426 scrapping and finishing tool assembly rotatable frame first gear
428 scrapping and finishing tool assembly rotatable frame second gear
430 scrapping and finishing tool assembly rotatable frame second gear eccentric
432 scrapping and finishing tool assembly reciprocating rod
434 scrapping and finishing tool assembly reciprocating flat arm
436 scrapping and finishing tool assembly release assembly
438 scrapping and finishing tool assembly release assembly cylindrically-shaped rod
440 scrapping and finishing tool assembly release assembly spring
442 scrapping and finishing tool assembly resistance assembly
444 scrapping and finishing tool assembly resistance assembly plunger
446 scrapping and finishing tool assembly resistance assembly spring
448 scrapping and finishing tool assembly resistance assembly set screw
450 scrapping and finishing tool assembly cylindrically-shaped collar
452 scrapping and finishing tool assembly collar cylindrically-shaped inner surface
454 scrapping and finishing tool assembly collar cylindrically-shaped inner surface ratchet surface
456 scrapping and finishing tool assembly collar proximal end
458 scrapping and finishing tool assembly tab
460 scrapping and finishing tool assembly tab pivot pin
462 scrapping and finishing tool assembly engagement assembly
464 scrapping and finishing tool assembly engagement assembly elongated, slender, and cylindrically-shaped shaft
466 scrapping and finishing tool assembly engagement assembly shaft proximal end
468 scrapping and finishing tool assembly engagement assembly shaft threaded distal portion
470 scrapping and finishing tool assembly engagement assembly fixed and cylindrically-shaped clutch part
472 scrapping and finishing tool assembly engagement assembly fixed clutch part flat distal end
474 scrapping and finishing tool assembly engagement assembly fixed clutch part serrated proximal end
476 scrapping and finishing tool assembly engagement assembly rotatable and cylindrically-shaped clutch part
478 scrapping and finishing tool assembly engagement assembly rotatable clutch part serrated distal end 480 scrapping and finishing tool assembly engagement assembly rotatable clutch part flat proximal end
482 scrapping and finishing tool assembly engagement assembly first spring
484 scrapping and finishing tool assembly engagement assembly rotatable and cylindrically-shaped cam part
486 scrapping and finishing tool assembly engagement assembly rotatable cam part flat distal end
488 scrapping and finishing tool assembly engagement assembly rotatable cam part cammed proximal end
490 scrapping and finishing tool assembly engagement assembly rotatable cam part cammed proximal end flats
492 scrapping and finishing tool assembly engagement assembly second spring
484 scrapping and finishing tool assembly engagement assembly flat and elongated arm
486 scrapping and finishing tool assembly engagement assembly arm free end
498 scrapping and finishing tool assembly engagement assembly arm free end first pin
500 scrapping and finishing tool assembly engagement assembly arm second pin
502 scrapping and finishing tool assembly engagement assembly flat and circular-shaped disk
504 scrapping and finishing tool assembly engagement assembly disk distal surface
506 scrapping and finishing tool assembly engagement assembly disk proximal surface
508 scrapping and finishing tool assembly engagement assembly disk circular-shaped periphery
516 scrapping and finishing tool assembly engagement assembly disk distal surface cammed part
518 scrapping and finishing tool assembly engagement assembly disk distal surface cammed part flats
520 scrapping and finishing tool assembly engagement assembly disk arcuate-shaped throughslot

DETAILED DESCRIPTION OF THE PREFERRED EMBODIMENT

Figure 2:
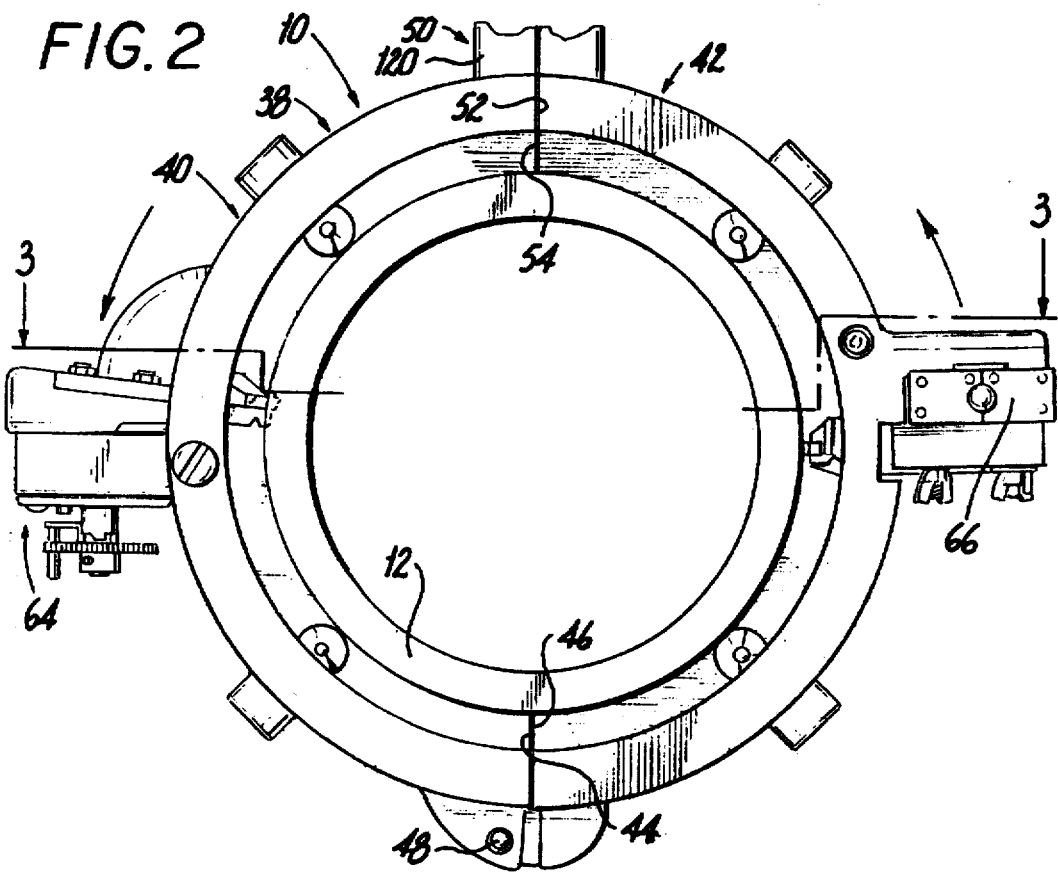
FIG. 2 is an enlarged diagrammatic front elevational view taken generally in the direction of arrow 2 in FIG. 1.
Figure 3:
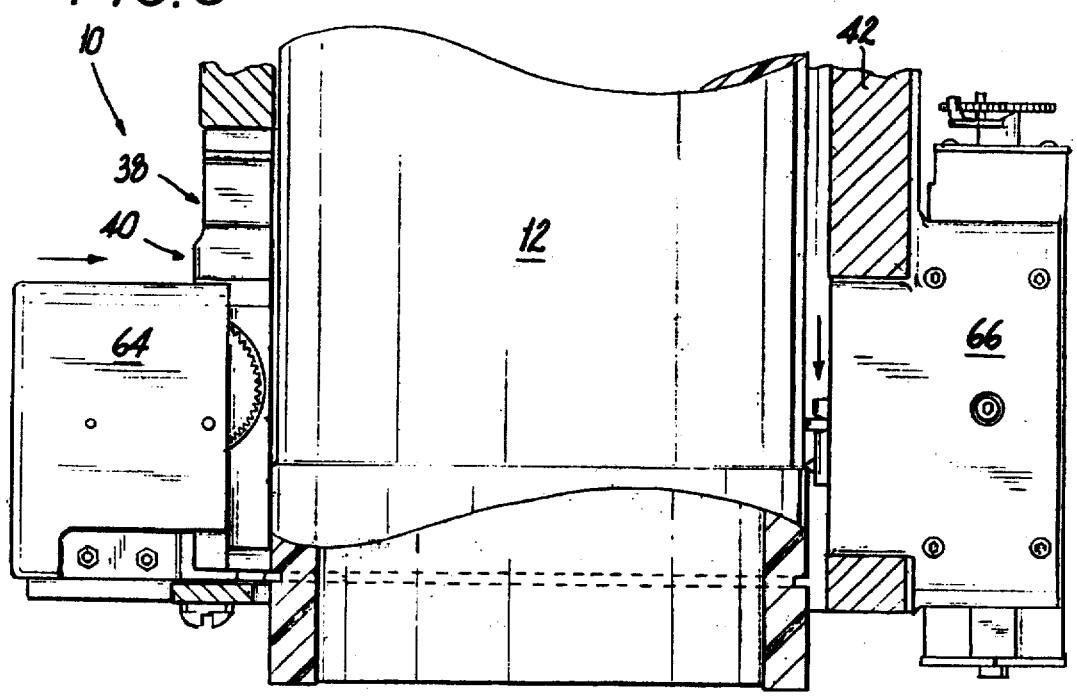
FIG. 3 is a cross section view taken along line 3—3 in FIG. 2.
Figure 5:
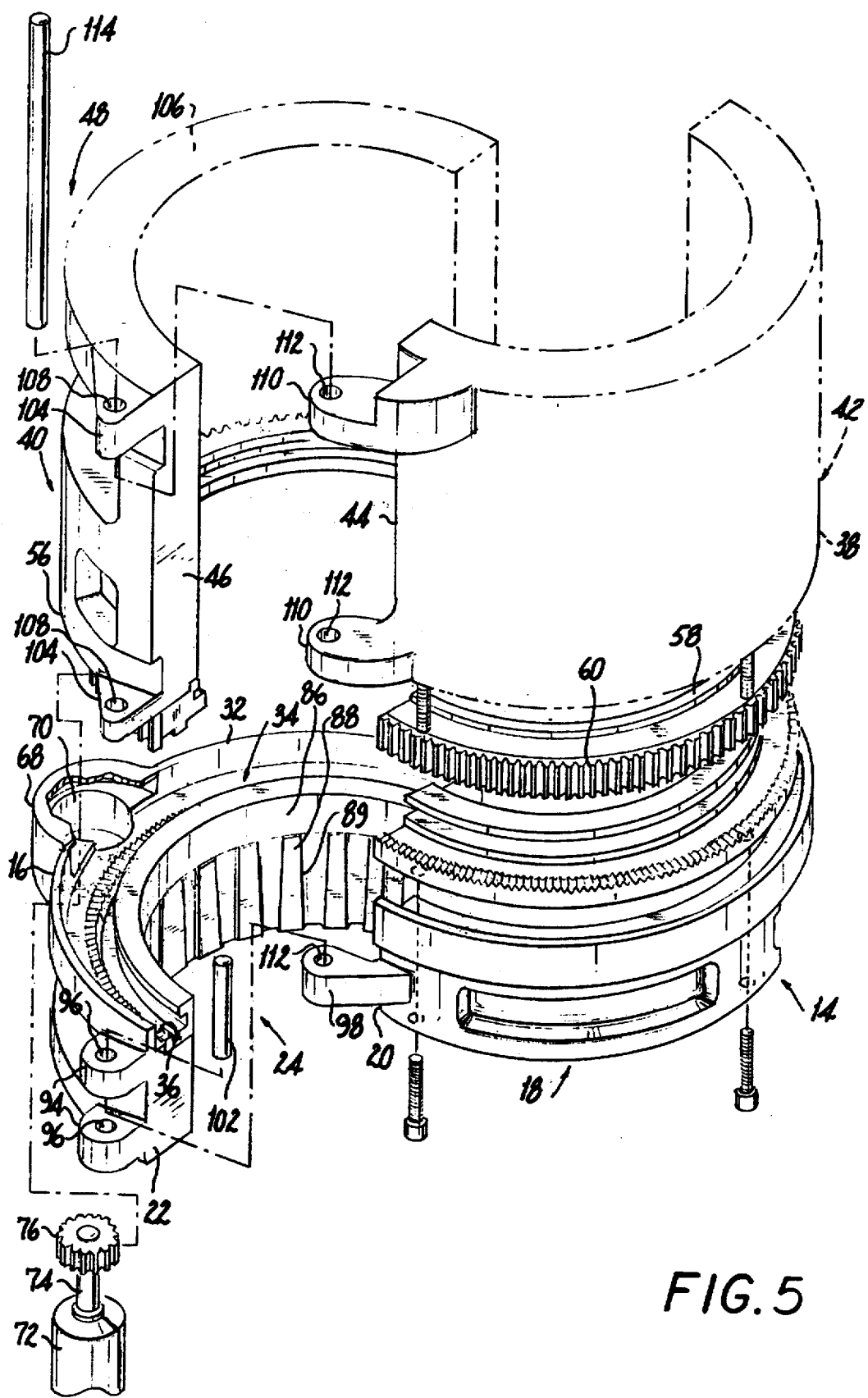
FIG. 5 is an enlarged perspective view of the hinging mechanism for allowing the present invention to selectively achieve the open and closed positions.

Referring now to the figures in which like numerals indicate like parts, and particularly to FIGS. 1–3, which are a diagrammatic perspective view of the present invention in the closed position and being supported only by a pipe it is simultaneously cutting and scraping, an enlarged diagrammatic front elevational view taken generally in the direction of arrow 2 in FIG. 1, and is a cross section view taken along line 3—3 in FIG. 2, respectively, the portable pipe machining tool of the present invention is shown generally at 10, in the closed position, and being supported by only a pipe 12 it is simultaneously cutting and scraping.

The configuration of the portable pipe machining tool 10 can best be seen in FIGS. 1–5, which are a diagrammatic perspective view of the present invention in the closed position and being supported only by a pipe it is simultaneously cutting and scraping, an enlarged diagrammatic front elevational view taken generally in the direction of arrow 2 in FIG. 1, a cross section view taken along line 3—3 in FIG. 2, a diagrammatic perspective view of the present invention in the open position and being positioned on a pipe, and an enlarged perspective view of the hinging mechanism for allowing the present invention to selectively achieve the open and closed positions, respectively, and as such will be discussed with reference thereto.

The portable pipe machining tool 10 includes a fixed cylindrically-shaped frame 14 that is fixedly attachable to a portion of the pipe 12.

The fixed cylindrically-shaped frame 14 has a fixed frame first semi-cylindrically-shaped portion 16 and a fixed frame second semi-cylindrically-shaped portion 18 that is pivotally mounted, at a fixed frame second portion pivot longitudinal face 20 of the fixed frame second semi-cylindrically-shaped portion 18 of the fixed cylindrically-shaped frame 14, to a fixed frame first portion pivot longitudinal face 22 of the fixed frame first semi-cylindrically-shaped portion 16 of the fixed cylindrically-shaped frame 14, by fixed frame pivoting means 24 so as to allow the fixed cylindrically-shaped frame 14 to have an open position where the fixed cylindrically-shaped frame 14 is placable around the pipe 12 without having to have an end of the pipe 12 accessible and a closed position where the fixed cylindrically-shaped frame 14 is fixedly abutted against, and supported only by, the pipe 12.

The fixed cylindrically-shaped frame 14 is selectively maintained in the closed position by fixed frame securing means 26 disposed at a fixed frame first portion opposing securing longitudinal face 28 of the fixed frame first semi-cylindrically-shaped portion 16 of the fixed cylindrically-shaped frame 14, which is diametrically opposing to the fixed frame first portion pivot longitudinal face 22 of the fixed frame first semi-cylindrically-shaped portion 16 of the fixed cylindrically-shaped frame 14 and at a fixed frame second portion opposing securing longitudinal face 30 of the fixed frame second semi-cylindrically-shaped portion 18 of the fixed cylindrically-shaped frame 14, which is diametrically opposing to the fixed frame second portion pivot longitudinal face 20 of the fixed frame second semi-cylindrically-shaped portion 18 of the fixed cylindrically-shaped frame 14.

The fixed cylindrically-shaped frame 14 further has a fixed frame circular-shaped and open distal end 32 with a fixed frame distal end circumferentially-disposed track 34 disposed circumferentially therearound.

The fixed frame distal end circumferentially-disposed track 34 in the fixed frame circular-shaped and open distal end 32 of the fixed cylindrically-shaped frame 14 has gear teeth 36 disposed circumferentially therearound and extending longitudinally therein.

The portable pipe machining tool 10 further includes a rotatable cylindrically-shaped frame 33 that is rotatably attachable to an adjacent portion of the pipe 12 and rotatably connected to the fixed cylindrically-shaped frame 14.

The rotatable cylindrically-shaped frame 38 has a rotatable frame first semi-cylindrically-shaped portion 40 and a rotatable frame second semi-cylindrically-shaped portion 42 that is pivotally mounted, at a rotatable frame second portion pivot longitudinal face 44 of the rotatable frame second semi-cylindrically-shaped portion 42 of the rotatable cylindrically-shaped frame 38, to a rotatable frame first portion pivot longitudinal face 46 of the rotatable frame first semi-cylindrically-shaped portion 40 of the rotatable cylindrically-shaped frame 38, by rotatable frame pivoting means 48 so as to allow the rotatable cylindrically-shaped frame 38 to have an open position where the rotatable cylindrically-shaped frame 38 is placable around the adjacent portion of the pipe 12 without having to have an end of the pipe 12 accessible and a closed portion where the rotatable cylindrically-shaped frame 38 is rotatably abutted against, and supported only by, the adjacent portion of the pipe 12.

The rotatable cylindrically-shaped frame 38 is selectively maintained in the closed position by rotatable frame securing means 50 disposed at a rotatable frame first portion opposing securing longitudinal face 52 of the rotatable frame first semi-cylindrically-shaped portion 40 of the rotatable cylindrically-shaped frame 38, which is diametrically opposing to the rotatable frame first portion pivot longitudinal face 46 of the rotatable frame first semi-cylindrically-shaped portion 40 of the rotatable cylindrically-shaped frame 38, and at a rotatable frame second portion opposing securing longitudinal face 54 of the rotatable frame second semi-cylindrically-shaped portion 42 of the rotatable cylindrically-shaped frame 38, which is diametrically opposing to the rotatable frame second portion pivot longitudinal face 44 of the rotatable frame second semi-cylindrically-shaped portion 42 of the rotatable cylindrically-shaped frame 38.

The rotatable cylindrically-shaped frame 38 further has a circular-shaped and open proximal end 56 with a rotatable frame proximal end collar 58 disposed circumferentially therearound and extending coaxially and longitudinally therefrom.

The rotatable cylindrically-shaped frame 38 further has a rotatable frame proximal end ring gear 60 disposed circumferentially around, and extending coaxially and longitudinally from, the rotatable frame proximal end collar 58 of the circular-shaped and open proximal end 56 of the rotatable cylindrically-shaped frame 38.

The rotatable cylindrically-shaped frame 38 further has a rotatable frame proximal end substantially I-shaped track 62 disposed circumferentially around, and extending coaxially and longitudinally from, the rotatable frame proximal end ring gear 60 of the circular-shaped and open proximal end 56 of the rotatable cylindrically-shaped frame 38, and has at least a portion thereof rotatably engaging the fixed frame distal end circumferentially-disposed track 34 in the fixed frame circular-shaped and open distal end 32 of the fixed cylindrically-shaped frame 14 so as to allow the rotatable cylindrically-shaped frame 38 to rotate relative to the fixed cylindrically-shaped frame 14.

The portable pipe machining tool 10 further includes a parting tool assembly 64 that extends radially along the rotatable frame first semi-cylindrically-shaped portion 40 of the rotatable cylindrically-shaped frame 38 and is selectively engagable and disengagable, and when engaged has a portion thereof moving radially inwardly and progressively cutting into the pipe 12 as the rotatable cylindrically-shaped frame 38 rotates relative to the fixed cylindrically-shaped frame 14.

The portable pipe machining tool 10 further includes a scrapping and finishing tool assembly 66 extending radially along the rotatable frame second semi-cylindrically-shaped portion 42 of the rotatable cylindrically-shaped frame 38, diametrically opposing the parting tool assembly 64, and is selectively engagable and disengagable, and when engaged has a portion thereof moving longitudinally along the pipe 12 and scraping and finishing an longitudinal outer surface of the adjacent portion of the pipe 12 as the rotatable cylindrically-shaped frame 38 rotates relative to the fixed cylindrically-shaped frame 14, and is simultaneously operable with the parting tool assembly 64 so as to cut, scrape, and finish the pipe 12 simultaneously as the rotatable cylindrically-shaped frame 38 rotates relative to the fixed cylindrically-shaped frame 14.

The fixed cylindrically-shaped frame 14 further has a substantially semi-cylindrically-shaped power housing portion 68 that extends radially from the fixed frame circular-shaped and open distal end 32 of the fixed cylindrically-shaped frame 14, on the fixed frame first semi-cylindrically-shaped portion 16 of the fixed cylindrically-shaped frame 14, and terminates in a power housing portion cylindrically-shaped aperture 70 that extends longitudinally therein.

The portable pipe machining tool 10 further includes a cylindrically-shaped motor 72 which is one of hydraulic and air.

A motor slender motor shaft 74 extends coaxially from the cylindrically-shaped motor 72, and terminates with a motor shaft motor driver gear 76.

The cylindrically-shaped motor 72 is longitudinally disposed, and replaceably attached, to the substantially semi-cylindrically-shaped power housing portion 68, with the motor shaft motor driver gear 76 of the motor slender motor shaft 74 of the cylindrically-shaped motor 72 replaceably positioned in the power housing portion cylindrically-shaped aperture 70 in the substantially semi-cylindrically-shaped power housing portion 68 on the fixed frame circular-shaped and distal end 32 of the fixed cylindrically-shaped frame 14, and rotatably engages the rotatable frame proximal end ring gear 60 of the circular-shaped and open proximal end 56 of the rotatable cylindrically-shaped frame 38.

The fixed frame distal end circumferentially-disposed track 34 in the fixed cylindrically-shaped frame 14 is substantially "+" shaped in profile.

The rotatable frame first semi-cylindrically-shaped portion 40 of the rotatable cylindrically-shaped frame 38 has a rotatable frame first portion inner surface 78 with a rotatable frame first portion inner surface pair of longitudinally-oriented roller bearings 80 rotatably mounted therein, and straddling the portion of the parting tool assembly 64 so as to facilitate the rotation of the rotatable cylindrically-shaped frame 38 on the adjacent portion of the pipe 12.

The rotatable frame second semi-cylindrically-shaped portion 42 of the rotatable cylindrically-shaped frame 38 has a rotatable frame second portion inner surface 82 with a rotatable frame second portion inner surface pair of longitudinally-oriented roller bearings 84 rotatably mounted therein, and straddling the portion of the scrapping and finishing tool assembly 66 so as to facilitate the rotation of the rotatable cylindrically-shaped frame 38 on the adjacent portion of the pipe 12.

The fixed frame first semi-cylindrically-shaped portion 16 of the fixed cylindrically-shaped frame 14 has a fixed frame first portion inner surface 86 with a fixed frame first portion inner surface semi-circular-shaped band of alternating trapezoidal-shaped hills and valleys 88 disposed thereon, in proximity to the fixed frame circular-shaped and open distal end 32 of the fixed cylindrically-shaped frame 14, which extend to a fixed frame circular-shaped and open proximal end 89 of the fixed cylindrically-shaped frame 14, and eliminates damage to the pipe 12 when the fixed cylindrically-shaped frame 14 is fixedly abutted against the pipe 12.

The fixed frame second semi-cylindrically-shaped portion 18 of the fixed cylindrically-shaped frame 14 has a fixed frame second portion inner surface 90 with a fixed frame second portion inner surface semi-circular-shaped band of alternating trapezoidal-shaped hills and valleys 92 disposed thereon, in proximity to the fixed frame circular-shaped and open distal end 32 of the fixed cylindrically-shaped frame 14, which extends to the fixed frame circular-shaped and open proximal end 89 of the fixed cylindrically-shaped frame 14, and eliminates damage to the pipe 12 when the fixed cylindrically-shaped frame 14 is fixedly abutted against the pipe 12.

The fixed frame pivoting means 24 includes fixed frame pivoting means first portion pair of parallel, and slightly spaced-apart, and longitudinally disposed tabs 94 that extend radially outwardly from the fixed frame first semi-cylindrically-shaped portion 16 of the fixed cylindrically-shaped frame 14, substantially flush with the fixed frame first portion pivot longitudinal face 22 of the fixed frame first semi-cylindrically-shaped portion 16 of the fixed cylindrically-shaped frame 14, and in proximity to the fixed frame circular-shaped and open distal end 32 of the fixed cylindrically-shaped frame 14.

Each tab of the fixed frame pivoting means first portion pair of parallel, and slightly spaced-apart, and longitudinally disposed tabs 94 of the fixed frame pivoting means 24 has a fixed fame pivoting means first portion tab longitudinally aligned throughbore 96 that extends longitudinally therethrough.

The fixed frame pivoting means 24 further includes fixed frame pivoting means second portion tab 98 that extends substantially radially outwardly from the fixed frame second semi-cylindrically-shaped portion 18 or the fixed cylindrically-shaped frame 14, substantially flush with, and extending circumferentially past, the fixed frame second portion pivot longitudinal face 20 of the fixed frame second semi-cylindrically-shaped portion 18 of the fixed cylindrically-shaped frame 14, and in proximity to the fixed frame circular-shaped and open distal end 32 of the fixed cylindrically-shaped frame 14.

The fixed frame pivoting means second portion tab 98 of the fixed frame pivoting means 24 has a fixed frame pivoting means second portion tab longitudinally-oriented throughbore 100 that extends longitudinally therethrough.

The fixed frame pivoting means first portion pair of parallel, and slightly spaced-apart, and longitudinally disposed tabs 94 of the fixed frame pivoting means 24 replaceably receive therebetween the fixed frame pivoting means second portion tab 98 of the fixed frame pivoting means 24.

The fixed frame pivoting means second portion tab 98 of the fixed frame pivoting means 24 is replaceably maintained between the fixed frame pivoting means first portion pair of parallel, and slightly spaced-apart, and longitudinally disposed tabs 94 of the fixed frame pivoting means 24 by a fixed frame pivoting means pivot pin 102 that passes frictionally and replaceably through the fixed frame pivoting means first portion tab longitudinally aligned throughbore 96 in each tab of the fixed frame pivoting means first portion pair of parallel, and slightly spaced-apart, and longitudinally disposed tabs 94 of the fixed frame pivoting means 24 and frictionally and replaceably through the fixed frame pivoting means second portion tab longitudinally-oriented throughbore 100 in the fixed frame pivoting means second portion tab 98 of the fixed frame pivoting means 24.

The rotatable frame pivoting means 48 includes rotatable frame pivoting means first portion pair of parallel, and spaced-apart, and longitudinally disposed tabs 104 that extend radially outwardly from the rotatable frame first semi-cylindrically-shaped portion 40 of the rotatable cylindrically-shaped frame 38, substantially flush with the rotatable frame first portion pivot longitudinal face 46 of the rotatable frame first semi-cylindrically-shaped portion 40 of the rotatable cylindrically-shaped frame 38.

One tab of the rotatable frame pivoting means first portion pair of parallel, and spaced-apart, and longitudinally disposed tabs 104 of the rotatable frame pivoting means 48 is disposed in proximity to the rotatable frame circular-shaped and open proximal end 56 of the rotatable cylindrically-shaped frame 38 and another tab of the rotatable frame pivoting means first portion pair of parallel, and spaced-apart, and longitudinally disposed tabs 104 of the rotatable frame pivoting means 48 is disposed in proximity to a rotatable frame circular-shaped and open distal end 106 of the rotatable cylindrically-shaped frame 38.

Each tab of the rotatable frame pivoting means first portion pair of parallel, and slightly spaced-apart, and longitudinally disposed tabs 104 of the rotatable frame pivoting means 48 has a rotatable fame pivoting means first portion tab longitudinally aligned throughbore 108 that extends longitudinally therethrough.

The rotatable frame pivoting means 48 further includes a rotatable frame pivoting means second portion pair of parallel, and slightly spaced-apart, and longitudinally disposed tabs 110 that extend substantially radially outwardly from the rotatable frame second semi-cylindrically-shaped portion 42 of the rotatable cylindrically-shaped frame 38, substantially flush with, and extending circumferentially past, the rotatable frame second portion pivot longitudinal face 44 of the rotatable frame second semi-cylindrically-shaped portion 42 of the rotatable cylindrically-shaped frame 38.

One tab of the rotatable frame pivoting means second portion pair of parallel, and spaced-apart, and longitudinally disposed tabs 110 of the rotatable frame pivoting means 48 is disposed in proximity to the rotatable frame circular-shaped and open proximal end 56 of the rotatable cylindrically-shaped frame 38 and another tab of the rotatable frame pivoting means second portion pair of parallel, and spaced-apart, and longitudinally disposed tabs 110 of the rotatable frame pivoting means 48 is disposed in proximity to the rotatable frame circular-shaped and open distal end 106 of the rotatable cylindrically-shaped frame 38.

Each tab of the rotatable frame pivoting means second portion pair of parallel, and spaced-apart, and longitudinally disposed tabs 110 of the rotatable frame pivoting means 48 has a rotatable frame pivoting means second portion tab longitudinally aligned throughbore 112 that extends longitudinally therethrough.

The rotatable frame pivoting means first portion pair of parallel, and slightly spaced-apart, and longitudinally disposed tabs 104 of the rotatable frame pivoting means 48 replaceably receive therebetween the rotatable frame pivoting means second portion pair of parallel, and spaced-apart, and longitudinally disposed tabs 110 of the rotatable frame pivoting means 48, with each tab of the rotatable frame pivoting means second portion pair of parallel, and spaced-apart, and longitudinally disposed tabs 110 abutting against a respective tab of the rotatable frame pivoting means first portion pair of parallel, and slightly spaced-apart, and longitudinally disposed tabs 104 of the rotatable frame pivoting means 48.

The rotatable frame pivoting means second portion pair of parallel, and spaced-apart, and longitudinally disposed tabs 110 of the rotatable frame pivoting means 48 is replaceably maintained between the rotatable frame pivoting means first portion pair of parallel, and slightly spaced-apart, and longitudinally disposed tabs 104 of the rotatable frame pivoting means 48 by a rotatable frame pivoting means pivot pin 114 that passes frictionally and replaceably through the rotatable fame pivoting means first portion tab longitudinally aligned throughbore 108 in each tab of the rotatable frame pivoting means first portion pair of parallel, and slightly spaced-apart, and longitudinally disposed tabs 104 of the rotatable frame pivoting means 48 and frictionally and replaceably through the rotatable frame pivoting means second portion tab longitudinally aligned throughbore 112 in each tab of the rotatable frame pivoting means second portion pair of parallel, and spaced-apart, and longitudinally disposed tabs 110 of the rotatable frame pivoting means 48.

The fixed frame securing means 26 includes fixed frame securing means first portion substantially trapezoidal-shaped catch part 116 that is integrally formed with the fixed frame first semi-cylindrically-shaped portion 16 of the fixed cylindrically-shaped frame 14, in proximity to the fixed frame first portion opposing securing longitudinal face 28 of the fixed frame first semi-cylindrically-shaped portion 16 of the fixed cylindrically-shaped frame 14.

The fixed frame securing means 26 further includes fixed frame securing means second portion latch part 118 that is pivotally mounted to the fixed frame second semi-cylindrically-shaped portion 18 of the fixed cylindrically-shaped frame 14, in proximity to the fixed frame second portion opposing securing longitudinal face 30 of the fixed frame second semi-cylindrically-shaped portion 18 of the fixed cylindrically-shaped frame 14, and selectively and replaceably engages the fixed frame securing means first portion substantially trapezoidal-shaped catch part 116 of the fixed frame securing means 26.

The rotatable frame securing means 50 includes rotatable frame securing means first portion catch part 120 that is integrally formed with the rotatable frame first semi-cylindrically-shaped portion 40 of the rotatable cylindrically-shaped frame 38, in proximity to the rotatable frame first portion opposing securing longitudinal face 52 of the rotatable frame first semi-cylindrically-shaped portion 40 of the rotatable cylindrically-shaped frame 38.

The rotatable frame securing means 50 further includes rotatable frame securing means second portion latch part 122 that is pivotally mounted to the rotatable frame second semi-cylindrically-shaped portion 42 of the rotatable cylindrically-shaped frame 38, in proximity to the rotatable frame second portion opposing securing longitudinal face 54 of the rotatable frame second semi-cylindrically-shaped portion 42 of the rotatable cylindrically-shaped frame 38, and selectively and replaceably engages the rotatable frame securing means first portion catch part 120 of the rotatable frame securing means 50.

The fixed frame securing means second portion latch part 118 of the fixed frame securing means 26 has a fixed frame securing means second portion latch part first square-shaped pivot link 124 that is pivotally mounted to the fixed frame second semi-cylindrically-shaped portion 18 of the fixed cylindrically-shaped frame 14, by a fixed frame securing means second portion latch part first pivot link first pivot pin 126 that passes through a longitudinal throughbore in a fixed frame securing means second portion latch part pivot link substantially trapezoidal-shaped block 128 that is integrally formed with the fixed frame second semi-cylindrically-shaped portion 18 of the fixed cylindrically-shaped frame 14, in proximity to the fixed frame second portion opposing securing longitudinal face 30 of the fixed frame second semi-cylindrically-shaped portion 18 of the fixed cylindrically-shaped frame 14.

The fixed frame securing means second portion latch part first square-shaped pivot link 124 of the fixed frame securing means second portion latch part 118 of the fixed frame securing means 26 securely and replaceable engages the fixed frame securing means first portion substantially trapezoidal-shaped catch part 116 of the fixed frame securing means 26 when the fixed cylindrically-shaped frame 14 is in the closed position so as to maintain the fixed cylindrically-shaped frame 14 in the closed position.

The fixed frame securing means second portion latch part 118 of the fixed frame securing means 26 further has a fixed frame securing means second portion latch part second rectangular-shaped handle pivot link 130 that is pivotally mounted, by a fixed frame securing means second portion latch part second pivot link second pivot pin 132, to the fixed frame securing means second portion latch part first square-shaped pivot link 124 of the fixed frame securing means second portion latch part 118 of the fixed frame securing means 26, and assists in the selective engagement, when pushed down, and disengagement, when pulled up, of the fixed frame securing means second portion latch part first square-shaped pivot link 124 of the fixed frame securing means second portion latch part 118 of the fixed frame securing means 26 relative to the fixed frame securing means first portion substantially trapezoidal-shaped catch part 116 of the fixed frame securing means 26.

The rotatable frame securing means second portion latch part 122 of the rotatable frame securing means 50 has a rotatable frame securing means second portion latch part first square-shaped pivot link 134 that is pivotally mounted to the rotatable frame second semi-cylindrically-shaped portion 42 of the rotatable cylindrically-shaped frame 38, by a rotatable frame securing means second portion latch part first pivot link first pivot pin 136 that passes through a longitudinal throughbore in a rotatable frame securing means second portion latch part pivot link substantially trapezoidal-shaped block 138 that is integrally formed with the rotatable frame second semi-cylindrically-shaped portion 42 of the rotatable cylindrically-shaped frame 38, in proximity to the rotatable frame second portion opposing securing longitudinal face 54 of the rotatable frame second semi-cylindrically-shaped portion 42 of the rotatable cylindrically-shaped frame 38.

The rotatable frame securing means second portion latch part first square-shaped pivot link 134 of the rotatable frame securing means second portion latch part 122 of the rotatable frame securing means 50 securely and replaceable engages the rotatable frame securing means first portion substantially trapezoidal-shaped catch part 120 of the rotatable frame securing means 50 when the rotatable cylindrically-shaped frame 38 is in the closed position so as to maintain the rotatable cylindrically-shaped frame 38 in the closed position.

The rotatable frame securing means second portion latch part 122 of the rotatable frame securing means 50 further has a rotatable frame securing means second portion latch part second rectangular-shaped handle pivot link 139 that is pivotally mounted, by a rotatable frame securing means second portion latch part second pivot link second pivot pin 140, to the rotatable frame securing means second portion latch part first square-shaped pivot link 134 of the rotatable frame securing means second portion latch part 122 of the rotatable frame securing means 50, and assists in the selective engagement, when pushed down, and disengagement, when pulled up, of the rotatable frame securing means second portion latch part first square-shaped pivot link 134 of the rotatable frame securing means second portion latch part 122 of the rotatable frame securing means 50 relative to the rotatable frame securing means first portion substantially trapezoidal-shaped catch part 120 of the rotatable frame securing means 50.

Figure 6B:
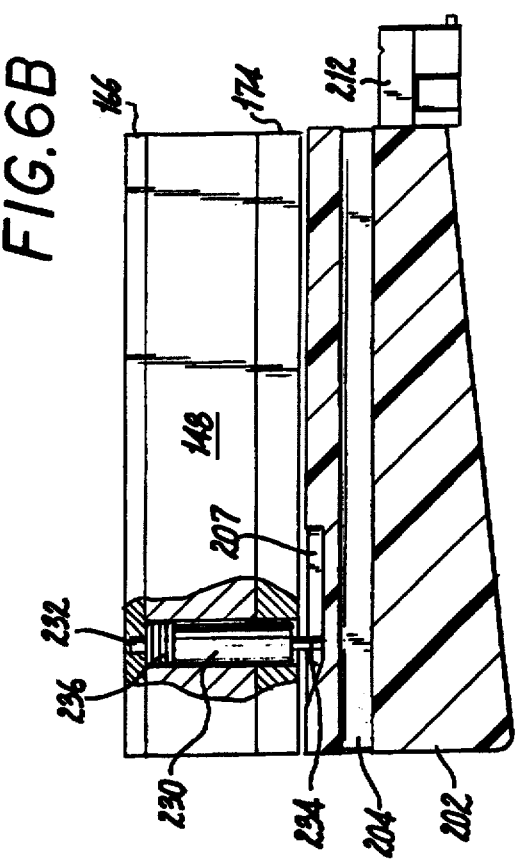
FIG. 6B is an enlarged cross sectional view taken on line 6B—6B in FIG. 6.
Figure 6A:
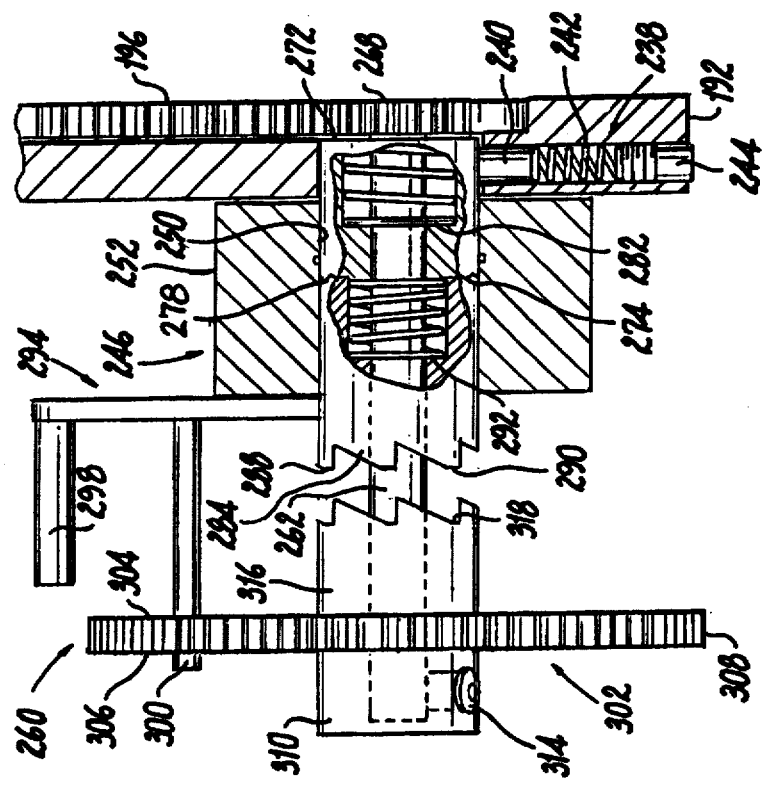
FIG. 6A is an enlarged cross sectional view taken on line 6A—6A in FIG. 6.

The configuration of the parting tool assembly 64 can best be seen in FIGS. 6, 6A, and 6B, which are an enlarged exploded perspective view of the parting tool assembly of the present generally enclosed by the dotted circle identified by arrow 6 in FIG. 1, an enlarged cross sectional view taken on line 6A—6A in FIG. 6, and an enlarged cross sectional view taken on line 6B—6B in FIG. 6, respectively, and as such will be discussed with reference thereto.

The parting tool assembly 64 includes a parting tool assembly rectangular-parallelepiped-shaped housing 142 that extends radially outwardly from the rotatable frame first semi-cylindrically-shaped portion 40 of the rotatable cylindrically-shaped frame 38.

The parting tool assembly rectangular-parallelepiped-shaped housing 142 of the parting tool assembly 64 has a parting tool assembly housing innermost face 144 disposed on the rotatable frame first semi-cylindrically-shaped portion 40 of the rotatable cylindrically-shaped frame 38, and a parting tool assembly outermost face 146 that is spaced from, and parallel to, the parting tool assembly housing innermost face 144 of the parting tool assembly rectangular-parallelepiped-shaped housing 142 of the parting tool assembly 64.

The parting tool assembly rectangular-parallelepiped-shaped housing 142 of the parting tool assembly 64 further has a parting tool assembly housing rearwardmost face 148, and a parting tool assembly housing forwardmost face 150 that is spaced from, and parallel to, the parting tool assembly housing rearwardmost face 148 of the parting tool assembly rectangular-parallelepiped-shaped housing 142 of the parting tool assembly 64.

The parting tool assembly rectangular-parallelepiped-shaped housing 142 of the parting tool assembly 64 further has a parting tool assembly housing upper face 152, and a parting tool assembly housing lower face 154 that is spaced from, and parallel to, the parting tool assembly housing upper face 152 of the parting tool assembly rectangular-parallelepiped-shaped housing 142 of the parting tool assembly 64.

The parting tool assembly rectangular-parallelepiped-shaped housing 142 of the parting tool assembly 64 further has a parting tool assembly housing centrally-disposed and cylindrically-shaped longitudinal throughbore 156 that extends longitudinal therethrough, from and opening into, the parting tool assembly housing upper face 152 of the parting tool assembly rectangular-parallelepiped-shaped housing 142 of the parting tool assembly 64, to and opening into, the parting tool assembly housing lower face 154 of the parting tool assembly rectangular-parallelepioed-shaped housing 142 of the parting tool assembly 64.

The parting tool assembly rectangular-parallelepiped-shaped housing 142 of the parting tool assembly 64 further has a parting tool assembly housing cubic-shaped internal chamber 158 that opens into the parting tool assembly housing centrally-disposed and cylindrically-shaped longitudinal throughbore 156 in the parting tool assembly rectangular-parallelepiped-shaped housing 142 of the parting tool assembly 64, the parting tool assembly housing lower face 154 of the parting tool assembly rectangular-parallelepiped-shaped housing 142 of the parting tool assembly 64, and the parting tool assembly housing upper face 152 of the parting tool assembly rectangular-parallelepiped-shaped housing 142 of the parting tool assembly 64.

The parting tool assembly rectangular-parallelepiped-shaped housing 142 of the parting tool assembly 64 further has a parting tool assembly housing elongated, slender, and cylindrically-shaped guide bore 160 that extends from, and opening into both, the parting tool assembly housing cubic-shaped internal chamber 158 in the parting tool assembly rectangular-parallelepiped-shaped housing 142 of the parting tool assembly 64 and the parting tool assembly housing rearwardmost face 148 of the parting tool assembly rectangular-parallelepiped-shaped housing 142 of the parting tool assembly 64, and is parallel to the parting tool assembly housing innermost face 144 of the parting tool assembly rectangular-parallelepiped-shaped housing 142 of the parting tool assembly 64.

The parting tool assembly rectangular-parallelepiped-shaped housing 142 of the parting tool assembly 64 further has a parting tool assembly housing longitudinal throughbore 162 that extends longitudinal therethrough, from and opening into, the parting tool assembly housing upper face 152 of the parting tool assembly rectangular-parallelepiped-shaped housing 142 of the parting tool assembly 64, to and opening into, the parting tool assembly housing lower face 154 of the parting tool assembly rectangular-parallelepiped-shaped housing 142 of the parting tool assembly 64.

The parting tool assembly housing upper face 152 of the parting tool assembly rectangular-parallelepiped-shaped housing 142 of the parting tool assembly 64 has a parting tool assembly housing upper face pair of threaded bores 164 that extend longitudinally therein, between the parting tool assembly housing centrally-disposed and cylindrically-shaped longitudinal throughbore 156 in the parting tool assembly rectangular-parallelepiped-shaped housing 142 of the parting tool assembly 64 and the parting tool assembly outermost face 146 of the parting tool assembly rectangular-parallelepiped-shaped housing 142 of the parting tool assembly 64.

The parting tool assembly rectangular-parallelepiped-shaped housing 142 of the parting tool assembly 64 further has a parting tool assembly housing rectangular-shaped lower cover 166 that is replaceably secured to the parting tool assembly housing lower face 154 of the parting tool assembly rectangular-parallelepiped-shaped housing 142 of the parting tool assembly 64, by parting tool assembly housing lower cover screws 168.

The parting tool assembly housing rectangular-shaped upper cover 166 of the parting tool assembly rectangular-parallelepiped-shaped housing 142 of the parting tool assembly 64 has a parting tool assembly housing upper cover centrally-disposed throughbore 170 that extends longitudinally therethrough, and is smaller than, and coaxial and communicates with, the parting tool assembly housing centrally-disposed and cylindrically-shaped longitudinal throughbore 156 in the parting tool assembly rectangular-parallelepiped-shaped housing 142 of the parting tool assembly 64.

The parting tool assembly housing rectangular-shaped upper cover 166 of the parting tool assembly rectangular-parallelepiped-shaped housing 142 of the parting tool assembly 64 further has a parting tool assembly housing upper cover throughbore 172 that extends longitudinally therethrough, and is coaxial and communicates with the parting tool assembly housing longitudinal throughbore 162 in the parting tool assembly rectangular-parallelepiped-shaped housing 142 of the parting tool assembly 64.

The parting tool assembly 64 further includes a parting tool assembly rectangular-shaped and T-shape in profile intermediate plate 174 that is fixedly attached to the parting tool assembly housing upper face 152 of the parting tool assembly rectangular-parallelepiped-shaped housing 142 of the parting tool assembly 64, by parting tool assembly intermediate plate mounting screws 176 that pass through parting tool assembly intermediate plate mounting throughbores 178 in the parting tool assembly rectangular-shaped and T-shape in profile intermediate plate 174 of the parting tool assembly 64 and threadably engage the parting tool assembly housing upper face pair of threaded bores 164 in the parting tool assembly housing upper face 152 of the parting tool assembly rectangular-parallelepiped-shaped housing 142 of the parting tool assembly 64.

The parting tool assembly rectangular-shaped and T-shape in profile intermediate plate 174 of the parting tool assembly 64 further has a parting tool assembly intermediate plate upper face 180.

The parting tool assembly intermediate plate upper face 180 of the parting tool assembly rectangular-shaped and T-shape in profile intermediate plate 174 of the parting tool assembly 64 has a parting tool assembly intermediate plate upper face figure 8-shaped recess 182 therein with a parting tool assembly intermediate plate upper face figure 8-shaped recess major circle portion 184 and a parting tool assembly intermediate plate upper face figure 8-shaped recess minor circle portion 186.

The parting tool assembly rectangular-shaped and T-shape in profile intermediate plate 174 of the parting tool assembly 64 further has a parting tool assembly intermediate plate upper face figure 8-shaped recess major circle portion throughbore 188 that passes centrally through the parting tool assembly intermediate plate upper face figure 8-shaped recess major circle portion 184 of the parting tool assembly intermediate plate upper face figure 8-shaped recess 182 in the parting tool assembly intermediate plate upper face 180 of the parting tool assembly rectangular-shaped and T-shape in profile intermediate plate 174 of the parting tool assembly 64.

The parting tool assembly rectangular-shaped and T-shape in profile intermediate plate 174 of the parting tool assembly 64 further has a parting tool assembly intermediate plate upper face figure 8-shaped recess minor circle portion throughbore 190 that is smaller than, and passes centrally through the parting tool assembly intermediate plate upper face figure 8-shaped recess minor circle portion 186 of the parting tool assembly intermediate plate upper face figure 8-shaped recess 182 in the parting tool assembly intermediate plate upper face 180 of the parting tool assembly rectangular-shaped and T-shape in profile intermediate plate 174 of the parting tool assembly 64, and is smaller than, and coaxial with, the parting tool assembly housing centrally-disposed and cylindrically-shaped longitudinal throughbore 156 in the parting tool assembly rectangular-parallelepiped-shaped housing 142 of the parting tool assembly 64.

The parting tool assembly rectangular-shaped and T-shape in profile intermediate plate 174 of the parting tool assembly 64 further has a parting tool assembly intermediate plate T-shaped outermost face 192 with a parting tool assembly intermediate plate outermost face threaded throughbore 194 that extends into, and communicates with, the parting tool assembly intermediate plate upper face figure 8-shaped recess minor circle portion throughbore 190 in the parting tool assembly rectangular-shaped and T-shape in profile intermediate plate 174 of the parting tool assembly 64.

The parting tool assembly 64 further includes a parting tool assembly large gear 196 that is fixedly attached to a parting tool assembly gear shaft 198 that passes rotatably in the parting tool assembly intermediate plate upper face figure 8-shaped recess major circle portion throughbore in the parting tool assembly intermediate plate upper face figure 8-shaped recess major circle portion 184 of the parting tool assembly intermediate plate upper face figure 8-shaped recess 182 in the parting tool assembly intermediate plate upper face 180 of the parting tool assembly rectangular-shaped and T-shape in profile intermediate plate 174 of the parting tool assembly 64, and with the parting tool assembly large gear 196 of the parting tool assembly 64 resting flush in the parting tool assembly intermediate plate upper face FIG. 8-shaped recess major circle portion 184 of the parting tool assembly intermediate plate upper face figure 8-shaped recess 182 in the parting tool assembly intermediate plate upper face 180 of the parting tool assembly rectangular-shaped and T-shape in profile intermediate plate 174 of the parting tool assembly 64.

The parting tool assembly 64 further includes a parting tool assembly small gear 200 that is fixedly attached to the parting tool assembly gear shaft 198 of the parting tool assembly 64 and is coaxial with, is forward of, and is smaller than, the parting tool assembly large gear 196 of the parting tool assembly 64, and extends past the parting tool assembly intermediate plate upper face 180 of the parting tool assembly rectangular-shaped and T-shape in profile intermediate plate 174 of the parting tool assembly 64.

The parting tool assembly 64 further includes a parting tool assembly generally trapezoidal-shaped upper cover 202 that has a parting tool assembly upper cover T-shaped track 204 that extends radially thereacross and radially slidingly engages the parting tool assembly rectangular-shaped and T-shape in profile intermediate plate 174 of the parting tool assembly 64.

The parting tool assembly generally trapezoidal-shaped upper cover 202 of the parting tool assembly 64 further has a parting tool assembly upper cover inner surface 206 with a pair of parting tool assembly upper cover inner surface throughbores 211 and a parting tool assembly upper cover inner surface elongated and slender stop recess 213 that is disposed in proximity to, and tapers towards, a parting tool assembly upper cover outermost face 209 of the parting tool assembly generally trapezoidal-shaped upper cover 202 of the parting tool assembly 64.

The parting tool assembly 64 further includes a parting tool assembly rack gear 208 that has parting tool assembly rack gear pins 210 that extend perpendicularly forwardly therefrom and are fixedly received in the pair of parting tool assembly upper cover inner surface throughbores 211 in the parting tool assembly upper cover inner surface 206 of the parting tool assembly generally trapezoidal-shaped upper cover 202 of the parting tool assembly 64, with the parting tool assembly small gear 200 of the parting tool assembly 64 rotatably engaging the parting tool assembly rack gear 208 of the parting tool assembly 64.

The parting tool assembly 64 further includes a parting tool assembly parting tool bit 212 that is fixedly attached by parting tool assembly parting tool mounting screws and nuts 215 to, for movement with, the parting tool assembly generally trapezoidal-shaped upper cover 202 of the parting tool assembly 64, and extends radially from a parting tool assembly upper cover innermost face 214 of the parting tool assembly generally trapezoidal-shaped upper cover 202.

The parting tool assembly 64 further includes a parting tool assembly rotatable frame first gear 216 that is rotatably mounted to the rotatable frame first semi-cylindrically-shaped portion 40 of the rotatable cylindrically-shaped frame 38, behind the rotatable frame proximal end ring gear 60 of the circular-shaped and open proximal end 56 of the rotatable cylindrically-shaped frame 38, and rotatably engaging the gear teeth 36 in the fixed frame distal end circumferentially-disposed track 34 in the fixed frame circular-shaped and open distal end 32 of the fixed cylindrically-shaped frame 14.

The parting tool assembly 64 further includes a parting tool assembly rotatable frame second gear 218 that is rotatably mounted in the rotatable frame first semi-cylindrically-shaped portion 40 of the rotatable cylindrically-shaped frame 38, forward of, and rotatably engaging, the parting tool assembly rotatable frame first gear 216 of the parting tool assembly 64.

The parting tool assembly 64 further includes a parting tool assembly rotatable frame second gear eccentric 220 that is fixedly disposed on, outward of, and for rotation with, the parting tool assembly rotatable frame second gear 218.

The parting tool assembly rotatable frame second gear 218 of the parting tool assembly 64 and the parting tool assembly rotatable frame second gear eccentric 220 of the parting tool assembly 64 are accessible via a rotatable frame threaded cap 222 that threadably engages the rotatable frame first semi-cylindrically-shaped portion 40 of the rotatable cylindrically-shaped frame 38.

The parting tool assembly 64 further includes a parting tool assembly reciprocating rod 224 that is pivotally mounted at one end to the parting tool assembly rotatable frame second gear eccentric 220 of the parting tool assembly 64, and extends movably through the parting tool assembly housing elongated, slender, and cylindrically-shaped guide bore 160 in the parting tool assembly rectangular-parallelepiped-shaped housing 142 of the parting tool assembly 64, and into the parting tool assembly housing cubic-shaped internal chamber 158 in the parting tool assembly rectangular-parallelepiped-shaped housing 142 of the parting tool assembly 64.

The parting tool assembly 64 further includes a parting tool assembly reciprocating block 226 that is pivotally attached to another end of the parting tool assembly reciprocating rod 224 of the parting tool assembly 64 for reciprocation therewith, and is movably disposed in the parting tool assembly housing cubic-shaped internal chamber 158 in the parting tool assembly rectangular-parallelepiped-shaped housing 142 of the parting tool assembly 64, and has a parting tool assembly reciprocating block pin 228 that extends radially towards the parting tool assembly housing centrally-disposed and cylindrically-shaped longitudinal throughbore 156 in the parting tool assembly rectangular-parallelepiped-shaped housing 142 of the parting tool assembly 64.

The parting tool assembly 64 further includes a parting tool assembly cylindrically-shaped release assembly 230 that has a parting tool assembly release assembly narrow portion 232 that passes movably through the parting tool assembly housing longitudinal throughbore 162 in the parting tool assembly rectangular-parallelepiped-shaped housing 142 of the parting tool assembly 64 and movably through the parting tool assembly housing upper cover throughbore 172 in the parting tool assembly housing rectangular-shaped upper cover 166 of the parting tool assembly rectangular-parallelepiped-shaped housing 142 of the parting tool assembly 64.

The parting tool assembly cylindrically-shaped release assembly 230 of the parting tool assembly 64 further has a parting tool assembly release assembly wide portion 234 that extends coaxially upwardly from the parting tool assembly release assembly narrow portion 232 of the parting tool assembly cylindrically-shaped release assembly 230 of the parting tool assembly 64, and is biased in the parting tool assembly upper cover inner surface elongated and slender stop recess 213 in the parting tool assembly generally trapezoidal-shaped upper cover 202 of the parting tool assembly 64, by a parting tool assembly release assembly spring 236.

The parting tool assembly 64 further includes a parting tool assembly resistance assembly 238 that has a parting tool assembly resistance assembly plunger 240 that passes movably into the parting tool assembly intermediate plate outermost face threaded throughbore 194 in the parting tool assembly intermediate plate T-shaped outermost face 192 of the parting tool assembly rectangular-shaped and T-shape in profile intermediate plate 174 of the parting tool assembly 64.

The parting tool assembly resistance assembly 238 of the parting tool assembly 64 further has a parting tool assembly resistance assembly spring 242 that biases the parting tool assembly resistance assembly plunger 240 of the parting tool assembly resistance assembly 238 of the parting tool assembly 64 inwardly in the parting tool assembly intermediate plate outermost face threaded throughbore 194 in the parting tool assembly rectangular-shaped and T-shape in profile intermediate plate 174 of the parting tool assembly 64.

The parting tool assembly resistance assembly 238 of the parting tool assembly 64 further has a parting tool assembly resistance assembly set screw 244 that threadably engages the parting tool assembly intermediate plate outermost face threaded throughboce 194 in the parting tool assembly rectangular-shaped and T-shape in profile intermediate plate 174 of the parting tool assembly 64 and regulates the biasing of the parting tool assembly resistance assembly spring 242 of the parting tool assembly resistance assembly 238 of the parting tool assembly 64.

The parting tool assembly 64 further includes a parting tool assembly cylindrically-shaped collar 246 that is disposed coaxially in, for reciprocating movement in, the parting tool assembly housing centrally-disposed and cylindrically-shaped longitudinal throughbore 156 in the parting tool assembly rectangular-parallelepiped-shaped housing 142 of the parting tool assembly 64.

While not to be interpreted as a limitation, the parting tool assembly cylindrically-shaped collar 246 of the parting tool assembly 64, typically can be a ¾" I.D. roller clutch bearing Manufactured by Torrington under part no RCB121616, although it is to be understood that there are probably a wide assortment of other similar roller clutch bearing of various sizes which could be suitably employed in the fabrication of embodiments of the present invention.

The parting tool assembly cylindrically-shaped collar 246 of the parting tool assembly 64 has a parting tool assembly collar cylindrically-shaped inner surface 248 with a parting tool assembly collar cylindrically-shaped inner surface ratchet surface 250 disposed therearound.

The parting tool assembly cylindrically-shaped collar 246 of the parting tool assembly 64 further has a parting tool assembly collar cylindrically-shaped outer surface 252 with a parting tool assembly collar outer surface radially-oriented and threaded bore 254 that extends radially therein.

The parting tool assembly 64 further includes a parting tool assembly threaded yoke 256 that threadably engages, and extends outwardly from, the parting tool assembly collar outer surface radially-oriented and threaded bore 254 in the parting tool assembly collar cylindrically-shaped outer surface 252 of the parting tool assembly cylindrically-shaped collar 246 of the parting tool assembly 64, and is pivotally mounted to the parting tool assembly reciprocating block pin 228 on the parting tool assembly reciprocating block 226 of the parting tool assembly 64, by a parting tool assembly yoke pivot pin 258.

The parting tool assembly 64 further includes a parting tool assembly engagement assembly 260 that passes through the parting tool assembly cylindrically-shaped collar 246 of the parting tool assembly 64, and selectively engages and disengages the parting tool assembly 64.

The parting tool assembly engagement assembly 260 of the parting tool assembly 64 includes a parting tool assembly engagement assembly elongated, slender, and cylindrically-shaped shaft 262 with a parting tool assembly engagement assembly shaft proximal end 264 and a parting tool assembly engagement assembly shaft distal end 266.

The parting tool assembly engagement assembly 260 of the parting tool assembly 64 further includes a parting tool assembly engagement assembly distal end gear 268 that is fixedly and coaxially attached to, for rotation with, the parting tool assembly engagement assembly shaft distal end 266 of the parting tool assembly engagement assembly elongated, slender, and cylindrically-shaped shaft 262 of the parting tool assembly engagement assembly 260 of the parting tool assembly 64, passes through the parting tool assembly intermediate plate upper face figure 8-shaped recess minor circle portion throughbore 190 in the parting tool assembly rectangular-shaped and T-shape in profile intermediate plate 174 of the parting tool assembly 64, sits flush in the parting tool assembly intermediate plate upper face figure 8-shaped recess minor circle portion 186 of the parting tool assembly 64, and rotatably engages the parting tool assembly large gear 196 of the parting tool assembly 64.

The parting tool assembly engagement assembly 260 of the parting tool assembly 64 further includes a parting tool assembly engagement assembly fixed and cylindrically-shaped clutch part 270 that has a parting tool assembly engagement assembly fixed clutch part flat distal end 272 and a parting tool assembly engagement assembly fixed clutch part serrated proximal end 274, and is fixedly and coaxially attached to, for rotation with, the parting tool assembly engagement assembly elongated, slender, and cylindrically-shaped shaft 262 of the parting tool assembly engagement assembly 260 of the parting tool assembly 64, with the parting tool assembly engagement assembly fixed clutch part flat distal end 272 of the parting tool assembly engagement assembly fixed and cylindrically-shaped clutch part 270 of the parting tool assembly engagement assembly 260 of the parting tool assembly 64 abutting against the parting tool assembly engagement assembly distal end gear 268 of the parting tool assembly engagement assembly 260 of the parting tool assembly 64.

The parting tool assembly engagement assembly 260 of the parting tool assembly 64 further includes a parting tool assembly engagement assembly rotatable and cylindrically-shaped clutch part 276 that contacts the parting tool assembly collar cylindrically-shaped inner surface ratchet surface 250 on the parting tool assembly collar cylindrically-shaped inner surface 248 of the parting tool assembly cylindrically-shaped collar 246 of the parting tool assembly 64, and rotates via the reciprocating movement of the parting tool assembly cylindrically-shaped collar 246 of the parting tool assembly 64, by virtue of the parting tool assembly resistance assembly plunger 240 of the parting tool assembly resistance assembly 238 of the parting tool assembly 64 being biased, by the parting tool assembly resistance assembly spring 242 of the parting tool assembly resistance assembly 238 of the parting tool assembly 64, against the parting tool assembly engagement assembly rotatable and cylindrically-shaped clutch part 276 of the parting tool assembly engagement assembly 260 of the parting tool assembly 64 and thereby preventing the parting tool assembly engagement assembly rotatable and cylindrically-shaped clutch part 276 of the parting tool assembly engagement assembly 260 of the parting tool assembly 64 from reciprocating with the parting tool assembly cylindrically-shaped collar 246 of the parting tool assembly 64 as the parting tool assembly collar cylindrically-shaped inner surface ratchet surface 250 on the parting tool assembly collar cylindrically-shaped inner surface 248 of the parting tool assembly cylindrically-shaped collar 246 of the parting tool assembly 64 reciprocates.

The parting tool assembly engagement assembly rotatable and cylindrically-shaped clutch part 276 of the parting tool assembly engagement assembly 260 of the parting tool assembly 64 has a parting tool assembly engagement assembly rotatable clutch part serrated distal end 278 and a parting tool assembly engagement assembly rotatable clutch part flat proximal end 280, and is rotatably and coaxially attached to, for rotation with when the parting tool assembly 64 is engaged, the parting tool assembly engagement assembly elongated, slender, and cylindrically-shaped shaft 262 of the parting tool assembly engagement assembly 260 of the parting tool assembly 64, with the parting tool assembly engagement assembly rotatable clutch part serrated distal end 278 of the parting tool assembly engagement assembly rotatable and cylindrically-shaped clutch part 276 of the parting tool assembly engagement assembly 260 of the parting tool assembly 64 being in selective engagement with, and disengagement from, the parting tool assembly engagement assembly fixed clutch part serrated proximal end 274 of the parting tool assembly engagement assembly fixed and cylindrically-shaped clutch part 270 of the parting tool assembly engagement assembly 260 of the parting tool assembly 64.

The parting tool assembly engagement assembly 260 of the parting tool assembly 64 further includes a parting tool assembly engagement assembly first spring 282 that is coaxially disposed on the parting tool assembly engagement assembly elongated, slender, and cylindrically-shaped shaft 262 of the parting tool assembly engagement assembly 260 of the parting tool assembly 64, between the parting tool assembly engagement assembly fixed and cylindrically-shaped clutch part 270 of the parting tool assembly engagement assembly 260 of the parting tool assembly 64 and the parting tool assembly engagement assembly rotatable and cylindrically-shaped clutch part 276 of the parting tool assembly engagement assembly 260 of the parting tool assembly 64, and biases the parting tool assembly engagement assembly rotatable and cylindrically-shaped clutch part 276 of the parting tool assembly engagement assembly 260 of the parting tool assembly 64 away from the parting tool assembly engagement assembly fixed and cylindrically-shaped clutch part 270 of the parting tool assembly engagement assembly 260 of the parting tool assembly 64.

The parting tool assembly engagement assembly 260 of the parting tool assembly 64 further includes a parting tool assembly engagement assembly rotatable and cylindrically-shaped cam part 284 that has a parting tool assembly engagement assembly rotatable cam part flat distal end 286 and a parting tool assembly engagement assembly rotatable cam part cammed proximal end 288 with parting tool assembly engagement assembly rotatable cam part cammed proximal end flats 290, and is rotatably and coaxially attached to, for rotation with when the parting tool assembly 64 is engaged, the parting tool assembly engagement assembly elongated, slender, and cylindrically-shaped shaft 262 of the parting tool assembly engagement assembly 260 of the parting tool assembly 64, with the parting tool assembly engagement assembly rotatable cam part flat distal end 286 of the parting tool assembly engagement assembly rotatable and cylindrically-shaped cam part 284 of the parting tool assembly engagement assembly 260 of the parting tool assembly 64 abuttable against, for rotation with when the parting tool assembly 64 is engaged, the parting tool assembly engagement assembly rotatable clutch part flat proximal end 280 of the parting tool assembly engagement assembly rotatable and cylindrically-shaped clutch part 276 of the parting tool assembly engagement assembly 260 of the parting tool assembly 64.

The parting tool assembly engagement assembly 260 of the parting tool assembly 64 further includes a parting tool assembly engagement assembly second spring 292 that is coaxially disposed on the parting tool assembly engagement assembly elongated, slender, and cylindrically-shaped shaft 262 of the parting tool assembly engagement assembly 260 of the parting tool assembly 64, between, and biases apart, the parting tool assembly engagement assembly rotatable and cylindrically-shaped clutch part 276 of the parting tool assembly engagement assembly 260 of the parting tool assembly 64 and the parting tool assembly engagement assembly rotatable and cylindrically-shaped cam part 284 of the parting tool assembly engagement assembly 260 of the parting tool assembly 64.

The parting tool assembly engagement assembly 260 of the parting tool assembly 64 further includes a parting tool assembly engagement assembly flat and elongated arm 294 that extends fixedly outwardly from, for rotation with, the parting tool assembly engagement assembly rotatable and cylindrically-shaped cam part 284 of the parting tool assembly engagement assembly 260 of the parting tool assembly 64, and has a parting tool assembly engagement assembly arm free end 296.

The parting tool assembly engagement assembly flat and elongated arm 294 of the parting tool assembly engagement assembly 260 of the parting tool assembly 64 has a parting tool assembly engagement assembly arm free end first pin 298 that extends fixedly and perpendicularly from the parting tool assembly engagement assembly arm free end 296 of the parting tool assembly engagement assembly flat and elongated arm 294 of the parting tool assembly engagement assembly 260 of the parting tool assembly 64, towards the parting tool assembly engagement assembly shaft proximal end 264 of the parting tool assembly engagement assembly elongated, slender, and cylindrically-shaped shaft 262 of the parting tool assembly engagement assembly 260 of the parting tool assembly 64.

The parting tool assembly engagement assemble flat and elongated arm 294 of the parting tool assembly engagement assembly 260 of the parting tool assembly 64 further has a parting tool assembly engagement assembly arm second pin 300 that extends fixedly and perpendicularly from the parting tool assembly engagement assembly flat and elongated arm 294 of the parting tool assembly engagement assembly 260 of the parting tool assembly 64, towards the parting tool assembly engagement assembly shaft proximal end 264 of the parting tool assembly engagement assembly elongated, slender, and cylindrically-shaped shaft 262 of the parting tool assembly engagement assembly 260 of the parting tool assembly 64, inboard of, parallel to, and shorter than, the parting tool assembly engagement assembly arm free end first pin 298 of parting tool assembly engagement assembly flat and elongated arm 294 of the parting tool assembly engagement assembly 260 of the parting tool assembly 64.

The parting tool assembly engagement assembly 260 of the parting tool assembly 64 further includes a parting tool assembly engagement assembly flat and circular-shaped disk 302 that has a parting tool assembly engagement assembly disk distal surface 304, a parting tool assembly engagement assembly disk proximal surface 306, and a parting tool assembly engagement assembly disk circular-shaped periphery 308, and is replaceably attached to the parting tool assembly engagement assembly shaft proximal end 264 of the parting tool assembly engagement assembly elongated, slender, and cylindrically-shaped shaft 262 of the parting tool assembly engagement assembly 260 of the parting tool assembly 64.

The parting tool assembly engagement assembly flat and circular-shaped disk 302 of the parting tool assembly engagement assembly 260 or the parting tool assembly 64 further has a parting tool assembly engagement assembly disk proximal surface collar 310 that is fixedly and coaxially attached to the parting tool assembly engagement assembly disk proximal surface 306 of the parting tool assembly engagement assembly flat and circular-shaped disk 302 of the parting tool assembly engagement assembly 260 of the parting tool assembly 64, and receives the parting tool assembly engagement assembly shaft proximal end 264 of the parting tool assembly engagement assembly elongated, slender, and cylindrically-shaped shaft 262 of the parting tool assembly engagement assembly 260 of the parting tool assembly 64.

The parting tool assembly engagement assembly disk proximal surface collar 310 of the parting tool assembly engagement assembly flat and circular-shaped disk 302 of the parting tool assembly engagement assembly 260 of the parting tool assembly 64 has a parting tool assembly engagement assembly collar radially-oriented and threaded throughbore 312 that extends radially therethrough and receives a parting tool assembly engagement assembly collar set screw 314 for maintaining the parting tool assembly engagement assembly disk proximal surface collar 310 of the parting tool assembly engagement assembly flat and circular-shaped disk 302 of the parting tool assembly engagement assembly 260 of the parting tool assembly 64 on the parting tool assembly engagement assembly shaft proximal end 264 of the parting tool assembly engagement assembly elongated, slender, and cylindrically-shaped shaft 262 of the parting tool assembly engagement assembly 260 of the parting tool assembly 64.

The parting tool assembly engagement assembly flat and circular-shaped disk 302 of the parting tool assembly engagement assembly 260 of the parting tool assembly 64 further has a parting tool assembly engagement assembly disk distal surface cammed part 316 that is fixedly and coaxially attached to the parting tool assembly engagement assembly disk distal surface 304 of the parting tool assembly engagement assembly flat and circular-shaped disk 302 of the parting tool assembly engagement assembly 260 of the parting tool assembly 64, and has parting tool assembly engagement assembly disk distal surface cammed part flats 318 thereon.

The parting tool assembly engagement assembly disk distal surface cammed part 316 of the parting tool assembly engagement assembly flat and circular-shaped disk 302 of the parting tool assembly engagement assembly 260 of the parting tool assembly 64 is complementary to the parting tool assembly engagement assembly rotatable cam part cammed proximal end 288 of the parting tool assembly engagement assembly rotatable and cylindrically-shaped cam part 284 of the parting tool assembly engagement assembly 260 of the parting tool assembly 64, with the parting tool assembly engagement assembly disk distal surface cammed part flats 318 of the parting tool assembly engagement assembly disk distal surface cammed part 316 of the parting tool assembly engagement assembly disk distal surface 304 of the parting tool assembly engagement assembly flat and circular-shaped disk 302 of the parting tool assembly engagement assembly 260 of the parting tool assembly 64 being abuttable against, for rotation with when the parting tool assembly 64 is engaged, the parting tool assembly engagement assembly rotatable cam part cammed proximal end flats 290 of the parting tool assembly engagement assembly rotatable cam part cammed proximal end 288 of the parting tool assembly engagement assembly rotatable and cylindrically-shaped cam part 284 of the parting tool assembly engagement assembly 260 of the parting tool assembly 64.

The parting tool assembly engagement assembly flat and circular-shaped disk 302 of the parting tool assembly engagement assembly 260 of the parting tool assembly 64 further has a parting tool assembly engagement assembly disk arcuate-shaped throughslot 320 that extends circumferentially, in proximity and parallel to the parting tool assembly engagement assembly disk circular-shaped periphery 308 of the parting tool assembly engagement assembly flat and circular-shaped disk 302 of the parting tool assembly engagement assembly 260 of the parting tool assembly 64, and selectively receives the parting tool assembly engagement assembly arm second pin 300 of the parting tool assembly engagement assembly flat and elongated arm 294 of the parting tool assembly engagement assembly 260 of the parting tool assembly 64 when the parting tool assembly 64 is disengaged.

The method of operation of the parting tool assembly 64 to progressively cut the pipe 12 will be discussed, infra:

STEP 1: Grab the parting tool assembly engagement assembly arm free end first pin 298 of parting tool assembly engagement assembly flat and elongated arm 294 of the parting tool assembly engagement assembly 260 of the parting tool assembly 64 in one hand of the user.

STEP 2: Grab the parting tool assembly engagement assembly flat and circular-shaped disk 302 of the parting tool assembly engagement assembly 260 of the parting tool assembly 64 another hand of the user.

STEP 3: Rotate the parting tool assembly engagement assembly flat and circular-shaped disk 302 of the parting tool assembly engagement assembly 260 of the parting tool assembly 64.

STEP 4: Cause the parting tool assembly engagement assembly disk distal surface cammed part 316 of the parting tool assembly engagement assembly flat and circular-shaped disk 302 of the parting tool assembly engagement assembly 260 of the parting tool assembly 64 to ride along the parting tool assembly engagement assembly rotatable cam part cammed proximal end 288 of the parting tool assembly engagement assembly rotatable and cylindrically-shaped cam part 284 of the parting tool assembly engagement assembly 260 of the parting tool assembly 64, until the parting tool assembly engagement assembly disk distal surface cammed part flats 318 of the parting tool assembly engagement assembly disk distal surface cammed part 316 of the parting tool assembly engagement assembly disk distal surface 304 of the parting tool assembly engagement assembly flat and circular-shaped disk 302 of the parting tool assembly engagement assembly 260 of the parting tool assembly 64 abut against, for rotation with, the parting tool assembly engagement assembly rotatable cam part cammed proximal end flats 290 of the parting tool assembly engagement assembly rotatable cam part cammed proximal end 288 of the parting tool assembly engagement assembly rotatable and cylindrically-shaped cam part 284 of the parting tool assembly engagement assembly 260 of the parting tool assembly 64.

STEP 5: Cause the parting tool assembly engagement assembly arm second pin 300 of the parting tool assembly engagement assembly flat and elongated arm 294 of the parting tool assembly engagement assembly 260 of the parting tool assembly 64 to leave the parting tool assembly engagement assembly disk arcuate-shaped throughslot 320 in the parting tool assembly engagement assembly flat and circular-shaped disk 302 of the parting tool assembly engagement assembly 260 of the parting tool assembly 64.

STEP 6: Cause the parting tool assembly engagement assembly rotatable and cylindrically-shaped cam part 284 of the parting tool assembly engagement assembly 260 of the parting tool assembly 64 to separate from the parting tool assembly engagement assembly disk distal surface cammed part 316 of the parting tool assembly engagement assembly flat and circular-shaped disk 302 of the parting tool assembly engagement assembly 260 of the parting tool assembly 64, against the biasing of the parting tool assembly engagement assembly first spring 282 of the parting tool assembly engagement assembly 260 of the parting tool assembly 64 and against the biasing of the parting tool assembly engagement assembly second spring 292 of the parting tool assembly engagement assembly 260 of the parting tool assembly 64.

STEP 7: Cause the parting tool assembly engagement assembly first spring 282 of the parting tool assembly engagement assembly 260 of the parting tool assembly 64 to compress.

STEP 8: Cause the parting tool assembly engagement assembly second spring 292 of the parting tool assembly engagement assembly 260 of the parting tool assembly 64 to compress.

STEP 9: Cause the parting tool assembly engagement assembly rotatable cam part flat distal end 286 of the parting tool assembly engagement assembly rotatable and cylindrically-shaped cam part 284 of the parting tool assembly engagement assembly 260 of the parting tool assembly to abut against, for rotation with, the parting tool assembly engagement assembly rotatable clutch part flat proximal end 280 of the parting tool assembly engagement assembly rotatable and cylindrically-shaped clutch part 276 of the parting tool assembly engagement assembly 260 of the parting tool assembly 64.

STEP 10: Cause the parting tool assembly engagement assembly rotatable clutch part serrated distal end 278 of the parting tool assembly engagement assembly rotatable and cylindrically-shaped clutch part 276 of the parting tool assembly engagement assembly 260 of the parting tool assembly 64 to engage, for rotation with, the parting tool assembly engagement assembly fixed clutch part serrated proximal end 274 of the parting tool assembly engagement assembly fixed and cylindrically-shaped clutch part 270 of the parting tool assembly engagement assembly 260 of the parting tool assembly 64, so that the parting tool assembly 64 is engaged.

STEP 11: Rotate the rotatable cylindrically-shaped frame 38 relative to the fixed cylindrically-shaped frame 14.

STEP 12: Cause the parting tool assembly rotatable frame first gear 216 of the parting tool assembly 64 to rotate, by virtue of its rotative engagement with the gear teeth 36 in the fixed frame distal end circumferentially-disposed track 34 in the fixed frame circular-shaped and open distal end 32 of the fixed cylindrically-shaped frame 14.

STEP 13: Cause the parting tool assembly rotatable frame second gear 218 of the parting tool assembly 64 to rotate, by virtue of its rotative engagement with the parting tool assembly rotatable frame first gear 216 of the parting tool assembly 64.

STEP 14: Cause the parting tool assembly rotatable frame second gear eccentric 220 of the parting tool assembly 64 to rotate, by virtue of it being fixedly attached to the parting tool assembly rotatable frame second gear 218 of the parting tool assembly 64.

STEP 15: Cause the parting tool assembly reciprocating rod 224 of the parting tool assembly 64 to reciprocate in the parting tool assembly housing elongated, slender, and cylindrically-shaped guide bore 160 in the parting tool assembly rectangular-parallelepiped-shaped housing 142 of the parting tool assembly 64, by virtue of it being pivotally mounted at one end to the parting tool assembly rotatable frame second gear eccentric 220 of the parting tool assembly 64.

STEP 16: Cause the parting tool assembly reciprocating block 226 of the parting tool assembly 64 to reciprocate in the parting tool assembly housing cubic-shaped internal chamber 158 in the parting tool assembly rectangular-parallelepiped-shaped housing 142 of the parting tool assembly 64, by virtue of it being pivotally attached to another end of the parting tool assembly reciprocating rod 224 of the parting tool assembly 64.

STEP 17: Cause the parting tool assembly reciprocating block pin 228 of the parting tool assembly reciprocating block 226 of the parting tool assembly 64 to reciprocate in the parting tool assembly housing cubic-shaped internal chamber 158 in the parting tool assembly rectangular-parallelepiped-shaped housing 142 of the parting tool assembly 64, by virtue it being attached to the parting tool assembly reciprocating block 226 of the parting tool assembly 64.

STEP 18: Cause the parting tool assembly cylindrically-shaped collar 246 of the parting tool assembly 64 to reciprocate in the parting tool assembly housing centrally-disposed and cylindrically-shaped longitudinal through-bore 156 in the parting tool assembly rectangular-parallelepiped-shaped housing 142 of the parting tool assembly 64, by virtue of the parting tool assembly threaded yoke 256 of the parting tool assembly 64 threadably engaging the parting tool assembly collar outer surface radially-oriented and threaded bore 254 in the parting tool assembly collar cylindrically-shaped outer surface 252 of the parting tool assembly cylindrically-shaped collar 246 of the parting tool assembly 64 and being pivotally mounted to the parting tool assembly reciprocating block pin 228 on the parting tool assembly reciprocating block 226 of the parting tool assembly 64 by the parting tool assembly yoke pivot pin 258.

STEP 19: Cause the parting tool assembly engagement assembly rotatable and cylindrically-shaped clutch part 276 of the parting tool assembly engagement assembly 260 of the parting tool assembly 64 to rotate, via the reciprocating movement of the parting tool assembly cylindrically-shaped collar 246 of the parting tool assembly 64, by virtue of the parting tool assembly resistance assembly plunger 240 of the parting tool assembly resistance assembly 238 of the parting tool assembly 64 being biased, by the parting tool assembly resistance assembly spring 242 of the parting tool assembly resistance assembly 238 of the parting tool assembly 64, against the parting tool assembly engagement assembly rotatable and cylindrically-shaped clutch part 276 of the parting tool assembly engagement assembly 260 of the parting tool assembly 64 and thereby preventing the parting tool assembly engagement assembly rotatable and cylindrically-shaped clutch part 276 of the parting tool assembly engagement assembly 260 of the parting tool assembly 64 from reciprocating with the parting tool assembly cylindrically-shaped collar 246 of the parting tool assembly 64 as the parting tool assembly collar cylindrically-shaped inner surface ratchet surface 250 on the parting tool assembly collar cylindrically-shaped inner surface 248 of the parting tool assembly cylindrically-shaped collar 246 of the parting tool assembly 64 reciprocates.

STEP 20: Cause the parting tool assembly engagement assembly fixed and cylindrically-shaped clutch part 270 of the parting tool assembly engagement assembly 260 of the parting tool assembly 64 to rotate, by virtue of its engagement with the parting tool assembly engagement assembly rotatable and cylindrically-shaped clutch part 276 of the parting tool assembly engagement assembly 260 of the parting tool assembly 64.

STEP 21: Cause the parting tool assembly engagement assembly elongated, slender, and cylindrically-shaped shaft 262 of the parting tool assembly engagement assembly 260 of the parting tool assembly 64 to rotate, by virtue of it being fixedly attached to the parting tool assembly engagement assembly fixed and cylindrically-shaped clutch part 270 of the parting tool assembly engagement assembly 260 of the parting tool assembly 64.

STEP 22: Cause the parting tool assembly engagement assembly distal end gear 268 of the parting tool assembly engagement assembly 260 of the parting tool assembly 64 to rotate, by virtue of it being fixedly attached to the parting tool assembly engagement assembly elongated, slender, and cylindrically-shaped shaft 262 of the parting tool assembly engagement assembly 260 of the parting tool assembly 64.

STEP 23: Cause the parting tool assembly large gear 196 of the parting tool assembly 64 to rotate, by virtue of its rotatable engagement with the parting tool assembly engagement assembly distal end gear 268 of the parting tool assembly engagement assembly 260 of the parting tool assembly 64.

STEP 24: Cause the parting tool assembly gear shaft 198 of the parting tool assembly engagement assembly 260 of the parting tool assembly 64 to rotate, by virtue of it being fixedly attached to the parting tool assembly large gear 196 of the parting tool assembly 64.

STEP 25: Cause the parting tool assembly small gear 200 of the parting tool assembly 64 to rotate, by virtue of it being fixedly attached to the parting tool assembly gear shaft 198 of the parting tool assembly engagement assembly 260 of the parting tool assembly 64.

STEP 26: Cause the parting tool assembly rack gear 208 of the parting tool assembly 64 to traverse radially inwardly, by virtue of its engagement with the parting tool assembly small gear 200 of the parting tool assembly 64.

STEP 27: Cause the parting tool assembly generally trapezoidal-shaped upper cover 202 of the parting tool assembly 64 to slide radially along the parting tool assembly rectangular-shaped and T-shape in profile intermediate plate 174 of the parting tool assembly 64, by virtue of it being fixedly attached to the parting tool assembly rack gear 208 of the parting tool assembly 64 and its parting tool assembly upper cover T-shaped track 204 slidingly engaging the parting tool assembly rectangular-shaped and T-shape in profile intermediate plate 174 of the parting tool assembly 64.

STEP 28: Cause the parting tool assembly parting tool bit 212 of the parting tool assembly 64 to move radially inwardly and progressively cut the pipe 12, by virtue of it being fixedly attached to the parting tool assembly generally trapezoidal-shaped upper cover 202 of the parting tool assembly 64.

STEP 29: Cause the parting tool assembly release assembly wide portion 234 of the parting tool assembly cylindrically-shaped release assembly 230 of the parting tool assembly 64 to move radially outwardly in the parting tool assembly upper cover inner surface elongated and slender stop recess 213 in the parting tool assembly generally trapezoidal-shaped upper cover 202 of the parting tool assembly 64, against the biasing of the parting tool assembly release assembly spring 236 of the parting tool assembly cylindrically-shaped release assembly 230 of the parting tool assembly 64, until the parting tool assembly release assembly wide portion 234 of the parting tool assembly cylindrically-shaped release assembly 230 of the parting tool assembly 64 reaches a tapered portion therein.

STEP 30: Cause the parting tool assembly release assembly wide portion 234 of the parting tool assembly cylindrically-shaped release assembly 230 of the parting tool assembly 64 to move, against the biasing of the parting tool assembly release assembly spring 236 of the parting tool assembly cylindrically-shaped release assembly 230 of the parting tool assembly 64.

STEP 31: Cause the parting tool assembly release assembly spring 236 of the parting tool assembly cylindrically-shaped release assembly 230 of the parting tool assembly 64 to compress.

STEP 32: Cause the parting tool assembly release assembly narrow portion 232 of the parting tool assembly cylindrically-shaped release assembly 230 of the parting tool assembly 64 to extend past the parting tool assembly housing upper cover throughbore 172 in the parting tool assembly housing rectangular-shaped upper cover 166 of the parting tool assembly rectangular-parallelepiped-shaped housing 142 of the parting tool assembly 64.

STEP 33: Cause the parting tool assembly release assembly narrow portion 232 of the parting tool assembly cylindrically-shaped release assembly 230 of the parting tool assembly 64 to obstruct the parting tool assembly engagement assembly flat and elongated arm 294 of the parting tool assembly engagement assembly 260 of the parting tool assembly 64, and stop its rotation.

STEP 34. Cause the parting tool assembly engagement assembly disk distal surface cammed part flats 318 of the parting tool assembly engagement assembly disk distal surface cammed part 316 of the parting tool assembly engagement assembly disk distal surface 304 of the parting tool assembly engagement assembly flat and circular-shaped disk 302 of the parting tool assembly engagement assembly 260 of the parting tool assembly 64 to ride along the parting tool assembly engagement assembly rotatable cam part cammed proximal end flats 290 of the parting tool assembly engagement assembly rotatable cam part cammed proximal end 288 of the parting tool assembly engagement assembly rotatable and cylindrically-shaped cam part 284 of the parting tool assembly engagement assembly 260 of the parting tool assembly 64.

STEP 35: Cause the parting tool assembly engagement assembly disk distal surface cammed part 316 of the parting tool assembly engagement assembly flat and circular-shaped disk 302 of the parting tool assembly engagement assembly 260 of the parting tool assembly 64 to engage the parting tool assembly engagement assembly rotatable cam part cammed proximal end 288 of the parting tool assembly engagement assembly rotatable and cylindrically-shaped cam part 284 of the parting tool assembly engagement assembly 260 of the parting tool assembly 64.

STEP 36: Cause the parting tool assembly engagement assembly arm second pin 300 of the parting tool assembly engagement assembly flat and elongated arm 294 of the parting tool assembly engagement assembly 260 of the parting tool assembly 64 to enter the parting tool assembly engagement assembly disk arcuate-shaped through-slot 320 in the parting tool assembly engagement assembly flat and circular-shaped disk 302 of the parting tool assembly engagement assembly 260 of the parting tool assembly 64.

STEP 37: Cause the parting tool assembly engagement assembly second spring 292 of the parting tool assembly engagement assembly 260 of the parting tool assembly 64 to expand.

STEP 38: Cause the parting tool assembly engagement assembly first spring 282 of the parting tool assembly engagement assembly 260 of the parting tool assembly 64 to expand.

STEP 39: Cause the parting tool assembly engagement assembly rotatable clutch part serrated distal end 278 of the parting tool assembly engagement assembly rotatable and cylindrically-shaped clutch part 276 of the parting tool assembly engagement assembly 260 of the parting tool assembly 64 to disengage from the parting tool assembly engagement assembly fixed clutch part serrated proximal end 274 of the parting tool assembly engagement assembly fixed and cylindrically-shaped clutch part 270 of the parting tool assembly engagement assembly 260 of the parting tool assembly 64, by virtue of the parting tool assembly engagement assembly first spring 282 of the parting tool assembly engagement assembly 260 of the parting tool assembly 64 expanding, so that the parting tool assembly 64 is disengaged and the pipe 12 is cut.

Figure 7:
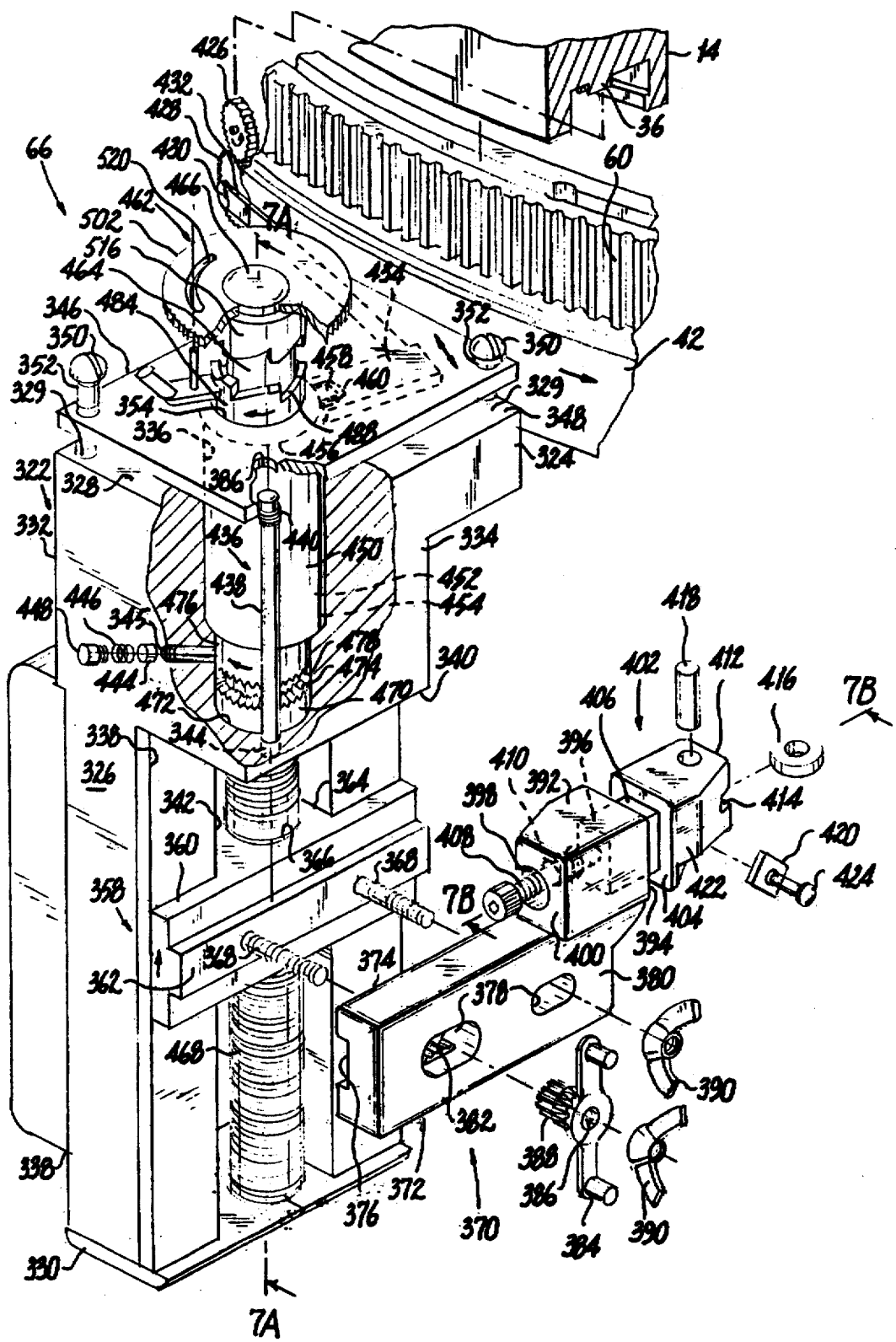
FIG. 7 is an enlarged exploded perspective view in partial section of the scraping tool assembly of the present generally enclosed by the dotted circle identified by arrow 7 in FIG. 1.
Figure 7A:
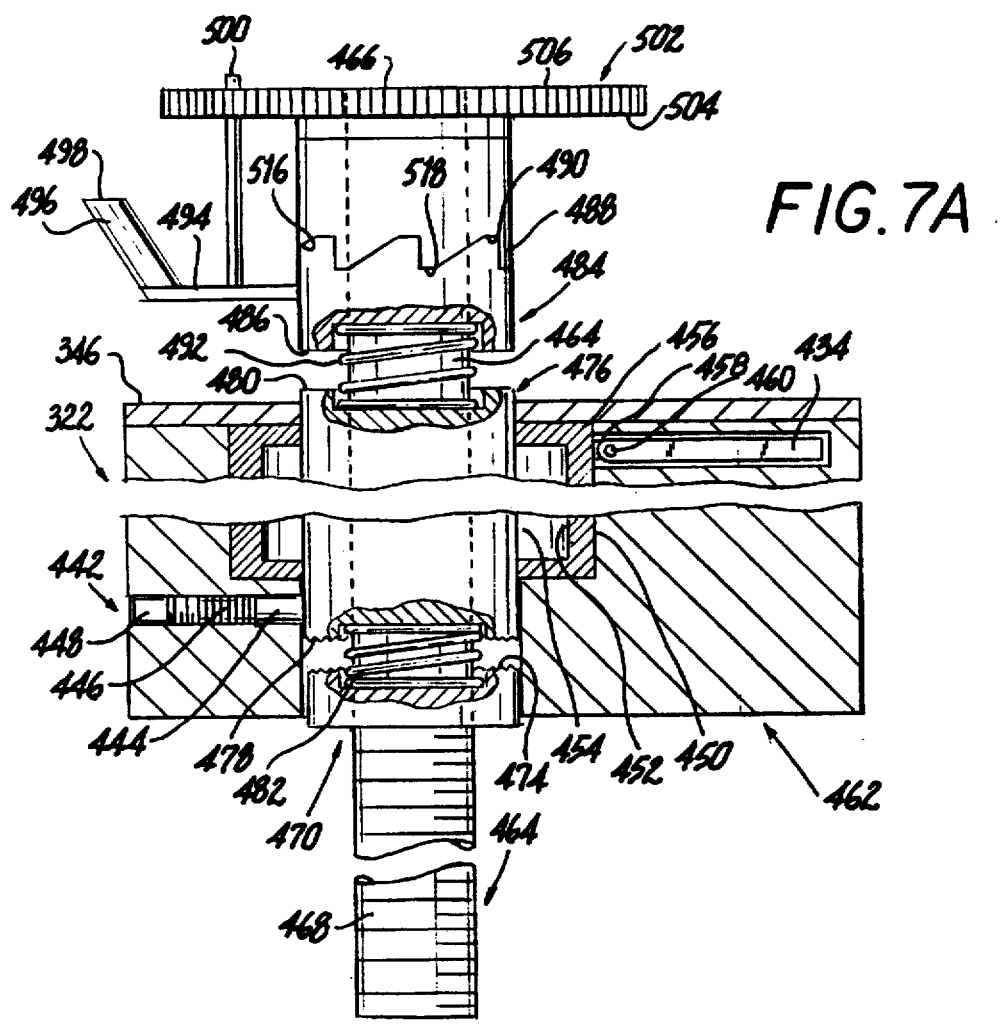
FIG. 7A is an enlarged cross sectional view taken on line 7A—7A in FIG. 6.
Figure 7B:
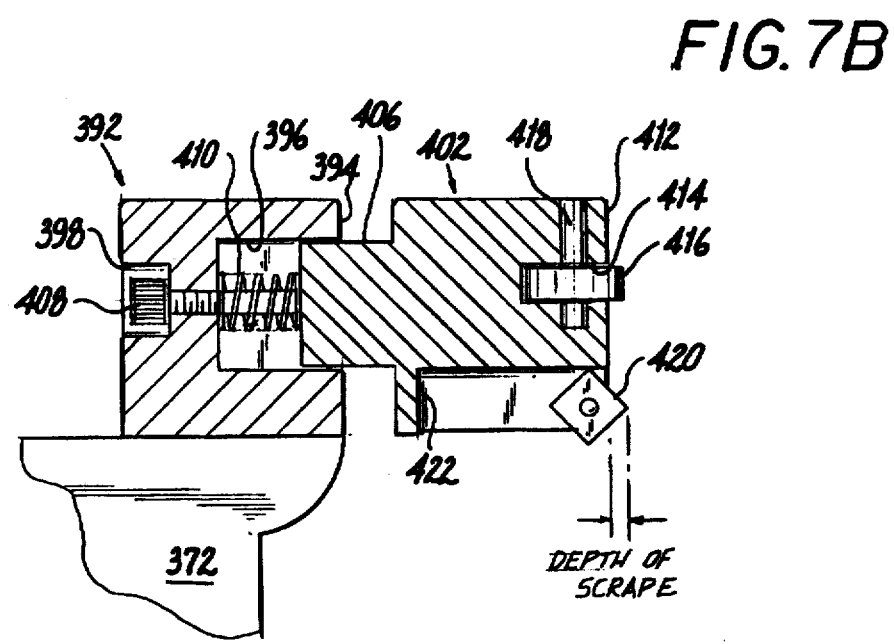
FIG. 7B is an enlarged cross sectional view taken on line 7B—7B in FIG. 6.

The configuration of the scrapping and finishing tool assembly 66 can best be seen in FIGS. 7, 7A, and 7B, which are an enlarged exploded perspective view in partial section of the scraping tool assembly of the present generally enclosed by the dotted circle identified by arrow 7 in FIG. 1, an enlarged cross sectional view taken on line 7A—7A in FIG. 6, and an enlarged cross sectional view taken on line 7B—7B in FIG. 6, respectively, and as such will be discussed with reference thereto.

The scrapping and finishing tool assembly 66 includes a scrapping and finishing tool assembly rectangular-parallelepiped-shaped housing 322 that extends radially outwardly from the rotatable frame second semi-cylindrically-shaped portion 42 of the rotatable cylindrically-shaped frame 38.

The scrapping and finishing tool assembly rectangular-parallelepiped-shaped housing 322 of the scrapping and finishing tool assembly 66 has a scrapping and finishing tool housing innermost face 324 disposed on the rotatable frame second semi-cylindrically-shaped portion 42 of the rotatable cylindrically-shaped frame 38, a scrapping and finishing tool assembly housing outermost face 326 that is spaced from, and parallel to, the scrapping and finishing tool assembly housing innermost face 324 of the scrapping and finishing tool assembly rectangular-parallelepiped-shaped housing 322 of the scrapping and finishing tool assembly 66.

The scrapping and finishing tool assembly rectangular-parallelepiped-shaped housing 322 of the scrapping and finishing tool assembly 66 further has a scrapping and finishing tool assembly housing rearwardmost face 328 with a scrapping and finishing tool assembly housing rearwardmost face pair of threaded bores 329 disposed at opposing corners thereof, and a scrapping and finishing tool assembly housing forwardmost face 330 that is spaced from, and parallel to, the scrapping and finishing tool assembly housing rearwardmost face 328 of the scrapping and finishing tool assembly rectangular-parallelepiped-shaped housing 322 of the scrapping and finishing tool assembly 66.

The scrapping and finishing tool assembly rectangular-parallelepiped-shaped housing 322 of the scrapping and finishing tool assembly 66 further has a scrapping and finishing tool assembly housing upper face 332, and a scrapping and finishing tool assembly housing lower face 334 that is spaced from, and parallel to, the scrapping and finishing tool assembly housing upper face 332 of the scrapping and finishing tool assembly rectangular-parallelepiped-shaped housing 322 of the scrapping and finishing tool assembly 66.

The scrapping and finishing tool assembly rectangular-parallelepiped-shaped housing 322 of the scrapping and finishing tool assembly 66 further has a scrapping and finishing tool assembly housing centrally-disposed and cylindrically-shaped longitudinal throughbore 336 that extends longitudinally therethrough, from and opening into, the scrapping and finishing tool assembly housing rearwardmost face 328 of the scrapping and finishing tool assembly rectangular-parallelepiped-shaped housing 322 of the scrapping and finishing tool assembly 66, to and opening into, the scrapping and finishing tool assembly housing forwardmost face 330 of the scrapping and finishing tool assembly rectangular-parallelepiped-shaped housing 322 of the scrapping and finishing tool assembly 66.

The scrapping and finishing tool assembly rectangular-parallelepiped-shaped housing 322 of the scrapping and finishing tool assembly 66 further has a scrapping and finishing tool assembly housing wide and rectangular-parallelepiped-shaped recess 338 that opens into both the scrapping and finishing tool assembly housing outermost face 326 of the scrapping and finishing tool assembly rectangular-parallelepiped-shaped housing 322 of the scrapping and finishing tool assembly 66 and the scrapping and finishing tool assembly housing innermost face 324 of the scrapping and finishing tool assembly rectangular-parallelepiped-shaped housing 322 of the scrapping and finishing tool assembly 66, and opening into, and extends longitudinally rearwardly from, the scrapping and finishing tool assembly housing forwardmost face 330 of the scrapping and finishing tool assembly rectangular-parallelepiped-shaped housing 322 of the scrapping and finishing tool assembly 66 to a scrapping and finishing tool assembly housing wide recess intermediate face 340.

The scrapping and finishing tool assembly rectangular-parallelepiped-shaped housing 322 of the scrapping and finishing tool assembly 66 further has a scrapping and finishing tool assembly housing narrow and rectangular-parallelepiped-shaped recess 342 that opens into, and extends upwardly from the scrapping and finishing tool assembly housing wide and rectangular-parallelepiped-shaped recess 338 in the scrapping and finishing tool assembly rectangular-parallelepiped-shaped housing 322 of the scrapping and finishing tool assembly 66 towards the scrapping and finishing tool assembly housing upper face 332 of the scrapping and finishing tool assembly rectangular-parallelepiped-shaped housing 322 of the scrapping and finishing tool assembly 66, and longitudinally from the scrapping and finishing tool assembly housing forwardmost face 330 of the scrapping and finishing tool assembly rectangular-parallelepiped-shaped housing 322 of the scrapping and finishing tool assembly 66 to the scrapping and finishing tool assembly housing wide intermediate face 340 in the scrapping and finishing tool assembly rectangular-parallelepiped-shaped housing 322 of the scrapping and finishing tool assembly 66, where it communicates with the scrapping and finishing tool assembly housing centrally-disposed and cylindrically-shaped longitudinal throughbore 336 in the scrapping and finishing tool assembly rectangular-parallelepiped-shaped housing 322 of the scrapping and finishing tool assembly 66.

The scrapping and finishing tool assembly rectangular-parallelepiped-shaped housing 322 of the scrapping and finishing tool assembly 66 further has a scrapping and finishing tool assembly housing elongated, slender, and cylindrically-shaped guide bore 344 that extends longitudinally from, and opening into the scrapping and finishing tool assembly housing rearwardmost face 328 of the scrapping and finishing tool assembly rectangular-parallelepiped-shaped housing 322 of the scrapping and finishing tool assembly 66 to, and opening into, the scrapping and finishing tool assembly housing wide recess intermediate face 340 in the scrapping and finishing tool assembly rectangular-parallelepiped-shaped housing 322 of the scrapping and finishing tool assembly 66, and is parallel to the scrapping and finishing tool assembly housing centrally-disposed and cylindrically-shaped longitudinal throughbore 336 in the scrapping and finishing tool assembly rectangular-parallelepiped-shaped housing 322 of the scrapping and finishing tool assembly 66.

The scrapping and finishing tool assembly rectangular-parallelepiped-shaped housing 322 of the scrapping and finishing tool assembly 66 further has a scrapping and finishing tool assembly housing threaded bore 345 that extends from, and opening into, the scrapping and finishing tool assembly housing outermost face 326 of the scrapping and finishing tool assembly rectangular-parallelepiped-shaped housing 322 of the scrapping and finishing tool assembly 66 to, and communicating with, the scrapping and finishing tool assembly housing centrally-disposed and cylindrically-shaped longitudinal throughbore 336 in the scrapping and finishing tool assembly rectangular-parallelepiped-shaped housing 322 of the scrapping and finishing tool assembly 66.

The scrapping and finishing tool assembly 66 further has a scrapping and finishing tool assembly rectangular-shaped plate 346 that is parallel to, and spaced rearwardly from, the scrapping and finishing tool assembly housing rearwardmost face 328 of the scrapping and finishing tool assembly rectangular-parallelepiped-shaped housing 322 of the scrapping and finishing tool assembly 66, and forms therebetween a scrapping and finishing tool assembly plate space 348 in the scrapping and finishing tool assembly 66.

The scrapping and finishing tool assembly rectangular-shaped plate 346 of the scrapping and finishing tool assembly 66 is attached to the scrapping and finishing tool assembly housing rearwardmost face 328 of the scrapping and finishing tool assembly rectangular-parallelepiped-shaped housing 322 of the scrapping and finishing tool assembly 66, by a scrapping and finishing tool assembly plate pair of screws 350 that pass through a scrapping and finishing tool assembly plate pair of throughbores 352 in a pair of opposing corners of the scrapping and finishing tool assembly rectangular-shaped plate 346 of the scrapping and finishing tool assembly 66, and into the scrapping and finishing tool assembly housing rearwardmost face pair of threaded bores 329 in the scrapping and finishing tool assembly housing rearwardmost face 328 of the scrapping and finishing tool assembly rectangular-parallelepiped-shaped housing 322 of the scrapping and finishing tool assembly 66.

The scrapping and finishing tool assembly rectangular-shaped plate 346 of the scrapping and finishing tool assembly 66 further has a scrapping and finishing tool assembly plate centrally disposed longitudinal throughbore 354 that extends longitudinally therethrough, and is in longitudinal alignment with the scrapping and finishing tool assembly housing centrally-disposed and cylindrically-shaped longitudinal throughbore 336 in the scrapping and finishing tool assembly rectangular-parallelepiped-shaped housing 322 of the scrapping and finishing tool assembly 66.

The scrapping and finishing tool assembly rectangular-shaped plate 346 of the scrapping and finishing tool assembly 66 further has a scrapping and finishing tool assembly plate corner longitudinal throughbore 356 that extends longitudinally therethrough, and is in longitudinal alignment with the scrapping and finishing tool assembly housing elongated, slender, and cylindrically-shaped guide bore 344 in the scrapping and finishing tool assembly rectangular-parallelepiped-shaped housing 322 of the scrapping and finishing tool assembly 66.

The scrapping and finishing tool assembly 66 further includes a scrapping and finishing tool assembly rectangular-shaped and T-shape in profile plate 358 that is longitudinally slidably mounted in the scrapping and finishing tool assembly housing wide and rectangular-parallelepiped-shaped recess 338 in the scrapping and finishing tool assembly rectangular-parallelepiped-shaped housing 322 of the scrapping and finishing tool assembly 66 and has a scrapping and finishing tool assembly plate upper face 360 and a scrapping and finishing tool assembly plate lower face 362.

The scrapping and finishing tool assembly rectangular-shaped and T-shape in profile plate 358 of the scrapping and finishing tool assembly 66 further has a scrapping and finishing tool assembly plate collar 364 that is integrally formed on the scrapping and finishing tool assembly plate upper face 360 of the scrapping and finishing tool assembly rectangular-shaped and T-shape in profile plate 358 of the scrapping and finishing tool assembly 66.

The scrapping and finishing tool assembly plate collar 364 of the scrapping and finishing tool assembly rectangular-shaped and T-shape in profile plate 358 of the scrapping and finishing tool assembly 66 is longitudinally slidable mounted in the scrapping and finishing tool assembly housing narrow and rectangular-parallelepiped-shaped recess 342 of the scrapping and finishing tool assembly rectangular-parallelepiped-shaped housing 322 of the scrapping and finishing tool assembly 66, and has a scrapping and finishing tool assembly plate collar threaded throughbore 366 that passes longitudinally therethrough.

The scrapping and finishing tool assembly rectangular-shaped and T-shape in profile plate 358 of the scrapping and finishing tool assembly 66 further has a scrapping and finishing tool assembly plate pair of threaded rods 368 that are fixedly attached to, and extend perpendicularly outwardly from, the scrapping and finishing tool assembly plate lower face 362 of the scrapping and finishing tool assembly rectangular-shaped and T-shape in profile plate 358 of the scrapping and finishing tool assembly 66.

The scrapping and finishing tool assembly 66 further includes a scrapping and finishing tool assembly scrapping and finishing tool bit assembly 370 that is radially slidably mounted to the scrapping and finishing tool assembly rectangular-shaped and T-shape in profile plate 358 of the scrapping and finishing tool assembly 66.

The scrapping and finishing tool assembly scrapping and finishing tool bit assembly 370 of the scrapping and finishing tool assembly 66 includes a scrapping and finishing tool assembly scrapping and finishing tool bit assembly generally rectangular-parallelepiped-shaped body 372.

The scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66 has a scrapping and finishing tool assembly scrapping and finishing tool bit assembly body upper face 374 with a scrapping and finishing tool assembly scrapping and finishing tool bit assembly body upper face recess 376 that radially slidably receives the scrapping and finishing tool assembly plate lower face 362 of the scrapping and finishing tool assembly rectangular-shaped and T-shape in profile plate 358 of the scrapping and finishing tool assembly 66.

The scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66 further has a scrapping and finishing tool assembly scrapping and finishing tool bit assembly body pair of elongated and radially-aligned throughbores 378 that extend therethrough, from and opening into, the scrapping and finishing tool assembly scrapping and finishing tool bit assembly body upper face recess 376 in the scrapping and finishing tool assembly scrapping and finishing tool bit assembly body upper face 374 of the scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66 to, and opening into, a scrapping and finishing tool assembly scrapping and finishing tool bit assembly body lower face 380 of the scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66, and radially movably receive the scrapping and finishing tool assembly plate pair of threaded rods 368 of the scrapping and finishing tool assembly rectangular-shaped and T-shape in profile plate 358 of the scrapping and finishing tool assembly 66.

The scrapping and finishing tool assembly scrapping and finishing tool bit assembly 370 of the scrapping and finishing tool assembly 66 further includes a scrapping and finishing tool assembly scrapping and finishing tool bit assembly rack gear 382 that is fixedly attached in, for movement with, an outermost throughbore of the scrapping and finishing tool assembly scrapping and finishing tool bit assembly body pair of elongated and radially-aligned throughbores 378 in the scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66.

The scrapping and finishing tool assembly scrapping and finishing tool bit assembly 370 of the scrapping and finishing tool assembly 66 further includes a scrapping and finishing tool assembly scrapping and finishing tool bit assembly crank 384 that has a scrapping and finishing tool assembly scrapping and finishing tool bit assembly crank throughbore 386 that receives the outermost rod of the scrapping and finishing tool assembly plate pair of threaded rods 368 of the scrapping and finishing tool assembly rectangular-shaped and T-shape in profile plate 358 of the scrapping and finishing tool assembly 66 for rotation relative thereto, and has fixedly attached thereto a scrapping and finishing tool assembly scrapping and finishing tool bit assembly crank gear 388 that passes through the outermost throughbore of the scrapping and finishing tool assembly scrapping and finishing tool bit assembly body pair of elongated and radially-aligned throughbores 378 in the scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66 and engages the scrapping and finishing tool assembly scrapping and finishing tool bit assembly rack gear 382 of the scrapping and finishing tool assembly scrapping and finishing tool bit assembly 370 of the scrapping and finishing tool assembly 66.

The scrapping and finishing tool assembly scrapping and finishing tool bit assembly 370 of the scrapping and finishing tool assembly 66 further includes a scrapping and finishing tool assembly scrapping and finishing tool bit assembly pair of wing nuts 390 that threadably engage the scrapping and finishing tool assembly plate pair of threaded rods 368 of the scrapping and finishing tool assembly rectangular-shaped and T-shape in profile plate 358 of the scrapping and finishing tool assembly 66.

The scrapping and finishing tool assembly scrapping and finishing tool bit assembly 370 of the scrapping and finishing tool assembly 66 further includes a scrapping and finishing tool assembly scrapping and finishing tool bit assembly tool bit head block 392 that is fixedly attached to, extends inwardly and rearwardly from, and is coplanar with, the scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66.

The scrapping and finishing tool assembly scrapping and finishing tool bit assembly tool bit head block 392 of the scrapping and finishing tool assembly scrapping and finishing tool bit assembly 370 of the scrapping and finishing tool assembly 66 has a scrapping and finishing tool assembly scrapping and finishing tool bit assembly tool bit head block innermost face 394 with a scrapping and finishing tool assembly scrapping and finishing tool bit assembly tool bit head block innermost face rectangular-parallelepiped-shaped recess 396.

The scrapping and finishing tool assembly scrapping and finishing tool bit assembly tool bit head block 392 of the scrapping and finishing tool assembly scrapping and finishing tool bit assembly 370 of the scrapping and finishing tool assembly 66 further has a scrapping and finishing tool assembly scrapping and finishing tool bit assembly tool bit head block clearance throughbore 398 that extends from, and opens into, the scrapping and finishing tool assembly scrapping and finishing tool bit assembly tool bit head block innermost face rectangular-parallelepiped-shaped recess 396 in the scrapping and finishing tool assembly scrapping and finishing tool bit assembly tool bit head block innermost face 394 of the scrapping and finishing tool assembly scrapping and finishing tool bit assembly tool bit head block 392 of the scrapping and finishing tool assembly scrapping and finishing tool bit assembly 370 of the scrapping and finishing tool assembly 66 to, and opening into, a scrapping and finishing tool assembly scrapping and finishing tool bit assembly tool bit head block outermost face 400 of the scrapping and finishing tool assembly scrapping and finishing tool bit assembly tool bit head block 392 of the scrapping and finishing tool assembly scrapping and finishing tool bit assembly 370 of the scrapping and finishing tool assembly 66.

The scrapping and finishing tool assembly scrapping and finishing tool bit assembly 370 of the scrapping and finishing tool assembly 66 further includes a scrapping and finishing tool assembly scrapping and finishing tool bit assembly tool bit head 402 that is radially adjustably mounted to the scrapping and finishing tool assembly scrapping and finishing tool bit assembly tool bit head block 392 of the scrapping and finishing tool assembly scrapping and finishing tool bit assembly 370 of the scrapping and finishing tool assembly 66, and has a scrapping and finishing tool assembly scrapping and finishing tool bit assembly tool bit head outermost face 404.

The scrapping and finishing tool assembly scrapping and finishing tool bit assembly tool bit head 402 of the scrapping and finishing tool assembly scrapping and finishing tool bit assembly 370 of the scrapping and finishing tool assembly 66 further has a scrapping and finishing tool assembly scrapping and finishing tool bit assembly tool bit head rectangular-parallelepiped-shaped slide block 406 that extends perpendicularly from the scrapping and finishing tool assembly scrapping and finishing tool bit assembly tool bit head outermost face 404 of the scrapping and finishing tool assembly scrapping and finishing tool bit assembly tool bit head 402 of the scrapping and finishing tool assembly scrapping and finishing tool bit assembly 370 of the scrapping and finishing tool assembly 66, and is movably received in the scrapping and finishing tool assembly scrapping and finishing tool bit assembly tool bit head block innermost face rectangular-parallelepiped-shaped recess 396 in the scrapping and finishing tool assembly scrapping and finishing tool bit assembly tool bit head block innermost face 394 of the scrapping and finishing tool assembly scrapping and finishing tool bit assembly tool bit head block 392 of the scrapping and finishing tool assembly scrapping and finishing tool bit assembly 370 of the scrapping and finishing tool assembly 66.

The scrapping and finishing tool assembly scrapping and finishing tool bit assembly tool bit head 402 of the scrapping and finishing tool assembly scrapping and finishing tool bit assembly 370 of the scrapping and finishing tool assembly 66 further has a scrapping and finishing tool assembly scrapping and finishing tool bit assembly tool bit head allen bolt 408 that passes freely through the scrapping and finishing tool assembly scrapping and finishing tool bit assembly tool bit head block clearance throughbore 398 in the scrapping and finishing tool assembly scrapping and finishing tool bit assembly tool bit head block 392 of the scrapping and finishing tool assembly scrapping and finishing tool bit assembly 370 of the scrapping and finishing tool assembly 66, from the scrapping and finishing tool assembly scrapping and finishing tool bit assembly tool bit head block outermost face 400 of the scrapping and finishing tool assembly scrapping and finishing tool bit assembly tool bit head block 392 of the scrapping and finishing tool assembly scrapping and finishing tool bit assembly 370 of the scrapping and finishing tool assembly 66, and threadably engages the scrapping and finishing tool assembly scrapping and finishing tool bit assembly tool bit head rectangular-parallelepiped-shaped slide block 406 of the scrapping and finishing tool assembly scrapping and finishing tool bit assembly tool bit head 402 of the scrapping and finishing tool assembly scrapping and finishing tool bit assembly 370 of the scrapping and finishing tool assembly 66.

The scrapping and finishing tool assembly scrapping and finishing tool bit assembly 370 of the scrapping and finishing tool assembly 66 further includes a scrapping and finishing tool assembly scrapping and finishing tool bit assembly spring 410 that is coaxially disposed on the scrapping and finishing tool assembly scrapping and finishing tool bit assembly tool bit head allen bolt 408 of the scrapping and finishing tool assembly scrapping and finishing tool bit assembly tool bit head 402 of the scrapping and finishing tool assembly scrapping and finishing tool bit assembly 370 of the scrapping and finishing tool assembly 66, rests in the scrapping and finishing tool assembly scrapping and finishing tool bit assembly tool bit head block innermost face rectangular-parallelepiped-shaped recess 396 in the scrapping and finishing tool assembly scrapping and finishing tool bit assembly tool bit head block innermost face 394 of the scrapping and finishing tool assembly scrapping and finishing tool bit assembly tool bit head block 392 of the scrapping and finishing tool assembly scrapping and finishing tool bit assembly 370 of the scrapping and finishing tool assembly 66, and biases the scrapping and finishing tool assembly scrapping and finishing tool bit assembly tool bit head 402 of the scrapping and finishing tool assembly scrapping and finishing tool bit assembly 370 of the scrapping and finishing tool assembly 66 away from the scrapping and finishing tool assembly scrapping and finishing tool bit assembly tool bit head block 392 of the scrapping and finishing tool assembly scrapping and finishing tool bit assembly 370 of the scrapping and finishing tool assembly 66.

The scrapping and finishing tool assembly scrapping and finishing tool bit assembly tool bit head 402 of the scrapping and finishing tool assembly scrapping and finishing tool bit assembly 370 of the scrapping and finishing tool assembly 66 further has a scrapping and finishing tool assembly scrapping and finishing tool bit assembly tool bit head innermost face 412 with a scrapping and finishing tool assembly scrapping and finishing tool bit assembly tool bit head innermost face slot 414 that extends therealong.

The scrapping and finishing tool assembly scrapping and finishing tool bit assembly 370 of the scrapping and finishing tool assembly 66 further includes a scrapping and finishing tool assembly scrapping and finishing tool bit assembly guide roller 416 that is rotatably mounted in the scrapping and finishing tool assembly scrapping and finishing tool bit assembly tool bit head innermost face slot 414 in the scrapping and finishing tool assembly scrapping and finishing tool bit assembly tool bit head innermost face 412 of the scrapping and finishing tool assembly scrapping and finishing tool bit assembly tool bit head 402 of the scrapping and finishing tool assembly scrapping and finishing tool bit assembly 370 of the scrapping and finishing tool assembly 66, by a scrapping and finishing tool assembly scrapping and finishing tool bit assembly guide ring pivot pin 418 that extends longitudinally therethrough.

The scrapping and finishing tool assembly scrapping and finishing tool bit assembly 370 of the scrapping and finishing tool assembly 66 further includes a scrapping and finishing tool assembly scrapping and finishing tool bit assembly generally square-shaped scrapping and finishing tool bit 420 that is rotatably mounted in a scrapping and finishing tool assembly scrapping and finishing tool bit assembly tool bit head recess 422 in the scrapping and finishing tool assembly scrapping and finishing tool bit assembly tool bit head 402 of the scrapping and finishing tool assembly scrapping and finishing tool bit assembly 370 of the scrapping and finishing tool assembly 66, by a scrapping and finishing tool assembly scrapping and finishing tool bit assembly tool bit pivot pin 424.

The scrapping and finishing tool assembly scrapping and finishing tool bit assembly generally square-shaped scrapping and finishing tool bit 420 of the scrapping and finishing tool assembly scrapping and finishing tool bit assembly 370 of the scrapping and finishing tool assembly 66 is forward of, and extends slightly past, the scrapping and finishing tool assembly scrapping and finishing tool bit assembly guide roller 416 of the scrapping and finishing tool assembly scrapping and finishing tool bit assembly 370 of the scrapping and finishing tool assembly 66.

The scrapping and finishing tool assembly 66 further includes a scrapping and finishing tool assembly rotatable frame first gear 426 that is rotatably mounted to the rotatable frame second semi-cylindrically-shaped portion 42 of the rotatable cylindrically-shaped frame 38, behind the rotatable frame proximal end ring gear 60 of the circular-shaped and open proximal end 56 of the rotatable cylindrically-shaped frame 38, and rotatably engaging the gear teeth 36 in the fixed frame distal end circumferentially-disposed track 34 in the fixed frame circular-shaped and open distal end 32 of the fixed cylindrically-shaped frame 14.

The scrapping and finishing tool assembly 66 further includes a scrapping and finishing tool assembly rotatable frame second gear 428 that is rotatably mounted in the rotatable frame second semi-cylindrically-shaped portion 42 of the rotatable cylindrically-shaped frame 38, forward of, and rotatably engaging, the scrapping and finishing tool assembly rotatable frame first gear 426 of the scrapping and finishing tool assembly 66.

The scrapping and finishing tool assembly 66 further includes a scrapping and finishing tool assembly rotatable frame second gear eccentric 430 that is fixedly disposed on, outward of, and for rotation with, the scrapping and finishing tool assembly rotatable frame second gear 428.

The scrapping and finishing tool assembly rotatable frame second gear 428 of the scrapping and finishing tool assembly 66 and the scrapping and finishing tool assembly rotatable frame second gear eccentric 430 of the scrapping and finishing tool assembly 66 are accessible via a rotatable frame threaded cap (not shown but is identical to the rotatable frame threaded cap 222) that threadably engages the rotatable frame second semi-cylindrically-shaped portion 42 of the rotatable cylindrically-shaped frame 38.

The scrapping and finishing tool assembly 66 further includes a scrapping and finishing tool assembly reciprocating rod 432 that is pivotally mounted at one end to the scrapping and finishing tool assembly rotatable frame second gear eccentric 430 of the scrapping and finishing tool assembly 66, and extends into the scrapping and finishing tool assembly plate space 348 in the scrapping and finishing tool assembly 66.

The scrapping and finishing tool assembly 66 further includes a scrapping and finishing tool assembly reciprocating flat arm 434 that is pivotally attached to another end of the scrapping and finishing tool assembly reciprocating rod 432 of the scrapping and finishing tool assembly 66 for reciprocation therewith, and is movably disposed in the scrapping and finishing tool assembly plate space 348 in the scrapping and finishing tool assembly 66.

The scrapping and finishing tool assembly 66 further includes a scrapping and finishing tool assembly release assembly 436 that has a scrapping and finishing tool assembly release assembly cylindrically-shaped rod 438 that passes movably through the scrapping and finishing tool assembly housing elongated, slender, and cylindrically-shaped guide bore 344 in the scrapping and finishing tool assembly rectangular-parallelepiped-shaped housing 322 of the scrapping and finishing tool assembly 66 and movably through the scrapping and finishing tool assembly plate corner longitudinal throughbore 356 in the scrapping and finishing tool assembly rectangular-shaped plate 346 of the scrapping and finishing tool assembly 66.

The scrapping and finishing tool assembly release assembly cylindrically-shaped rod 438 of the scrapping and finishing tool assembly release assembly 436 of the scrapping and finishing tool assembly 66 is biased from extending past the scrapping and finishing tool assembly rectangular-shaped plate 346 of the scrapping and finishing tool assembly 66, by a scrapping and finishing tool assembly release assembly spring 440 that is disposed coaxially around the scrapping and finishing tool assembly release assembly cylindrically-shaped rod 438 of the scrapping and finishing tool assembly release assembly 436 of the scrapping and finishing tool assembly 66, and is positioned in the scrapping and finishing tool assembly plate space 348 in the scrapping and finishing tool assembly 66.

The scrapping and finishing tool assembly 66 further includes a scrapping and finishing tool assembly resistance assembly 442 that has a scrapping and finishing tool assembly resistance assembly plunger 444 that passes movably into the scrapping and finishing tool assembly housing threaded bore 345 in the scrapping and finishing tool assembly rectangular-parallelepiped-shaped housing 322 of the scrapping and finishing tool assembly 66.

The scrapping and finishing tool assembly resistance assembly 442 of the scrapping and finishing tool assembly 66 further has a scrapping and finishing tool assembly resistance assembly spring 446 that biases the scrapping and finishing tool assembly resistance assembly plunger 440 of the scrapping and finishing tool assembly resistance assembly 442 of the scrapping and finishing tool assembly 66 inwardly in the scrapping and finishing tool assembly housing threaded bore 345 in the scrapping and finishing tool assembly rectangular-parallelepiped-shaped housing 322 of the scrapping and finishing tool assembly 66.

The scrapping and finishing tool assembly resistance assembly 442 of the scrapping and finishing tool assembly 66 further has a scrapping and finishing tool assembly resistance assembly set screw 448 that threadably engages the scrapping and finishing tool assembly housing threaded bore 345 in the scrapping and finishing tool assembly rectangular-parallelepiped-shaped housing 322 of the scrapping and finishing tool assembly 66, and whose rotation regulates the biasing of the scrapping and finishing tool assembly resistance assembly spring 446 of the scrapping and finishing tool assembly resistance assembly 442 of the scrapping and finishing tool assembly 66.

The scrapping and finishing tool assembly 66 further includes a scrapping and finishing tool assembly cylindrically-shaped collar 450 that is disposed coaxially in, for reciprocating movement in, the scrapping and finishing tool assembly housing centrally-disposed and cylindrically-shaped longitudinal throughbore 336 in the scrapping and finishing tool assembly rectangular-parallelepiped-shaped housing 322 of the scrapping and finishing tool assembly 66.

While not to be interpreted as a limitation, the scrapping and finishing tool assembly cylindrically-shaped collar 450 of the scrapping and finishing tool assembly 66, typically can be a ¾" I.D. roller clutch bearing Manufactured by Torrington under part no RCB121616, although it is to be understood that there are probably a wide assortment of other similar roller clutch bearing of various sizes which could be suitably employed in the fabrication of embodiments of the present invention.

The scrapping and finishing tool assembly cylindrically-shaped collar 450 of the scrapping and finishing tool assembly 66 has a scrapping and finishing tool assembly collar cylindrically-shaped inner surface 452 with a scrapping and finishing tool assembly collar cylindrically-shaped inner surface ratchet surface 454 disposed therearound.

The scrapping and finishing tool assembly cylindrically-shaped collar 450 of the scrapping and finishing tool assembly 66 further has a scrapping and finishing tool assembly collar proximal end 456.

The scrapping and finishing tool assembly 66 further includes a scrapping and finishing tool assembly tab 458 that extends outwardly from the scrapping and finishing tool assembly collar proximal end 456 of the scrapping and finishing tool assembly cylindrically-shaped collar 450 of the scrapping and finishing tool assembly 66, is disposed in the scrapping and finishing tool assembly plate space 348 in the scrapping and finishing tool assembly 66, and is pivotally mounted to the scrapping and finishing tool assembly reciprocating flat arm 434 of the scrapping and finishing tool assembly 66, by a scrapping and finishing tool assembly tab pivot pin 460.

The scrapping and finishing tool assembly 66 further includes a scrapping and finishing tool assembly engagement assembly 462 that passes through the scrapping and finishing tool assembly cylindrically-shaped collar 450 of the scrapping and finishing tool assembly 66, and selectively engages and disengages the scrapping and finishing tool assembly 66.

The scrapping and finishing tool assembly engagement assembly 462 of the scrapping and finishing tool assembly 66 includes a scrapping and finishing tool assembly engagement assembly elongated, slender, and cylindrically-shaped shaft 464 with a scrapping and finishing tool assembly engagement assembly shaft proximal end 466 and a scrapping and finishing tool assembly engagement assembly shaft threaded distal portion 468 that extends longitudinally through the scrapping and finishing tool assembly housing narrow and rectangular-parallelepiped-shaped recess 342 in the scrapping and finishing tool assembly rectangular-parallelepiped-shaped housing 322 of the scrapping and finishing tool assembly 66 and threadably engages the scrapping and finishing tool assembly plate collar threaded throughbore 366 in the scrapping and finishing tool assembly plate collar 364 of the scrapping and finishing tool assembly rectangular-shaped and T-shape in profile plate 358 of the scrapping and finishing tool assembly 66.

The scrapping and finishing tool assembly engagement assembly 462 of the scrapping and finishing tool assembly 66 further includes a scrapping and finishing tool assembly engagement assembly fixed and cylindrically-shaped clutch part 470 that has a scrapping and finishing tool assembly engagement assembly fixed clutch part flat distal end 472 and a scrapping and finishing tool assembly engagement assembly fixed clutch part serrated proximal end 474, and is fixedly attached to, for rotation with, the scrapping and finishing tool assembly engagement assembly shaft threaded distal portion 468 of the scrapping and finishing tool assembly engagement assembly elongated, slender, and cylindrically-shaped shaft 464 of the scrapping and finishing tool assembly engagement assembly 462 of the scrapping and finishing tool assembly 66, with the scrapping and finishing tool assembly engagement assembly threaded clutch part flat distal end 472 of the scrapping and finishing tool assembly engagement assembly fixed and cylindrically-shaped clutch part 470 of the scrapping and finishing tool assembly engagement assembly 462 of the scrapping and finishing tool assembly 66 abutting against the scrapping and finishing tool assembly housing wide intermediate face 340 in the scrapping and finishing tool assembly rectangular-parallelepiped-shaped housing 322 of the scrapping and finishing tool assembly 66.

The scrapping and finishing tool assembly engagement assembly 462 of the scrapping and finishing tool assembly 66 further includes a scrapping and finishing tool assembly engagement assembly rotatable and cylindrically-shaped clutch part 476 that contacts the scrapping and finishing tool assembly collar cylindrically-shaped inner surface ratchet surface 454 on the scrapping and finishing tool assembly collar cylindrically-shaped inner surface 452 of the scrapping and finishing tool assembly cylindrically-shaped collar 450 of the scrapping and finishing tool assembly 66, and rotates via the reciprocating movement of the scrapping and finishing tool assembly cylindrically-shaped collar 450 of the scrapping and finishing tool assembly 66, by virtue of the scrapping and finishing tool assembly resistance assembly plunger 444 of the scrapping and finishing tool assembly resistance assembly 442 of the scrapping and finishing tool assembly 66 being biased, by the scrapping and finishing tool assembly resistance assembly spring 446 of the scrapping and finishing tool assembly resistance assembly 442 of the scrapping and finishing tool assembly 66, against the scrapping and finishing tool assembly engagement assembly rotatable and cylindrically-shaped clutch part 450 of the scrapping and finishing tool assembly engagement assembly 462 of the scrapping and finishing tool assembly 66 and thereby preventing the scrapping and finishing tool assembly engagement assembly rotatable and cylindrically-shaped clutch part 450 of the scrapping and finishing tool assembly engagement assembly 462 of the scrapping and finishing tool assembly 66 from reciprocating with the scrapping and finishing tool assembly cylindrically-shaped collar 450 of the scrapping and finishing tool assembly 66 as the scrapping and finishing tool assembly collar cylindrically-shaped inner surface ratchet surface 454 on the scrapping and finishing tool assembly collar cylindrically-shaped inner surface 452 of the scrapping and finishing tool assembly cylindrically-shaped collar 450 of the scrapping and finishing tool assembly 66 reciprocates.

The scrapping and finishing tool assembly engagement assembly rotatable and cylindrically-shaped clutch part 476 of the scrapping and finishing tool assembly engagement assembly 462 of the scrapping and finishing tool assembly 66 has a scrapping and finishing tool assembly engagement assembly rotatable clutch part serrated distal end 478 and a scrapping and finishing tool assembly engagement assembly rotatable clutch part flat proximal end 480, and is rotatably and coaxially attached to, for rotation with when the scrapping and finishing tool assembly 66 is engaged, the scrapping and finishing tool assembly engagement assembly elongated, slender, and cylindrically-shaped shaft 464 of the scrapping and finishing tool assembly engagement assembly 462 of the scrapping and finishing tool assembly 66, with the scrapping and finishing tool assembly engagement assembly rotatable clutch part serrated distal end 478 of the scrapping and finishing tool assembly engagement assembly rotatable and cylindrically-shaped clutch part 476 of the scrapping and finishing tool assembly engagement assembly 462 of the scrapping and finishing tool assembly 66 being in selective engagement with, and disengagement from, the scrapping and finishing tool assembly engagement assembly threaded clutch part serrated proximal end 474 of the scrapping and finishing tool assembly engagement assembly fixed and cylindrically-shaped clutch part 470 of the scrapping and finishing tool assembly engagement assembly 462 of the scrapping and finishing tool assembly 66.

The scrapping and finishing tool assembly engagement assembly 462 of the scrapping and finishing tool assembly 66 further includes a scrapping and finishing tool assembly engagement assembly first spring 482 that is coaxially disposed on the scrapping and finishing tool assembly engagement assembly elongated, slender, and cylindrically-shaped shaft 464 of the scrapping and finishing tool assembly engagement assembly 462 of the scrapping and finishing tool assembly 66, between the scrapping and finishing tool assembly engagement assembly fixed and cylindrically-shaped clutch part 470 of the scrapping and finishing tool assembly engagement assembly 462 of the scrapping and finishing tool assembly 66 and the scrapping and finishing tool assembly engagement assembly rotatable and cylindrically-shaped clutch part 476 of the scrapping and finishing tool assembly engagement assembly 462 of the scrapping and finishing tool assembly 66, and biases the scrapping and finishing tool assembly engagement assembly rotatable and cylindrically-shaped clutch part 476 of the scrapping and finishing tool assembly engagement assembly 462 of the scrapping and finishing tool assembly 66 away from the scrapping and finishing tool assembly engagement assembly fixed and cylindrically-shaped clutch part 470 of the scrapping and finishing tool assembly engagement assembly 462 of the scrapping and finishing tool assembly 66.

The scrapping and finishing tool assembly engagement assembly 462 of the scrapping and finishing tool assembly 66 further includes a scrapping and finishing tool assembly engagement assembly rotatable and cylindrically-shaped cam part 484 that has a scrapping and finishing tool assembly engagement assembly rotatable cam part flat distal end 486 and a scrapping and finishing tool assembly engagement assembly rotatable cam part cammed proximal end 488 with scrapping and finishing tool assembly engagement assembly rotatable cam part cammed proximal end flats 490, and is rotatably and coaxially attached to, for rotation with when the scrapping and finishing tool assembly 66 is engaged, the scrapping and finishing tool assembly engagement assembly elongated, slender, and cylindrically-shaped shaft 464 of the scrapping and finishing tool assembly engagement assembly 462 of the scrapping and finishing tool assembly 66, with the scrapping and finishing tool assembly engagement assembly rotatable cam part flat distal end 486 of the scrapping and finishing tool assembly engagement assembly rotatable and cylindrically-shaped cam part 484 of the scrapping and finishing tool assembly engagement assembly 462 of the scrapping and finishing tool assembly 66 abuttable against, for rotation with when the scrapping and finishing tool assembly 66 is engaged, the scrapping and finishing tool assembly engagement assembly rotatable clutch part flat proximal end 480 of the scrapping and finishing tool assembly engagement assembly rotatable and cylindrically-shaped clutch part 476 of the scrapping and finishing tool assembly engagement assembly 462 of the scrapping and finishing tool assembly 66.

The scrapping and finishing tool assembly engagement assembly 462 of the scrapping and finishing tool assembly 66 further includes a scrapping and finishing tool assembly engagement assembly second spring 492 that is coaxially disposed on the scrapping and finishing tool assembly engagement assembly elongated, slender, and cylindrically-shaped shaft 464 of the scrapping and finishing tool assembly engagement assembly 462 of the scrapping and finishing tool assembly 66, between, and biases apart, the scrapping and finishing tool assembly engagement assembly rotatable and cylindrically-shaped clutch part 476 of the scrapping and finishing tool assembly engagement assembly 462 of the scrapping and finishing tool assembly 66 and the scrapping and finishing tool assembly engagement assembly rotatable and cylindrically-shaped cam part 484 of the scrapping and finishing tool assembly engagement assembly 462 of the scrapping and finishing tool assembly 66.

The scrapping and finishing tool assembly engagement assembly 462 of the scrapping and finishing tool assembly 66 further includes a scrapping and finishing tool assembly engagement assembly flat and elongated arm 494 that extends fixedly outwardly from, for rotation with, the scrapping and finishing tool assembly engagement assembly rotatable and cylindrically-shaped cam part 484 of the scrapping and finishing tool assembly engagement assembly 462 of the scrapping and finishing tool assembly 66, and has a scrapping and finishing tool assembly engagement assembly arm free end 496.

The scrapping and finishing tool assembly engagement assembly flat and elongated arm 494 of the scrapping and finishing tool assembly engagement assembly 462 of the scrapping and finishing tool assembly 66 has a scrapping and finishing tool assembly engagement assembly arm free end first pin 498 that extends fixedly and substantially perpendicularly from the scrapping and finishing tool assembly engagement assembly arm free end 496 of the scrapping and finishing tool assembly engagement assembly flat and elongated arm 494 of the scrapping and finishing tool assembly engagement assembly 462 of the scrapping and finishing tool assembly 66, towards the scrapping and finishing tool assembly engagement assembly shaft proximal end 466 of the scrapping and finishing tool assembly engagement assembly elongated, slender, and cylindrically-shaped shaft 464 of the scrapping and finishing tool assembly engagement assembly 462 of the scrapping and finishing tool assembly 66.

The scrapping and finishing tool assembly engagement assembly flat and elongated arm 494 of the scrapping and finishing tool assembly engagement assembly 462 of the scrapping and finishing tool assembly 66 further has a scrapping and finishing tool assembly engagement assembly arm second pin 500 that extends fixedly and perpendicularly from the scrapping and finishing tool assembly engagement assembly flat and elongated arm 494 of the scrapping and finishing tool assembly engagement assembly 462 of the scrapping and finishing tool assembly 66, towards the scrapping and finishing tool assembly engagement assembly shaft proximal end 466 of the scrapping and finishing tool assembly engagement assembly elongated, slender, and cylindrically-shaped shaft 464 of the scrapping and finishing tool assembly engagement assembly 462 of the scrapping and finishing tool assembly 66, inboard of, parallel to, and longer than, the scrapping and finishing tool assembly engagement assembly arm free end first pin 498 of scrapping and finishing tool assembly engagement assembly flat and elongated arm 494 of the scrapping and finishing tool assembly engagement assembly 462 of the scrapping and finishing tool assembly 66.

The scrapping and finishing tool assembly engagement assembly 462 of the scrapping and finishing tool assembly 66 further includes a scrapping and finishing tool assembly engagement assembly flat and circular-shaped disk 502 that has a scrapping and finishing tool assembly engagement assembly disk distal surface 504, a scrapping and finishing tool assembly engagement assembly disk proximal surface 506, and a scrapping and finishing tool assembly engagement assembly disk circular-shaped periphery 508, and is attached to the scrapping and finishing tool assembly engagement assembly shaft proximal end 466 of the scrapping and finishing tool assembly engagement assembly elongated, slender, and cylindrically-shaped shaft 464 of the scrapping and finishing tool assembly engagement assembly 462 of the scrapping and finishing tool assembly 66.

The scrapping and finishing tool assembly engagement assembly flat and circular-shaped disk 502 of the scrapping and finishing tool assembly engagement assembly 462 of the scrapping and finishing tool assembly 66 further has a scrapping and finishing tool assembly engagement assembly disk distal surface cammed part 516 that is fixedly and coaxially attached to the scrapping and finishing tool assembly engagement assembly disk distal surface 504 of the scrapping and finishing tool assembly engagement assembly flat and circular-shaped disk 502 of the scrapping and finishing tool assembly engagement assembly 462 of the scrapping and finishing tool assembly 66, and has scrapping and finishing tool assembly engagement assembly disk distal surface cammed part flats 518 thereon.

The scrapping and finishing tool assembly engagement assembly disk distal surface cammed part 516 of the scrapping and finishing tool assembly engagement assembly flat and circular-shaped disk 502 of the scrapping and finishing tool assembly engagement assembly 462 of the scrapping and finishing tool assembly 66 is complementary to the scrapping and finishing tool assembly engagement assembly rotatable cam part cammed proximal end 488 of the scrapping and finishing tool assembly engagement assembly rotatable and cylindrically-shaped cam part 484 of the scrapping and finishing tool assembly engagement assembly 462 of the scrapping and finishing tool assembly 66, with the scrapping and finishing tool assembly engagement assembly disk distal surface cammed part flats 518 of the scrapping and finishing tool assembly engagement assembly disk distal surface cammed part 516 of the scrapping and finishing tool assembly engagement assembly disk distal surface 504 of the scrapping and finishing tool assembly engagement assembly flat and circular-shaped disk 502 of the scrapping and finishing tool assembly engagement assembly 462 of the scrapping and finishing tool assembly 66 being abuttable against, for rotation with when the scrapping and finishing tool assembly 66 is engaged, the scrapping and finishing tool assembly engagement assembly rotatable cam part cammed proximal end flats 490 of the scrapping and finishing tool assembly engagement assembly rotatable cam part cammed proximal end 488 of the scrapping and finishing tool assembly engagement assembly rotatable and cylindrically-shaped cam part 484 of the scrapping and finishing tool assembly engagement assembly 462 of the scrapping and finishing tool assembly 66.

The scrapping and finishing tool assembly engagement assembly flat and circular-shaped disk 502 of the scrapping and finishing tool assembly engagement assembly 462 of the scrapping and finishing tool assembly 66 further has a scrapping and finishing tool assembly engagement assembly disk arcuate-shaped throughslot 520 that extends circumferentially, in proximity and parallel to, the scrapping and finishing tool assembly engagement assembly disk circular-shaped periphery 508 of the scrapping and finishing tool assembly engagement assembly flat and circular-shaped disk 502 of the scrapping and finishing tool assembly engagement assembly 462 of the scrapping and finishing tool assembly 66, and selectively receives the scrapping and finishing tool assembly engagement assembly arm second pin 500 of the scrapping and finishing tool assembly engagement assembly flat and elongated arm 494 of the scrapping and finishing tool assembly engagement assembly 462 of the scrapping and finishing tool assembly 66 when the scrapping and finishing tool assembly 66 is disengaged.

The method of operation of the scrapping and finishing tool assembly 66 to scrap and finish the longitudinal outer surface of the pipe 12 will be discussed, infra:

STEP 1: Loosen the scrapping and finishing tool assembly scrapping and finishing tool bit assembly pair of wing nuts 390 of the scrapping and finishing tool assembly scrapping and finishing tool bit assembly 370 of the scrapping and finishing tool assembly 66.

STEP 2: Rotate the scrapping and finishing tool assembly scrapping and finishing tool bit assembly crank 384 of the scrapping and finishing tool assembly scrapping and finishing tool bit assembly 370 of the scrapping and finishing tool assembly 66.

STEP 3: Cause the scrapping and finishing tool assembly scrapping and finishing tool bit assembly crank gear 388 of the scrapping and finishing tool assembly scrapping and finishing tool bit assembly 370 of the scrapping and finishing tool assembly 66 to rotate, by virtue of it being fixedly attached to the scrapping and finishing tool assembly scrapping and finishing tool bit assembly crank 384 of the scrapping and finishing tool assembly scrapping and finishing tool bit assembly 370 of the scrapping and finishing tool assembly 66.

STEP 4: Cause the scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66 to move radially inwardly on the scrapping and finishing tool assembly rectangular-shaped and T-shape in profile plate 358 of the scrapping and finishing tool assembly 66, by virtue of the scrapping and finishing tool assembly scrapping and finishing tool bit assembly rack gear 382 of the scrapping and finishing tool assembly scrapping and finishing tool bit assembly 370 of the scrapping and finishing tool assembly 66 being fixedly attached to the scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66 which in turn engages the scrapping and finishing tool assembly scrapping and finishing tool bit assembly crank gear 388 of the scrapping and finishing tool assembly scrapping and finishing tool bit assembly 370 of the scrapping and finishing tool assembly 66, until the scrapping and finishing tool assembly scrapping and finishing tool bit assembly guide roller 416 of the scrapping and finishing tool assembly scrapping and finishing tool bit assembly 370 of the scrapping and finishing tool assembly 66 contacts the longitudinal outer surface of the pipe 12 and the scrapping and finishing tool assembly scrapping and finishing tool bit assembly generally square-shaped scrapping and finishing tool bit 420 of the scrapping and finishing tool assembly scrapping and finishing tool bit assembly 370 of the scrapping and finishing tool assembly 66 enters the longitudinal outer surface of the pipe 12, by virtue of it extending slightly past the scrapping and finishing tool assembly scrapping and finishing tool bit assembly guide roller 416 of the scrapping and finishing tool assembly scrapping and finishing tool bit assembly 370 of the scrapping and finishing tool assembly 66.

STEP 5: Tighten the scrapping and finishing tool assembly scrapping and finishing tool bit assembly pair of wing nuts 390 of the scrapping and finishing tool assembly scrapping and finishing tool bit assembly 370 of the scrapping and finishing tool assembly 66 so as to secure the scrapping and finishing tool assembly scrapping and finishing tool bit assembly 370 of the scrapping and finishing tool assembly 66 to the scrapping and finishing tool assembly rectangular-shaped and T-shape in profile plate 358 of the scrapping and finishing tool assembly 66.

STEP 6: Grab the scrapping and finishing tool assembly engagement assembly arm free end first pin 498 of scrapping and finishing tool assembly engagement assembly flat and elongated arm 494 of the scrapping and finishing tool assembly engagement assembly 462 of the scrapping and finishing tool assembly 66 in one hand of the user.

STEP 7: Grab the scrapping and finishing tool assembly engagement assembly flat and circular-shaped disk 502 of the scrapping and finishing tool assembly engagement assembly 462 of the scrapping and finishing tool assembly 66 in another hand of the user.

STEP 8: Rotate the scrapping and finishing tool assembly engagement assembly flat and circular-shaped disk 502 of the scrapping and finishing tool assembly engagement assembly 462 of the scrapping and finishing tool assembly 66.

STEP 9: Cause the scrapping and finishing tool assembly engagement assembly disk distal surface cammed part 516 of the scrapping and finishing tool assembly engagement assembly flat and circular-shaped disk 502 of the scrapping and finishing tool assembly engagement assembly 462 of the scrapping and finishing tool assembly 66 to ride along the scrapping and finishing tool assembly engagement assembly rotatable cam part cammed proximal end 488 of the scrapping and finishing tool assembly engagement assembly rotatable and cylindrically-shaped cam part 484 of the scrapping and finishing tool assembly engagement assembly 462 of the scrapping and finishing tool assembly 66, until the scrapping and finishing tool assembly engagement assembly disk distal surface cammed part flats 518 of the scrapping and finishing tool assembly engagement assembly disk distal surface cammed part 516 of the scrapping and finishing tool assembly engagement assembly disk distal surface 504 of the scrapping and finishing tool assembly engagement assembly flat and circular-shaped disk 502 of the scrapping and finishing tool assembly engagement assembly 462 of the scrapping and finishing tool assembly 66 abut against, for rotation with, the scrapping and finishing tool assembly engagement assembly rotatable cam part cammed proximal end flats 490 of the scrapping and finishing tool assembly engagement assembly rotatable cam part cammed proximal end 488 of the scrapping and finishing tool assembly engagement assembly rotatable and cylindrically-shaped cam part 484 of the scrapping and finishing tool assembly engagement assembly 462 of the scrapping and finishing tool assembly 66.

STEP 10: Cause the scrapping and finishing tool assembly engagement assembly arm second pin 500 of the scrapping and finishing tool assembly engagement assembly flat and elongated arm 494 of the scrapping and finishing tool assembly engagement assembly 462 of the scrapping and finishing tool assembly 66 to leave the scrapping and finishing tool assembly engagement assembly disk arcuate-shaped throughslot 520 in the scrapping and finishing tool assembly engagement assembly flat and circular-shaped disk 502 of the scrapping and finishing tool assembly engagement assembly 462 of the scrapping and finishing tool assembly 66.

STEP 11: Cause the scrapping and finishing tool assembly engagement assembly rotatable and cylindrically-shaped cam part 484 of the scrapping and finishing tool assembly engagement assembly 462 of the scrapping and finishing tool assembly 66 to separate from the scrapping and finishing tool assembly engagement assembly disk distal surface cammed part 516 of the scrapping and finishing tool assembly engagement assembly flat and circular-shaped disk 502 of the scrapping and finishing tool assembly engagement assembly 462 of the scrapping and finishing tool assembly 66, against the biasing of the scrapping and finishing tool assembly engagement assembly first spring 482 of the scrapping and finishing tool assembly engagement assembly 462 of the scrapping and finishing tool assembly 66 and against the biasing of the scrapping and finishing tool assembly engagement assembly second spring 492 of the scrapping and finishing tool assembly engagement assembly 462 of the scrapping and finishing tool assembly 66.

STEP 12: Cause the scrapping and finishing tool assembly engagement assembly first spring 482 of the scrapping and finishing tool assembly engagement assembly 462 of the scrapping and finishing tool assembly 66 to compress.

STEP 13: Cause the scrapping and finishing tool assembly engagement assembly second spring 492 of the scrapping and finishing tool assembly engagement assembly 462 of the scrapping and finishing tool assembly 66 to compress.

STEP 14: Cause the scrapping and finishing tool assembly engagement assembly rotatable cam part flat distal end 486 of the scrapping and finishing tool assembly engagement assembly rotatable and cylindrically-shaped cam part 484 of the scrapping and finishing tool assembly engagement assembly 462 of the scrapping and finishing tool assembly to abut against, for rotation with, the scrapping and finishing tool assembly engagement assembly rotatable clutch part flat proximal end 480 of the scrapping and finishing tool assembly engagement assembly rotatable and cylindrically-shaped clutch part 476 of the scrapping and finishing tool assembly engagement assembly 462 of the scrapping and finishing tool assembly 66.

STEP 15: Cause the scrapping and finishing tool assembly engagement assembly rotatable clutch part serrated distal end 478 of the scrapping and finishing tool assembly engagement assembly rotatable and cylindrically-shaped clutch part 476 of the scrapping and finishing tool assembly engagement assembly 462 of the scrapping and finishing tool assembly 66 to engage, for rotation with, the scrapping and finishing tool assembly engagement assembly fixed clutch part serrated proximal end 474 of the scrapping and finishing tool assembly engagement assembly fixed and cylindrically-shaped clutch part 470 of the scrapping and finishing tool assembly engagement assembly 462 of the scrapping and finishing tool assembly 66, so that the scrapping and finishing tool assembly 66 is engaged.

STEP 16: Rotate the rotatable cylindrically-shaped frame 38 relative to the fixed cylindrically-shaped frame 14.

STEP 17: Cause the scrapping and finishing tool assembly rotatable frame first gear 426 of the scrapping and finishing tool assembly 66 to rotate, by virtue of its rotative engagement with the gear teeth 36 in the fixed frame distal end circumferentially-disposed track 34 in the fixed frame circular-shaped and open distal end 32 of the fixed cylindrically-shaped frame 14.

STEP 18: Cause the scrapping and finishing tool assembly rotatable frame second gear 428 of the scrapping and finishing tool assembly 66 to rotate, by virtue of its rotative engagement with the scrapping and finishing tool assembly rotatable frame first gear 426 of the scrapping and finishing tool assembly 66.

STEP 19: Cause the scrapping and finishing tool assembly rotatable frame second gear eccentric 430 of the scrapping and finishing tool assembly 66 to rotate, by virtue of it being fixedly attached to the scrapping and finishing tool assembly rotatable frame second gear 428 of the scrapping and finishing tool assembly 66.

STEP 20: Cause the scrapping and finishing tool assembly reciprocating rod 432 of the scrapping and finishing tool assembly 66 to reciprocate in the scrapping and finishing tool assembly plate space 348 in the scrapping and finishing tool assembly 66, by virtue of it being pivotally mounted at one end to the scrapping and finishing tool assembly rotatable frame second gear eccentric 430 of the scrapping and finishing tool assembly 66.

STEP 21: Cause the scrapping and finishing tool assembly reciprocating flat arm 434 of the scrapping and finishing tool assembly 66 to reciprocate in the scrapping and finishing tool assembly plate space 348 in the scrapping and finishing tool assembly 66, by virtue of it being pivotally attached to another end of the scrapping and finishing tool assembly reciprocating rod 432 of the scrapping and finishing tool assembly 66.

STEP 22: Cause the scrapping and finishing tool assembly tab 458 of the scrapping and finishing tool assembly 66 to reciprocate in the scrapping and finishing tool assembly plate space 348 in the scrapping and finishing tool assembly 66, by virtue it being pivotally attached to the scrapping and finishing tool assembly reciprocating flat arm 434 of the scrapping and finishing tool assembly 66.

STEP 23: Cause the scrapping and finishing tool assembly cylindrically-shaped collar 450 of the scrapping and finishing tool assembly 66 to reciprocate in the scrapping and finishing tool assembly housing centrally-disposed and cylindrically-shaped longitudinal throughbore 336 in the scrapping and finishing tool assembly rectangular-parallelepiped-shaped housing 322 of the scrapping and finishing tool assembly 66, by virtue of it being attached to the scrapping and finishing tool assembly tab 458 of the scrapping and finishing tool assembly 66.

STEP 24: Cause the scrapping and finishing tool assembly engagement assembly rotatable and cylindrically-shaped clutch part 476 of the scrapping and finishing tool assembly engagement assembly 462 of the scrapping and finishing tool assembly 66 to rotate, via the reciprocating movement of the scrapping and finishing tool assembly cylindrically-shaped collar 450 of the scrapping and finishing tool assembly 66, by virtue of the scrapping and finishing tool assembly resistance assembly plunger 444 of the scrapping and finishing tool assembly resistance assembly 442 of the scrapping and finishing tool assembly 66 being biased, by the scrapping and finishing tool assembly resistance assembly spring 446 of the scrapping and finishing tool assembly resistance assembly 442 of the scrapping and finishing tool assembly 66, against the scrapping and finishing tool assembly engagement assembly rotatable and cylindrically-shaped clutch part 450 of the scrapping and finishing tool assembly engagement assembly 462 of the scrapping and finishing tool assembly 66 and thereby preventing the scrapping and finishing tool assembly engagement assembly rotatable and cylindrically-shaped clutch part 476 of the scrapping and finishing tool assembly engagement assembly 462 of the scrapping and finishing tool assembly 66 from reciprocating with the scrapping and finishing tool assembly cylindrically-shaped collar 450 of the scrapping and finishing tool assembly 66 as the scrapping and finishing tool assembly collar cylindrically-shaped inner surface ratchet surface 454 on the scrapping and finishing tool assembly collar cylindrically-shaped inner surface 452 of the scrapping and finishing tool assembly cylindrically-shaped collar 450 of the scrapping and finishing tool assembly 66 reciprocates.

STEP 25: Cause the scrapping and finishing tool assembly engagement assembly fixed and cylindrically-shaped clutch part 470 of the scrapping and finishing tool assembly engagement assembly 462 of the scrapping and finishing tool assembly 66 to rotate, by virtue of its engagement with the scrapping and finishing tool assembly engagement assembly rotatable and cylindrically-shaped clutch part 476 of the scrapping and finishing tool assembly engagement assembly 462 of the scrapping and finishing tool assembly 66.

STEP 26: Cause the threaded distal portion 468 of the scrapping and finishing tool assembly engagement assembly elongated, slender, and cylindrically-shaped shaft 464 of the scrapping and finishing tool assembly engagement assembly 462 of the scrapping and finishing tool assembly 66 to rotate, by virtue of it being fixedly attached to the scrapping and finishing tool assembly engagement assembly fixed and cylindrically-shaped clutch part 470 of the scrapping and finishing tool assembly engagement assembly 462 of the scrapping and finishing tool assembly 66.

STEP 27: Cause the scrapping and finishing tool assembly plate collar 364 of the scrapping and finishing tool assembly rectangular-shaped and T-shape in profile plate 358 of the scrapping and finishing tool assembly 66 to thread along the threaded distal portion 463 of the scrapping and finishing tool assembly engagement assembly elongated, slender, and cylindrically-shaped shaft 464 of the scrapping and finishing tool assembly engagement assembly 462 of the scrapping and finishing tool assembly 66, by virtue of it threadably receiving the threaded distal portion 468 of the scrapping and finishing tool assembly engagement assembly elongated, slender, and cylindrically-shaped shaft 464 of the scrapping and finishing tool assembly engagement assembly 462 of the scrapping and finishing tool assembly 66, and slide longitudinally in the scrapping and finishing tool assembly housing narrow and rectangular-parallelepiped-shaped recess 342 in the scrapping and finishing tool assembly rectangular-parallelepiped-shaped housing 322 of the scrapping and finishing tool assembly 66, by virtue of it being longitudinally slidably mounted in the scrapping and finishing tool assembly housing narrow and rectangular-parallelepiped-shaped recess 342 of the scrapping and finishing tool assembly rectangular-parallelepiped-shaped housing 322 of the scrapping and finishing tool assembly 66.

STEP 28: Cause the scrapping and finishing tool assembly rectangular-shaped and T-shape in profile plate 358 of the scrapping and finishing tool assembly 66 to slide longitudinally in the scrapping and finishing tool assembly housing wide and rectangular-parallelepiped-shaped recess 338 in the scrapping and finishing tool assembly rectangular-parallelepiped-shaped housing 322 of the scrapping and finishing tool assembly 66, by virtue of it being fixedly attached to the scrapping and finishing tool assembly plate collar 364 of the scrapping and finishing tool assembly rectangular-shaped and T-shape in profile plate 358 of the scrapping and finishing tool assembly 66 and being longitudinally slidable in the scrapping and finishing tool assembly housing wide and rectangular-parallelepiped-shaped recess 338 in the scrapping and finishing tool assembly rectangular-parallelepiped-shaped housing 322 of the scrapping and finishing tool assembly 66.

STEP 29: Cause the scrapping and finishing tool assembly scrapping and finishing tool bit assembly 370 of the scrapping and finishing tool assembly 66 to slide longitudinally in the scrapping and finishing tool assembly housing wide and rectangular-parallelepiped-shaped recess 338 in the scrapping and finishing tool assembly rectangular-parallelepiped-shaped housing 322 of the scrapping and finishing tool assembly 66, by virtue of it being secured to the scrapping and finishing tool assembly rectangular-shaped and T-shape in profile plate 358 of the scrapping and finishing tool assembly 66.

STEP 30: Cause the scrapping and finishing tool assembly scrapping and finishing tool bit assembly guide roller 416 of the scrapping and finishing tool assembly scrapping and finishing tool bit assembly 370 of the scrapping and finishing tool assembly 66 to move longitudinally and roll along the longitudinal outer surface of the pipe 12, by virtue of it being rotatably mounted in the scrapping and finishing tool assembly scrapping and finishing tool bit assembly tool bit head 402 of the scrapping and finishing tool assembly scrapping and finishing tool bit assembly 370 of the scrapping and finishing tool assembly 66.

STEP 31: Cause the scrapping and finishing tool assembly scrapping and finishing tool bit assembly generally square-shaped scrapping and finishing tool bit 420 of the scrapping and finishing tool assembly scrapping and finishing tool bit assembly 370 of the scrapping and finishing tool assembly 66 to move longitudinally and rotate and scrap and finish the longitudinal outer surface of the pipe 12, by virtue of it being rotatably mounted in the scrapping and finishing tool assembly scrapping and finishing tool bit assembly tool bit head 402 of the scrapping and finishing tool assembly scrapping and finishing tool bit assembly 370 of the scrapping and finishing tool assembly 66, until the scrapping and finishing tool assembly scrapping and finishing tool bit assembly generally rectangular-parallelepiped-shaped body 372 of the scrapping and finishing tool assembly scrapping and finishing tool bit assembly 370 of the scrapping and finishing tool assembly 66 contacts the scrapping and finishing tool assembly release assembly cylindrically-shaped rod 438 of the scrapping and finishing tool assembly release assembly 436 of the scrapping and finishing tool assembly 66.

STEP 32: Cause the scrapping and finishing tool assembly release assembly cylindrically-shaped rod 438 of the scrapping and finishing tool assembly release assembly 436 of the scrapping and finishing tool assembly 66 to move longitudinally in the scrapping and finishing tool assembly housing elongated, slender, and cylindrically-shaped guide bore 344 in the scrapping and finishing tool assembly rectangular-parallelepiped-shaped housing 322 of the scrapping and finishing tool assembly 66 and to move longitudinally in the scrapping and finishing tool assembly plate corner longitudinal throughbore 356 in the scrapping and finishing tool assembly rectangular-shaped plate 346 of the scrapping and finishing tool assembly 66, and extend past the scrapping and finishing tool assembly rectangular-shaped plate 346 of the scrapping and finishing tool assembly 66, against the biasing of the scrapping and finishing tool assembly release assembly spring 440 of the scrapping and finishing tool assembly release assembly 436 of the scrapping and finishing tool assembly 66

STEP 33: Cause the scrapping and finishing tool assembly release assembly spring 440 of the scrapping and finishing tool assembly release assembly 436 of the scrapping and finishing tool assembly 66 to compress.

STEP 34: Cause the scrapping and finishing tool assembly release assembly cylindrically-shaped rod 438 of the scrapping and finishing tool assembly release assembly 436 of the scrapping and finishing tool assembly 66 to obstruct the scrapping and finishing tool assembly engagement assembly flat and elongated arm 434 of the scrapping and finishing tool assembly engagement assembly 462 of the scrapping and finishing tool assembly 66, and stop its rotation.

STEP 35: Cause the scrapping and finishing tool assembly engagement assembly disk distal surface cammed part flats 518 of the scrapping and finishing tool assembly engagement assembly disk distal surface cammed part 416 of the scrapping and finishing tool assembly engagement assembly disk distal surface 504 of the scrapping and finishing tool assembly engagement assembly flat and circular-shaped disk 502 of the scrapping and finishing tool assembly engagement assembly 462 of the scrapping and finishing tool assembly 66 to ride along the scrapping and finishing tool assembly engagement assembly rotatable cam part cammed proximal end flats 490 of the scrapping and finishing tool assembly engagement assembly rotatable cam part cammed proximal end 488 of the scrapping and finishing tool assembly engagement assembly rotatable and cylindrically-shaped cam part 484 of the scrapping and finishing tool assembly engagement assembly 462 of the scrapping and finishing tool assembly 66.

STEP 36: Cause the scrapping and finishing tool assembly engagement assembly disk distal surface cammed part 516 of the scrapping and finishing tool assembly engagement assembly flat and circular-shaped disk 502 of the scrapping and finishing tool assembly engagement assembly 462 of the scrapping and finishing tool assembly 66 to engage the scrapping and finishing tool assembly engagement assembly rotatable cam part cammed proximal end 488 of the scrapping and finishing tool assembly engagement assembly rotatable and cylindrically-shaped cam part 484 of the scrapping and finishing tool assembly engagement assembly 462 of the scrapping and finishing tool assembly 66.

STEP 37: Cause the scrapping and finishing tool assembly engagement assembly arm second pin 500 of the scrapping and finishing tool assembly engagement assembly flat and elongated arm 494 of the scrapping and finishing tool assembly engagement assembly 462 of the scrapping and finishing tool assembly 66 to enter the scrapping and finishing tool assembly engagement assembly disk arcuate-shaped throughslot 520 in the scrapping and finishing tool assembly engagement assembly flat and circular-shaped disk 502 of the scrapping and finishing tool assembly engagement assembly 462 of the scrapping and finishing tool assembly 66.

STEP 38: Cause the scrapping and finishing tool assembly engagement assembly second spring 492 of the scrapping and finishing tool assembly engagement assembly 462 of the scrapping and finishing tool assembly 66 to expand.

STEP 39: Cause the scrapping and finishing tool assembly engagement assembly first spring 482 of the scrapping and finishing tool assembly engagement assembly 462 of the scrapping and finishing tool assembly 66 to expand.

STEP 40: Cause the scrapping and finishing tool assembly engagement assembly rotatable clutch part serrated distal end 478 of the scrapping and finishing tool assembly engagement assembly rotatable and cylindrically-shaped clutch part 476 of the scrapping and finishing tool assembly engagement assembly 462 of the scrapping and finishing tool assembly 66 to disengage from the scrapping and finishing tool assembly engagement assembly fixed clutch part serrated proximal end 474 of the scrapping and finishing tool assembly engagement assembly fixed and cylindrically-shaped clutch part 470 of the scrapping and finishing tool assembly engagement assembly 462 of the scrapping and finishing tool assembly 66, by virtue of the scrapping and finishing tool assembly engagement assembly first spring 482 of the scrapping and finishing tool assembly engagement assembly 462 of the scrapping and finishing tool assembly 66 expanding, so that the scrapping and finishing tool assembly 66 is disengaged and the pipe 12 is scrapped and finished.

It will be understood that each of the elements described above, or two or more together, may also find a useful application in other types of constructions differing from the types described above.

While the invention has been illustrated and described as embodied in a portable pipe machining tool, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A portable pipe machining tool that selectively simultaneously cuts a pipe and scrapes and finishes a longitudinal outer surface of the pipe that has a pair of ends so as to facilitate bonding of the pipe wherein said portable pipe machining tool is supported only by the pipe it is machining and access to the pair of ends of the pipe is not required, said portable pipe machining tool comprising:

a) a fixed cylindrically-shaped frame fixedly attachable to a portion of the pipe and having a circular-shaped and open distal end with a circumferentially-disposed track disposed circumferentially therearound, a first semi-cylindrically-shaped portion, and a second semi-cylindrically-shaped portion being pivotally mounted to said first semi-cylindrically-shaped portion of said fixed cylindrically-shaped frame; said circumferentially-disposed track in said circular-shaped and open distal end of said fixed cylindrically-shaped frame having gear teeth disposed circumferentially therearound and extending longitudinally therein;

b) fixed frame pivoting means for pivotally mounting said second semi-cylindrically-shaped of said fixed cylindrically-shaped frame to said first semi-cylindrically-shaped portion of said fixed cylindrically-shaped frame and allowing said fixed cylindrically-shaped frame to have an open position where said fixed cylindrically-shaped frame is placable around the pipe without having to have an end of the pipe accessible and a closed portion where said fixed cylindrically-shaped frame is fixedly abutted against, and supported only by, the pipe;

c) fixed frame securing means for selectively maintaining said fixed cylindrically-shaped frame in said closed position;

d) a rotatable cylindrically-shaped frame rotatably attachable to an adjacent portion of the pipe and rotatably connected to said fixed cylindrically-shaped frame and having a first semi-cylindrically-shaped portion, a second semi-cylindrically-shaped portion being pivotally mounted to said first semi-cylindrically-shaped portion of said rotatable cylindrically-shaped frame, and a circular-shaped and open proximal end with a collar disposed circumferentially therearound and extending longitudinally outwardly therefrom;

e) a ring gear disposed circumferentially around, and extending coaxially and longitudinally from, said collar on said circular-shaped and open proximal end of said rotatable cylindrically-shaped frame;

f) a track disposed circumferentially around, and extending coaxially and longitudinally from, said ring gear and having at least a portion thereof rotatably engaging said circumferentially-disposed track in said circular-shaped and open distal end of said fixed cylindrically-shaped frame so as to allow said rotatable cylindrically-shaped frame to rotate relative to said fixed cylindrically-shaped frame;

g) rotatable frame pivoting means for pivotally mounting said second semi-cylindrically-shaped portion of said rotatable cylindrically-shaped frame to said first semi-cylindrically-shaped portion of said rotatable cylindrically-shaped frame and allowing said rotatable cylindrically-shaped frame to have an open position where said rotatable cylindrically-shaped frame is placable around the adjacent portion of the pipe without having to have an end of the pipe accessible and a closed portion where said rotatable cylindrically-shaped frame is rotatably abutted against, and supported only by, the adjacent portion of the pipe;

h) rotatable frame securing means for selectively maintaining said rotatable cylindrically-shaped frame in said closed position;

i) a parting tool assembly extending radially along said first semi-cylindrically-shaped portion of said rotatable cylindrically-shaped frame and being selectively engagable and disengagable, and when engaged having a portion thereof moving radially inwardly through said first semi-cylindrically-shaped portion of said rotatable cylindrically-shaped frame and progressively cutting into the adjacent portion of the pipe as said rotatable cylindrically-shaped frame rotates relative to said fixed cylindrically-shaped frame until the pipe has been cut; and j) a scrapping and finishing tool assembly extending radially along said second semi-cylindrically-shaped portion of said rotatable cylindrically-shaped frame, diametrically opposing said parting tool assembly, and being selectively engagable and disengagable, and when engaged having a portion thereof moving longitudinally through said second semi-cylindrically-shaped portion of said rotatable cylindrically-shaped frame and longitudinally along the longitudinal outer surface of the adjacent portion of the pipe and scraping and finishing the longitudinal outer surface of the adjacent portion of the pipe as said rotatable cylindrically-shaped frame rotates relative to said fixed cylindrically-shaped frame so as to facilitate the bonding of the pipe, and being selectively simultaneously operable with said parting tool assembly if so desired, so as to cut, scrape, and finish the adjacent portion of the pipe simultaneously as said rotatable cylindrically-shaped frame rotates relative to said fixed cylindrically-shaped frame.

2. The tool as defined in claim 1, wherein said second semi-cylindrically-shaped portion of said fixed cylindrically-shaped frame is pivotally mounted, at a pivot longitudinal face of said second semi-cylindrically-shaped portion of said fixed cylindrically-shaped frame, to a pivot longitudinal face of said first semi-cylindrically-shaped portion of said fixed cylindrically-shaped frame.

3. The tool as defined in claim 2, wherein said fixed frame securing means is disposed at an opposing securing longitudinal face of said first semi-cylindrically-shaped portion of said fixed cylindrically-shaped frame, which is diametrically opposite to said pivot longitudinal face of said first semi-cylindrically-shaped portion of said fixed cylindrically-shaped frame, and at an opposing securing longitudinal face of said second semi-cylindrically-shaped portion of said fixed cylindrically-shaped frame, which is diametrically opposite to said pivot longitudinal face of said second semi-cylindrically-shaped portion of said fixed cylindrically-shaped frame.

4. The tool as defined in claim 1, wherein said second semi-cylindrically-shaped portion of said rotatable cylindrically-shaped frame is pivotally mounted, at a pivot longitudinal face of said second semi-cylindrically-shaped portion of said rotatable cylindrically-shaped frame, to a pivot longitudinal face of said first semi-cylindrically-shaped portion of said rotatable cylindrically-shaped frame.

5. The tool as defined in claim 4, wherein said rotatable frame securing means is disposed at an opposing securing longitudinal face of said first semi-cylindrically-shaped portion of said rotatable cylindrically-shaped frame, which is diametrically opposite to said pivot longitudinal face of said first semi-cylindrically-shaped portion of said rotatable cylindrically-shaped frame, and at an opposing securing longitudinal face of said second semi-cylindrically-shaped portion of said rotatable cylindrically-shaped frame, which is diametrically opposite to said pivot longitudinal face of said second semi-cylindrically-shaped portion of said rotatable cylindrically-shaped frame.

6. The tool as defined in claim 1, wherein said fixed cylindrically-shaped frame further has a substantially semi-cylindrically-shaped power housing portion that extends radially from the circular-shaped and open distal end of the fixed cylindrically-shaped frame, on the first semi-cylindrically-shaped portion of the fixed cylindrically-shaped frame, and terminates in a cylindrically-shaped aperture that extends longitudinally therein.

7. The tool as defined in claim 6; further comprising a cylindrically-shaped motor being one of hydraulic and air and having a slender motor shaft extending coaxially therefrom and terminating with a motor driver gear; said cylindrically-shaped motor being longitudinally disposed and replaceably attached to said substantially semi-cylindrically-shaped power housing portion, with said motor driver gear on said slender motor shaft of said cylindrically-shaped motor being replaceably positioned in said cylindrically-shaped aperture in said substantially semi-cylindrically-shaped power housing portion on said circular-shaped and open distal end of said fixed cylindrically-shaped frame and rotatably engaging said ring gear.

8. The tool as defined in claim 1, wherein said track disposed circumferentially around, and extending longitudinally from, said ring gear is a substantially I-shape in profile track and said circumferentially-disposed track in said fixed cylindrically-shaped frame is a substantially "+" shape in profile track.

9. The tool as defined in claim 1, wherein said first semi-cylindrically-shaped portion of said rotatable cylindrically-shaped frame has an inner surface with a pair of longitudinally-oriented roller bearings rotatably mounted therein that straddle said portion of said parting tool assembly so as to facilitate rotation of said rotatable cylindrically-shaped frame on the adjacent portion of the pipe.

10. The tool as defined in claim 1, wherein said second semi-cylindrically-shaped portion of said rotatable cylindrically-shaped frame has an inner surface with a pair of longitudinally-oriented roller bearings rotatably mounted therein that straddle said portion of said scrapping and finishing tool assembly so as to facilitate rotation of said rotatable cylindrically-shaped frame on the adjacent portion of the pipe.

11. The tool as defined in claim 1, wherein said first semi-cylindrically-shaped portion of said fixed cylindrically-shaped frame has an inner surface with a semi-circular-shaped band of alternating trapezoidal-shaped hills and valleys disposed circumferentially therealong, in proximity to said circular-shaped and open distal end of said fixed cylindrically-shaped frame, and which extends to a circular-shaped and open proximal end of said fixed cylindrically-shaped frame, and eliminates damage to the pipe when said fixed cylindrically-shaped frame is fixedly abutted against the pipe.

12. The tool as defined in claim 1, wherein said second semi-cylindrically-shaped portion of said fixed cylindrically-shaped frame has an inner surface with a semi-circular-shaped band of alternating trapezoidal-shaped hills and valleys disposed circumferentially therealong, in proximity tô said circular-shaped and open distal end of said fixed cylindrically-shaped frame, and which extends to a circular-shaped and open proximal end of said fixed cylindrically-shaped frame, and eliminates damage to the pipe when said fixed cylindrically-shaped frame is fixedly abutted against the pipe.

13. The tool as defined in claim 2, wherein said fixed frame pivoting means includes a pair of parallel, and slightly spaced-apart, and longitudinally disposed tabs that extend radially outwardly from said first semi-cylindrically-shaped portion of said fixed cylindrically-shaped frame, substantially flush with said pivot longitudinal face of said first semi-cylindrically-shaped portion of said fixed cylindrically-shaped frame, and in proximity to said circular-shaped and open distal end of said fixed cylindrically-shaped frame.

14. The tool as defined in claim 13, wherein each tab of said pair of parallel, and slightly spaced-apart, and longitudinally disposed tabs of said fixed frame pivoting means has a longitudinally aligned throughbore that extends longitudinally therethrough.

15. The tool as defined in claim 14, wherein said fixed frame pivoting means further includes a tab that extends substantially radially outwardly from said second semi-cylindrically-shaped portion of said fixed cylindrically-shaped frame, substantially flush with, and extending circumferentially past, said pivot longitudinal face of said second semi-cylindrically-shaped portion of said fixed cylindrically-shaped frame, and in proximity to said circular-shaped and open distal end of said fixed cylindrically-shaped frame.

16. The tool as defined in claim 15, wherein said tab of said fixed frame pivoting means has a longitudinally-oriented throughbore that extends longitudinally therethrough.

17. The tool as defined in claim 16, wherein said pair of parallel, and slightly spaced-apart, and longitudinally disposed tabs of said fixed frame pivoting means replaceably receive therebetween said tab of said fixed frame pivoting means, and is replaceably maintained therebetween by a pivot pin of said fixed frame pivoting means that passes frictionally and replaceably through said longitudinally aligned throughbore in each tab of said pair of parallel, and slightly spaced-apart, and longitudinally disposed tabs of said fixed frame pivoting means and frictionally and replaceably through said longitudinally-oriented throughbore in said tab of said fixed frame pivoting means.

18. The tool as defined in claim 4, wherein rotatable frame pivoting means includes a pair of parallel, and spaced-apart, and longitudinally disposed tabs that extend radially outwardly from said first semi-cylindrically-shaped portion of said rotatable cylindrically-shaped frame, substantially flush with said pivot longitudinal face of said first semi-cylindrically-shaped portion of said rotatable cylindrically-shaped frame.

19. The tool as defined in claim 18, wherein one tab of said pair of parallel, and spaced-apart, and longitudinally disposed tabs of said rotatable frame pivoting means on said first semi-cylindrically-shaped portion of said rotatable cylindrically-shaped frame is disposed in proximity to said circular-shaped and open proximal end of said rotatable cylindrically-shaped frame and another tab of said pair of parallel, and spaced-apart, and longitudinally disposed tabs of said rotatable frame pivoting means on said first semi-cylindrically-shaped portion of said rotatable cylindrically-shaped frame is disposed in proximity to a circular-shaped and open distal end of said rotatable cylindrically-shaped frame.

20. The tool as defined in claim 16, wherein each tab of said pair of parallel, and slightly spaced-apart, and longitudinally disposed tabs of said rotatable frame pivoting means on said first semi-cylindrically-shaped portion of said rotatable cylindrically-shaped frame has a longitudinally aligned throughbore that extends longitudinally therethrough.

21. The tool as defined in claim 20, wherein said rotatable frame pivoting means further includes a pair of parallel, and slightly spaced-apart, and longitudinally disposed tabs that extend substantially radially outwardly from said second semi-cylindrically-shaped portion of said rotatable cylindrically-shaped frame, substantially flush with, and extending circumferentially past, said pivot longitudinal face of said second semi-cylindrically-shaped portion of said rotatable cylindrically-shaped frame.

22. The tool as defined in claim 21, wherein one tab of said pair of parallel, and spaced-apart, and longitudinally disposed tabs of said rotatable frame pivoting means on said second semi-cylindrically-shaped portion of said rotatable cylindrically-shaped frame is disposed in proximity to said circular-shaped and open proximal end of said rotatable cylindrically-shaped frame and another tab of said pair of parallel, and spaced-apart, and longitudinally disposed tabs of said rotatable frame pivoting means on said second semi-cylindrically-shaped portion of said rotatable cylindrically-shaped frame is disposed in proximity to said circular-shaped and open distal end of said rotatable cylindrically-shaped frame.

23. The tool as defined in claim 22, wherein each tab of said pair of parallel, and spaced-apart, and longitudinally disposed tabs of said rotatable frame pivoting means on the second semi-cylindrically-shaped portion of said rotatable cylindrically-shaped frame has a longitudinally aligned throughbore that extends longitudinally therethrough.

24. The tool as defined in claim 23, wherein said pair of parallel, and slightly spaced-apart, and longitudinally disposed tabs of said rotatable frame pivoting means on said first semi-cylindrically-shaped portion of said rotatable cylindrically-shaped frame replaceably receive therebetween said pair of parallel, and spaced-apart, and longitudinally disposed tabs of said rotatable frame pivoting means on said second semi-cylindrically-shaped portion of said rotatable cylindrically-shaped frame, with each tab of said pair of parallel, and spaced-apart, and longitudinally disposed tabs of said rotatable frame pivoting means on said second semi-cylindrically-shaped portion of said rotatable cylindrically-shaped frame abutting against a respective tab of said pair of parallel, and slightly spaced-apart, and longitudinally disposed tabs of said rotatable frame pivoting means on said first semi-cylindrically-shaped portion of said rotatable cylindrically-shaped frame, and are replaceably maintained therebetween by a pivot pin that passes frictionally and replaceably through said longitudinally aligned throughbore in each tab of said pair of parallel, and slightly spaced-apart, and longitudinally disposed tabs of said rotatable frame pivoting means on said first semi-cylindrically-shaped portion of said rotatable cylindrically-shaped frame and frictionally and replaceably through said longitudinally aligned throughbore in each tab of said pair of parallel, and spaced-apart, and longitudinally disposed tabs of said rotatable frame pivoting means on said second semi-cylindrically-shaped portion of said rotatable cylindrically-shaped frame.

25. The tool as defined in claim 3, wherein said fixed frame securing means includes a substantially trapezoidal-shaped catch part that is integrally formed with said first semi-cylindrically-shaped portion of said fixed cylindrically-shaped frame, in proximity to said opposing securing longitudinal face of said first semi-cylindrically-shaped portion of said fixed cylindrically-shaped frame.

26. The tool as defined in claim 25, wherein said fixed frame securing means further includes a latch part that is pivotally mounted to said second semi-cylindrically-shaped portion of said fixed cylindrically-shaped frame, in proximity to said opposing securing longitudinal face of said second semi-cylindrically-shaped portion of said fixed cylindrically-shaped frame, and selectively and replaceably engages said substantially trapezoidal-shaped catch part of said fixed frame securing means.

27. The tool as defined in claim 5, wherein said rotatable frame securing means includes a substantially trapezoidal-shaped catch part that is integrally formed with said first semi-cylindrically-shaped portion of said rotatable cylindrically-shaped frame, in proximity to said opposing securing longitudinal face of said first semi-cylindrically-shaped portion of said rotatable cylindrically-shaped frame.

28. The tool as defined in claim 27, wherein said rotatable frame securing means further includes a latch part that is pivotally mounted to said second semi-cylindrically-shaped portion of said rotatable cylindrically-shaped frame, in proximity to said opposing securing longitudinal face of said second semi-cylindrically-shaped portion of said rotatable cylindrically-shaped frame, and selectively and replaceably engages said substantially trapezoidal-shaped catch part of said rotatable frame securing means.

29. The tool as defined in claim 26, wherein said latch part of said fixed frame securing means has a first square-shaped pivot link that is pivotally mounted to said second semi-cylindrically-shaped portion of said fixed cylindrically-shaped frame, by a first pivot pin that passes through a longitudinal throughbore in a substantially trapezoidal-shaped block that is integrally formed with said second semi-cylindrically-shaped portion of said fixed cylindrically-shaped frame, in proximity to said opposing securing longitudinal face of said second semi-cylindrically-shaped portion of said fixed cylindrically-shaped frame; said first square-shaped pivot link of said latch part of said fixed frame securing means securely and replaceably engages said substantially trapezoidal-shaped catch part of said fixed frame securing means when said fixed cylindrically-shaped frame is in said closed position so as to maintain said fixed cylindrically-shaped frame in said closed position.

30. The tool as defined in claim 29, wherein said latch part of said fixed frame securing means further has a second rectangular-shaped handle pivot link that is pivotally mounted, by a second pivot pin, to said first square-shaped pivot link of said latch part of said fixed frame securing means, and assists in selective engagement, when pushed down, and selective disengagement, when pulled up, of said first square-shaped pivot link of said latch part of said fixed frame securing means relative to said substantially trapezoidal-shaped catch part of said fixed frame securing means.

31. The tool as defined in claim 2, wherein said latch part of said rotatable frame securing means has a first square-shaped pivot link that is pivotally mounted, by a first pivot pin that passes through a longitudinal throughbore in a substantially trapezoidal-shaped block that is integrally formed with said second semi-cylindrically-shaped portion of said rotatable cylindrically-shaped frame, in proximity to said opposing securing longitudinal face of said second semi-cylindrically-shaped portion of said rotatable cylindrically-shaped frame; said first square-shaped pivot link of said latch part of said rotatable frame securing means securely and replaceably engages said substantially trapezoidal-shaped catch part of said rotatable frame securing means when said rotatable cylindrically-shaped frame is in said closed position so as to maintain said rotatable cylindrically-shaped frame in said closed position.

32. The tool as defined in claim 31, wherein said latch part of said rotatable frame securing means further has a second rectangular-shaped handle pivot link that is pivotally mounted, by a second pivot pin, to said first square-shaped pivot link of said latch part of said rotatable frame securing means, and assists in selective engagement, when pushed down, and selective disengagement, when pulled up, of said first square-shaped pivot link of said latch part of said rotatable frame securing means relative to said substantially trapezoidal-shaped catch part of said rotatable frame securing means.

33. The tool as defined in claim 1, wherein said parting tool assembly includes a recLangular-parallelepiped-shaped housing that extends radially outwardly from said first semi-cylindrically-shaped portion of said rotatable cylindrically-shaped frame.

34. The tool as defined in claim 33, wherein said rectangular-parallelepiped-shaped housing of said parting tool assembly has an innermost face disposed on said first semi-cylindrically-shaped portion of said rotatable cylindrically-shaped frame, and an outermost face that is spaced from, and parallel to, said innermost face of said rectangular-parallelepiped-shaped housing of said parting tool assembly.

35. The tool as defined in claim 34, wherein said rectangular-parallelepiped-shaped housing of said parting tool assembly further has a forwardmost face, and a rearwardmost face chat is spaced from, and parallel to, said forwardmost face of said rectangular-parallelepiped-shaped housing of said parting tool assembly.

36. The tool as defined in claim 35, wherein said rectangular-parallelepiped-shaped housing of said parting tool assembly further has an upper face, and a lower face that is spaced from, and parallel to, said upper face of said rectangular-parallelepiped-shaped housing of said parting tool assembly.

37. The tool as defined in claim 36, wherein said rectangular-parallelepiped-shaped housing of said parting tool assembly further has a centrally-disposed and cylindrically-shaped longitudinal throughbore that extends longitudinal therethrough, from and opening into, said upper face of said rectangular-parallelepiped-shaped housing of said parting tool assembly, to and opening into, said lower face of said rectangular-parallelepiped-shaped housing of said parting tool assembly.

38. The tool as defined in claim 37, wherein said rectangular-parallelepiped-shaped housing of said parting tool assembly further has a cubic-shaped internal chamber that opens into said centrally-disposed and cylindrically-shaped longitudinal throughbore in said rectangular-parallelepiped-shaped housing of said parting tool assembly, said lower face of said rectangular-parallelepiped-shaped housing of said parting tool assembly, and said upper face of said rectangular-parallelepiped-shaped housing of said parting tool assembly.

39. The tool as defined in claim 38, wherein said rectangular-parallelepiped-shaped housing of said parting tool assembly further has an elongated, slender, and cylindrically-shaped guide bore that extends from, and opening into both, said cubic-shaped internal chamber in said rectangular-parallelepiped-shaped housing of said parting tool assembly and said rearwardmost face of said rectangular-parallelepiped-shaped housing of said parting tool assembly, and is parallel to said innermost face of said rectangular-parallelepiped-shaped housing of said parting tool assembly.

40. The tool as defined in claim 39, wherein said rectangular-parallelepiped-shaped housing of said parting tool assembly further has a longitudinal throughbore that extends longitudinal therethrough, from and opening into, said upper face of said rectangular-parallelepiped-shaped housing of said parting tool assembly, to and opening into, said lower face of said rectangular-parallelepiped-shaped housing of said parting tool assembly.

41. The tool as defined in claim 40, wherein said upper Lace of said rectangular-parallelepiped-shaped housing of said parting tool assembly has a pair of threaded bores that extend longitudinally therein, and are disposed between said centrally-disposed and cylindrically-shaped longitudinal throughbore in said rectangular-parallelepiped-shaped housing of said parting tool assembly and said outermost face of said rectangular-parallelepiped-shaped housing of said parting tool assembly.

42. The tool as defined in claim 41, wherein said rectangular-parallelepiped-shaped housing of said parting tool assembly further has a rectangular-shaped upper cover that is replaceably secured to said lower face of said rectangular-parallelepiped-shaped housing of said parting tool assembly, by screws.

43. The tool as defined in claim 42, wherein said rectangular-shaped upper cover of said rectangular-parallelepiped-shaped housing of said parting tool assembly has a centrally-disposed throughbore that extends longitudinally therethrough, and is smaller than, and coaxial and communicates with, said centrally-disposed and cylindrically-shaped longitudinal throughbore in said rectangular-parallelepiped-shaped housing of said parting tool assembly.

44. The tool as defined in claim 43, wherein said rectangular-shaped upper cover of said rectangular-parallelepiped-shaped housing of said parting tool assembly further has a throughbore that extends longitudinally therethrough, and is coaxial and communicates with said longitudinal throughbore in said rectangular-parallelepiped-shaped housing of said parting tool assembly.

45. The parting tool as defined in claim 44, wherein said parting tool assembly further includes a rectangular-shaped and T-shape in profile intermediate plate that is fixedly attached to said upper face of said rectangular-parallelepiped-shaped housing of said parting tool assembly, by screws that pass through throughbores in said rectangular-shaped and T-shape in profile intermediate plate of said parting tool assembly and threadably engage said threaded bores in said upper face of said rectangular-parallelepiped-shaped housing of said parting tool assembly.

46. The tool as defined in claim 45, wherein said rectangular-shaped and T-shape in profile intermediate plate of said parting tool assembly further has an upper face with a figure 8-shaped recess therein with a major circle portion and a minor circle portion.

47. The tool as defined in claim 46, wherein said rectangular-shaped and T-shape in profile intermediate plate of said parting tool assembly further has a throughbore that passes centrally through said major circle portion of said figure 8-shaped recess in said upper face of said rectangular-shaped and T-shape in profile intermediate plate of said parting tool assembly.

48. The tool as defined in claim 47, wherein said rectangular-shaped and T-shape in profile intermediate plate of said parting tool assembly further has a throughbore that is smaller than, and passes centrally through said minor circle portion of said face figure 8-shaped recess in said upper face of said rectangular-shaped and T-shape in profile intermediate plate of said parting tool assembly, and is smaller than, and coaxial with, said centrally-disposed and cylindrically-shaped longitudinal throughbore in said rectangular-parallelepiped-shaped housing of said parting tool assembly.

49. The tool as defined in claim 48, wherein said rectangular-shaped and T-shape in profile intermediate plate of said parting tool assembly further has a T-shaped outermost face with a threaded throughbore that extends into, and communicates with, said throughbore in said minor circle portion of said figure 8-shaped recess in said upper face of said rectangular-shaped and T-shape in profile intermediate plate of said parting tool assembly.

50. The tool as defined in claim 49, wherein said parting tool assembly further includes a large gear that is fixedly attached to a gear shaft that passes rotatably in said throughbore in said major circle portion of said figure 8-shaped recess in said upper face of said rectangular-shaped and T-shape in profile intermediate plate of said parting tool assembly, and with said large gear of said parting tool assembly resting flush in said major circle portion of said figure 8-shaped recess in said upper face of said rectangular-shaped and T-shape in profile intermediate plate of said parting tool assembly.

51. The tool as defined in claim 50, wherein said parting tool assembly further includes a small gear that is fixedly attached to said gear shaft of said parting tool assembly and is coaxial with, is forward of, and is smaller than, said large gear of said parting tool assembly, and extends past said upper face of said rectangular-shaped and T-shape in profile intermediate plate of said parting tool assembly.

52. The tool as defined in claim 51, wherein said parting tool assembly further includes a generally trapezoidal-shaped upper cover that has a T-shaped track that extends radially thereacross and radially slidingly engages said rectangular-shaped and T-shape in profile intermediate plate of said parting tool assembly.

53. The tool as defined in claim 52, wherein said trapezoidal-shaped upper cover of said parting tool assembly further has an inner surface with a pair of throughbores and an elongated and slender stop recess that is disposed in proximity to, and tapers towards, an outermost face of said generally trapezoidal-shaped upper cover of said parting tool assembly.

54. The tool as defined in claim 53, wherein said parting tool assembly further includes a rack gear that has pins that extend perpendicularly forwardly therefrom and which are fixedly received in said pair of throughbores in said inner surface of said trapezoidal-shaped upper cover of said parting tool assembly, with said small gear of said parting tool assembly rotatably engaging said rack gear of said parting tool assembly.

55. The tool as defined in claim 54, wherein said parting tool assembly further includes a parting tool bit that is fixedly attached by screws and nuts to, for movement with, said generally trapezoidal-shaped upper cover of said parting tool assembly, and extends radially inwardly from an innermost face of said generally trapezoidal-shaped upper cover, and is a part of said portion of said parting tool assembly that moves radially inwardly through said first semi-cylindrically-shaped portion of said rotatable cylindrically-shaped frame and progressively cuts into the adjacent portion of the pipe as said rotatable cylindrically-shaped frame rotates relative to said fixed cylindrically-shaped frame.

56. The tool as defined in claim 55, wherein said parting tool assembly further includes a first gear that is rotatably mounted to said first semi-cylindrically-shaped portion of said rotatable cylindrically-shaped frame, inward of said ring gear of said circular-shaped and open proximal end of said rotatable cylindrically-shaped frame, and rotatably engaging said gear teeth in said circumferentially-disposed track in said circular-shaped and open distal end of said fixed cylindrically-shaped frame.

57. The tool as defined in claim 56, wherein said parting tool assembly further includes a second gear that is rotatably mounted in said first semi-cylindrically-shaped portion of said rotatable cylindrically-shaped frame, forward of, and rotatably engaging, said first gear of said parting tool assembly.

58. The tool as defined in claim 57, wherein said parting tool assembly further includes an eccentric that is disposed on, outward of, and for rotation with, said second gear of said parting tool assembly.

59. The tool as defined in claim 58, wherein said second gear of said parting tool assembly and said eccentric of said parting tool assembly are accessible via a threaded cap that threadably engages said first semi-cylindrically-shaped portion of said rotatable cylindrically-shaped frame.

60. The tool as defined in claim 59, wherein said parting tool assembly further includes a reciprocating rod that is pivotally mounted at one end to said eccentric of said parting tool assembly, and extends movably through said elongated, slender, and cylindrically-shaped guide bore in said rectangular-parallelepiped-shaped housing of said parting tool assembly, and into said cubic-shaped internal chamber in said rectangular-parallelepiped-shaped housing of said parting tool assembly.

61. The tool as defined in claim 60, wherein said parting tool assembly further includes a reciprocating block that is pivotally attached to another end of said reciprocating rod of said parting tool assembly for reciprocation therewith, and is movably disposed in said cubic-shaped internal chamber in said rectangular-parallelepiped-shaped housing of said parting tool assembly, and has a pin that extends radially towards said centrally-disposed and cylindrically-shaped longitudinal throughbore in said rectangular-parallelepiped-shaped housing of said parting tool assembly.

62. The tool as defined in claim 61, wherein said parting tool assembly further includes a cylindrically-shaped release assembly that has a narrow portion that passes movably through said longitudinal throughbore in said rectangular-parallelepiped-shaped housing of said parting tool assembly and movably through said throughbore in said rectangular-shaped upper cover of said rectangular-parallelepiped-shaped housing of said parting tool assembly.

63. The tool as defined in claim 62, wherein said cylindrically-shaped release assembly of said parting tool assembly further has a wide portion that extends coaxially upwardly from said narrow portion of said cylindrically-shaped release assembly of said parting tool assembly, and is biased in said elongated and slender stop recess in said generally trapezoidal-shaped upper cover of said parting tool assembly, by a spring.

64. The tool as defined in claim 63, wherein said parting tool assembly further has a resistance assembly that has a plunger that passes movably into said threaded throughbore in said T-shaped outermost face of said rectangular-shaped and T-shape in profile intermediate plate of said parting tool assembly.

65. The tool as defined in claim 64, wherein said resistance assembly of said parting tool assembly further has a spring that biases said plunger of said resistance assembly of said parting tool assembly inwardly in said throughbore in said T-shaped outermost face of said rectangular-shaped and T-shape in profile intermediate plate of said parting tool assembly.

66. The tool as defined in claim 65, wherein said resistance assembly of said parting tool assembly further has a set screw that threadably engages said threaded throughbore in said T-shaped outermost face of said rectangular-shaped and T-shape in profile intermediate plate of said parting tool assembly and regulates amount of biasing of said spring of said resistance assembly of said parting tool assembly.

67. The tool as defined in claim 66, wherein said parting tool assembly further includes a cylindrically-shaped collar that is disposed coaxially in, for reciprocating movement in, said centrally-disposed and cylindrically-shaped longitudinal throughbore in said rectangular-parallelepiped-shaped housing of said parting tool assembly.

68. The tool as defined in claim 67, wherein said cylindrically-shaped collar of said parting tool assembly has a cylindrically-shaped inner surface with a ratchet surface disposed therearound.

69. The tool as defined in claim 68, wherein said cylindrically-shaped collar of said parting tool assembly further has a cylindrically-shaped outer surface with a radially-oriented and threaded bore that extends radially therein.

70. The tool as defined in claim 69, wherein said parting tool assembly further has a threaded yoke that threadably engages, and extends outwardly from, said radially-oriented and threaded bore in said cylindrically-shaped outer surface of said cylindrically-shaped collar of said parting tool assembly, and is pivotally mounted to said pin on said reciprocating block of said parting tool assembly, by a pivot pin.

71. The tool as defined in claim 70, wherein said parting tool assembly further includes an engagement assembly that passes through said cylindrically-shaped collar of said parting tool assembly, and selectively engages and disengages the parting tool assembly.

72. The tool as defined in claim 71, wherein said engagement assembly of said parting tool assembly includes an elongated, slender, and cylindrically-shaped shaft that has a proximal end and a distal end.

73. The tool as defined in claim 72, wherein said engagement assembly of said parting tool assembly further includes a gear that is fixedly and coaxially attached to, for rotation with, said distal end of said elongated, slender, and cylindrically-shaped shaft of said engagement assembly of said parting tool assembly, passes through said throughbore in said minor circle portion of said face figure 8-shaped recess in said upper face of said rectangular-shaped and T-shape in profile intermediate plate of said parting tool assembly, sits flush in said minor circle portion of said face figure 8-shaped recess in said upper face of said rectangular-shaped and T-shape in profile intermediate plate of said parting tool assembly, and rotatably engages said large gear of said parting tool assembly.

74. The tool as defined in claim 73, wherein said engagement assembly of said parting tool assembly further includes a fixed and cylindrically-shaped clutch part that has a flat distal end and a serrated proximal end, and is fixedly and coaxially attached to, for rotation with, said elongated, slender, and cylindrically-shaped shaft of said engagement assembly of said parting tool assembly, with said flat distal end of said fixed and cylindrically-shaped clutch part of said engagement assembly of said parting tool assembly abutting against said gear of said engagement assembly of said parting tool assembly.

75. The tool as defined in claim 74, wherein said engagement assembly of said parting tool assembly further includes a rotatable and cylindrically-shaped clutch part that contacts said ratchet surface on said cylindrically-shaped inner surface of said cylindrically-shaped collar of said parting tool assembly, and rotates via said reciprocating movement of said cylindrically-shaped collar of said parting tool assembly, by virtue of said plunger of said resistance assembly of said parting tool assembly being biased, by said spring of said resistance assembly of said parting tool assembly, against said rotatable and cylindrically-shaped clutch part of said engagement assembly of said parting tool assembly and thereby preventing said rotatable and cylindrically-shaped clutch part of said engagement assembly of said parting tool assembly from rotating back and reciprocating with said cylindrically-shaped collar of said parting tool assembly as said ratchet surface on said cylindrically-shaped inner surface of said cylindrically-shaped collar of said parting tool assembly reciprocates.

76. The tool as defined in claim 75, wherein said rotatable and cylindrically-shaped clutch part of said engagement assembly of said parting tool assembly is rotatably and coaxially attached to, for rotation with when said parting tool assembly is engaged, said elongated, slender, and cylindrically-shaped shaft of said engagement assembly of said parting tool assembly; said rotatable and cylindrically-shaped clutch part of said engagement assembly of said parting tool assembly has a serrated distal end and a flat proximal end; said serrated distal end of said rotatable and cylindrically-shaped clutch part of said engagement assembly of said parting tool assembly is in selective engagement with, and disengagement from, said serrated proximal end of said fixed and cylindrically-shaped clutch part of said engagement assembly of said parting tool assembly.

77. The tool as defined in claim 76, wherein said engagement assembly of said parting tool assembly further includes a first spring that is coaxially disposed on said elongated, slender, and cylindrically-shaped shaft of said engagement assembly of said parting tool assembly, between said fixed and cylindrically-shaped clutch part of said engagement assembly of said parting tool assembly and said rotatable and cylindrically-shaped clutch part of said engagement assembly of said parting tool assembly, and biases said rotatable and cylindrically-shaped clutch part of said engagement assembly of said parting tool assembly away from said fixed and cylindrically-shaped clutch part of said engagement assembly of said parting tool assembly.

78. The tool as defined in claim 77, wherein said engagement assembly of said parting tool assembly further includes a rotatable and cylindrically-shaped cam part that is rotatably and coaxially attached to, for rotation with when said parting tool assembly is engaged, said elongated, slender, and cylindrically-shaped shaft of said engagement assembly of said parting tool assembly; said rotatable and cylindrically-shaped cam part of said engagement assembly of said parting tool assembly has a flat distal end and a cammed proximal end with flats thereon; said flat distal end of said rotatable and cylindrically-shaped cam part of said engagement assembly of said parting tool assembly is abuttable against, for rotation with when said parting tool assembly is engaged, said flat proximal end of said rotatable and cylindrically-shaped clutch part of said engagement assembly of said parting tool assembly.

79. The tool as defined in claim 78, wherein said engagement assembly of said parting tool assembly further includes a second spring that is coaxially disposed on said elongated, slender, and cylindrically-shaped shaft of said engagement assembly of said parting tool assembly, between, and biases apart, said rotatable and cylindrically-shaped clutch part of said engagement assembly of said parting tool assembly and said rotatable and cylindrically-shaped cam part of said engagement assembly of said parting tool assembly.

80. The tool as defined in claim 79, wherein said engagement assembly of said parting tool assembly further includes a flat and elongated arm that extends fixedly outwardly from, for rotation with, said rotatable and cylindrically-shaped cam part of said engagement assembly of said parting tool assembly, and has a free end.

81. The tool as defined in claim 80, wherein said flat and elongated arm of said engagement assembly of said parting tool assembly further has a first pin that extends fixedly and perpendicularly from said free end of said flat and elongated arm of said engagement assembly of said parting tool assembly, towards said proximal end of said elongated, slender, and cylindrically-shaped shaft of said engagement assembly of said parting tool assembly.

82. The tool as defined in claim 81, wherein said flat and elongated arm of said engagement assembly of said parting tool assembly further has a second pin that extends fixedly and perpendicularly from said flat and elongated arm of said engagement assembly of said parting tool assembly, towards said proximal end of said elongated, slender, and cylindrically-shaped shaft of said engagement assembly of said parting tool assembly, inboard of, parallel to, and shorter than, said first pin of said flat and elongated arm of said engagement assembly of said parting tool assembly.

83. The tool as defined in claim 82, wherein said engagement assembly of said parting tool assembly further includes a flat and circular-shaped disk that has a distal surface, a proximal surface, and a circular-shaped periphery, and is replaceably attached to said proximal end of said elongated, slender, and cylindrically-shaped shaft of said engagement assembly of said parting tool assembly.

84. The tool as defined in claim 83, wherein said flat and circular-shaped disk of said engagement assembly of said parting tool assembly further has a collar that is fixedly and coaxially attached to, for rotation with, said proximal surface of said flat and circular-shaped disk of said engagement assembly of said parting tool assembly, and which receives said proximal end of said elongated, slender, and cylindrically-shaped shaft of said engagement assembly of said parting tool assembly.

85. The tool as defined in claim 84, wherein said collar of said flat and circular-shaped disk of said engagement assembly of said parting tool assembly has a radially-oriented and threaded throughbore that extends radially therethrough and receives a set screw-for maintaining said flat and circular-shaped disk of said engagement assembly of said parting tool assembly on said proximal end of said elongated, slender, and cylindrically-shaped shaft of said engagement assembly of said parting tool assembly.

86. The tool as defined in claim 85, wherein said flat and circular-shaped disk of said engagement assembly of said parting tool assembly further has a cammed part that is fixedly and coaxially attached to said distal surface of said flat and circular-shaped disk of said engagement assembly of said parting tool assembly, and has flats thereon.

87. The tool as defined in claim 86, wherein said cammed part of said distal surface of said flat and circular-shaped disk of said engagement assembly of said parting tool assembly is complementary to said cammed proximal end of said rotatable and cylindrically-shaped cam part of said engagement assembly of said parting tool assembly, with said flats of said cammed part of said distal surface of said flat and circular-shaped disk of said engagement assembly of said parting tool assembly being abuttable against, for rotation with when said parting tool assembly is engaged, said flats of said cammed proximal end of said rotatable and cylindrically-shaped cam part of said engagement assembly of said parting tool assembly.

88. The tool as defined in claim 87, wherein said flat and circular-shaped disk of said engagement assembly of said parting tool assembly further has an arcuate-shaped through-slot that extends circumferentially therethrough, in proximity and parallel to said circular-shaped periphery of said flat and circular-shaped disk of said engagement assembly of said parting tool assembly, and selectively receives said second pin of said flat and elongated arm of said engagement assembly of said parting tool assembly when said parting tool assembly is disengaged.

89. The tool as defined in claim 1, wherein said scrapping and finishing tool assembly includes a rectangular-parallelepiped-shaped housing that extends radially outwardly from said second semi-cylindrically-shaped portion of said rotatable cylindrically-shaped frame.

90. The tool as defined in claim 89, wherein said rectangular-parallelepiped-shaped housing of said scrapping and finishing tool assembly has an innermost face disposed on said second semi-cylindrically-shaped portion of said rotatable cylindrically-shaped frame, and an outermost face that is spaced from, and parallel to, said innermost face of said rectangular-parallelepiped-shaped housing of said scrapping and finishing tool assembly.

91. The tool as defined in claim 90, wherein said rectangular-parallelepiped-shaped housing of said scrapping and finishing tool assembly further has a rearwardmost face with a pair of threaded bores disposed at opposing corners thereof, and a forwardmost face that is spaced from, and parallel to, said rearwardmost face of said rectangular-parallelepiped-shaped housing of said scrapping and finishing tool assembly.

92. The tool as defined in claim 91, wherein said rectangular-parallelepiped-shaped housing of said scrapping and finishing tool assembly further has an upper face, and a lower face that is spaced from, and parallel to, said upper face of said rectangular-parallelepiped-shaped housing of said scrapping and finishing tool assembly.

93. The tool as defined in claim 92, wherein said rectangular-parallelepiped-shaped housing of said scrapping and finishing tool assembly further has a centrally-disposed and cylindrically-shaped longitudinal throughbore that extends longitudinally therethrough, from and opening into, said rearwardmost face of said rectangular-parallelepiped-shaped housing of said scrapping and finishing tool assembly, to and opening into, said forwardmost face of said rectangular-parallelepiped-shaped housing of said scrapping and finishing tool assembly.

94. The tool as defined in claim 93, wherein said rectangular-parallelepiped-shaped housing of said scrapping and finishing tool assembly further has a wide and rectangular-parallelepiped-shaped recess that opens into both said outermost face of said rectangular-parallelepiped-shaped housing of said scrapping and finishing tool assembly and said innermost face of said rectangular-parallelepiped-shaped housing of said scrapping and finishing tool assembly, and opens into, and extends longitudinally rearwardly from, said forwardmost face of said rectangular-parallelepiped-shaped housing of said scrapping and finishing tool assembly to an intermediate face of said rectangular-parallelepiped-shaped housing of said scrapping and finishing tool assembly.

95. The tool as defined in claim 94, wherein said rectangular-parallelepiped-shaped housing of said scrapping and finishing tool assembly further has a narrow and rectangular-parallelepiped-shaped recess that opens into, and extends upwardly from said wide and rectangular-parallelepiped-shaped recess in said rectangular-parallelepiped-shaped housing of said scrapping and finishing tool assembly towards said upper face of said rectangular-parallelepiped-shaped housing of said scrapping and finishing tool assembly, and longitudinally from said forwardmost face of said rectangular-parallelepiped-shaped housing of said scrapping and finishing tool assembly to said intermediate face of said rectangular-parallelepiped-shaped housing of said scrapping and finishing tool assembly, where it communicates with said centrally-disposed and cylindrically-shaped longitudinal throughbore in said rectangular-parallelepiped-shaped housing of said scrapping and finishing tool assembly.

96. The tool as defined in claim 95, wherein said rectangular-parallelepiped-shaped housing of said scrapping and finishing tool assembly further has an elongated, slender, and cylindrically-shaped guide bore that extends longitudinally from, and opens into, said rearwardmost face of said rectangular-parallelepiped-shaped housing of said scrapping and finishing tool assembly to, and opens into, said intermediate face of said rectangular-parallelepiped-shaped housing of said scrapping and finishing tool assembly, and is parallel to said centrally-disposed and cylindrically-shaped longitudinal throughbore in said rectangular-parallelepiped-shaped housing of said scrapping and finishing tool assembly.

97. The tool as defined in claim 96, wherein said rectangular-parallelepiped-shaped housing of said scrapping and finishing tool assembly further has a threaded bore that extends from, and opening into, said outermost face of said rectangular-parallelepiped-shaped housing of said scrapping and finishing tool assembly to, and communicates with, said centrally-disposed and cylindrically-shaped longitudinal throughbore in said rectangular-parallelepiped-shaped housing of said scrapping and finishing tool assembly.

98. The tool as defined in claim 97, wherein said scrapping and finishing tool assembly further includes a rectangular-shaped plate that is parallel to, and spaced rearwardly from, said rearwardmost face of said rectangular-parallelepiped-shaped housing of said scrapping and finishing tool assembly, and forms therebetween a space in the said scrapping and finishing tool assembly.

99. The tool as defined in claim 98, wherein said rectangular-shaped plate of said scrapping and finishing tool assembly is attached to said rearwardmost face of said rectangular-parallelepiped-shaped housing of said scrapping and finishing tool assembly, by a pair of screws that pass through a pair of throughbores in a pair of opposing corners of said rectangular-shaped plate of said scrapping and finishing tool assembly, and threadably engage said pair of threaded bores in said rearwardmost face of said rectangular-parallelepiped-shaped housing of said scrapping and finishing tool assembly.

100. The tool as defined in claim 99, wherein said rectangular-shaped plate of said scrapping and finishing tool assembly further has a centrally disposed longitudinal throughbore that extends longitudinally therethrough, and is in longitudinal alignment with said centrally-disposed and cylindrically-shaped longitudinal throughbore in said rectangular-parallelepiped-shaped housing of said scrapping and finishing tool assembly.

101. The tool as defined in claim 100, wherein said rectangular-shaped plate of said scrapping and finishing tool assembly further has a corner longitudinal throughbore that extends longitudinally therethrough in a corner thereof, and is in longitudinal alignment with said elongated, slender, and cylindrically-shaped guide bore in said rectangular-parallelepiped-shaped housing of said scrapping and finishing tool assembly.

102. The tool as defined in claim 101, wherein said scrapping and finishing tool assembly further includes a rectangular-shaped and T-shape in profile plate that is longitudinally slidably mounted, in said wide and rectangular-parallelepiped-shaped recess in said rectangular-parallelepiped-shaped housing of said scrapping and finishing tool assembly and has an upper face and a lower face.

103. The tool as defined in claim 102, wherein said rectangular-shaped and T-shape in profile plate of said scrapping and finishing tool assembly further has a collar that is integrally formed on said upper face of said rectangular-shaped and T-shape in profile plate of said scrapping and finishing tool assembly.

104. The tool as defined in claim 103, wherein said collar of said rectangular-shaped and T-shape in profile plate of said scrapping and finishing tool assembly is longitudinally slidably mounted in said narrow and rectangular-parallelepiped-shaped recess in said rectangular-parallelepiped-shaped housing of said scrapping and finishing tool assembly, and has a threaded throughbore that passes longitudinally therethrough.

105. The tool as defined in claim 104, wherein said rectangular-shaped and T-shape in profile plate of said scrapping and finishing tool assembly further has a pair of threaded rods that are fixedly attached to, and extend perpendicularly outwardly from, said lower face of said rectangular-shaped and T-shape in profile plate of said scrapping and finishing tool assembly.

106. The tool as defined in claim 105, wherein said scrapping and finishing tool assembly further includes a scrapping and finishing tool bit assembly that is radially slidably mounted to said rectangular-shaped and T-shape in profile plate of said scrapping and finishing tool assembly.

107. The tool as defined in claim 106, wherein said scrapping and finishing tool bit assembly of said scrapping and finishing tool assembly includes a generally rectangular-parallelepiped-shaped body.

108. The tool as defined in claim 107, wherein said generally rectangular-parallelepiped-shaped body of said scrapping and finishing tool bit assembly of said scrapping and finishing tool assembly has an upper face with a recess that radially slidably receives said lower face of said rectangular-shaped and T-shape in profile plate of said scrapping and finishing tool assembly.

109. The tool as defined in claim 108, wherein said generally rectangular-parallelepiped-shaped body of said scrapping and finishing tool bit assembly of said scrapping and finishing tool assembly further has a pair of elongated and radially-aligned throughbores that extend therethrough, from and opening into, said recess in said upper face of said generally rectangular-parallelepiped-shaped body of said scrapping and finishing tool bit assembly of said scrapping and finishing tool assembly to, and opening into, a lower face of said generally rectangular-parallelepiped-shaped body of said scrapping and finishing tool bit assembly of said scrapping and finishing tool assembly, and radially movably receive said pair of threaded rods of said rectangular-shaped and T-shape in profile plate of said scrapping and finishing tool assembly.

110. The tool as defined in claim 109, wherein said scrapping and finishing tool bit assembly of said scrapping and finishing tool assembly further includes a rack gear that is fixedly attached in, for movement with, an outermost throughbore of said pair of elongated and radially-aligned throughbores in said generally rectangular-parallelepiped-shaped body of said scrapping and finishing tool bit assembly of said scrapping and finishing tool assembly.

111. The tool as defined in claim 110, wherein said scrapping and finishing tool bit assembly of said scrapping and finishing tool assembly further includes a crank that has a throughbore that freely receives an outermost rod of said pair of threaded rods of said rectangular-shaped and T-shape in profile plate of said scrapping and finishing tool assembly for rotation relative thereto, and a gear that is fixedly attached thereto, for rotation therewith, and which passes through said outermost throughbore of said pair of elongated and radially-aligned throughbores in said generally rectangular-parallelepiped-shaped body of said scrapping and finishing tool bit assembly of said scrapping and finishing tool assembly and engages said rack gear of said scrapping and finishing tool bit assembly of said scrapping and finishing tool assembly.

112. The tool as defined in claim 111, wherein said scrapping and finishing tool bit assembly of said scrapping and finishing tool assembly further includes a pair of wing nuts that threadably engage said pair of threaded rods of said rectangular-shaped and T-shape in profile plate of said scrapping and finishing tool assembly.

113. The tool as defined in claim 112, wherein said scrapping and finishing tool bit assembly of said scrapping and finishing tool assembly further includes a tool bit head block that is fixedly attached to, extends inwardly and rearwardly from, and is coplanar with, said generally rectangular-parallelepiped-shaped body of said scrapping and finishing tool bit assembly of said scrapping and finishing tool assembly.

114. The tool as defined in claim 113, wherein said tool bit head block of said scrapping and finishing tool bit assembly of said scrapping and finishing tool assembly has an innermost face with a rectangular-parallelepiped-shaped recess.

115. The tool as defined in claim 114, wherein said tool bit head block of said scrapping and finishing tool bit assembly of said scrapping and finishing tool assembly further has a clearance throughbore that extends from, and opens into, said rectangular-parallelepiped-shaped recess in said innermost face of said tool bit head block of said scrapping and finishing tool bit assembly of said scrapping and finishing tool assembly to, and opens into, an outermost face of said tool bit head block of said scrapping and finishing tool bit assembly of said scrapping and finishing tool assembly.

116. The tool as defined in claim 115, wherein said scrapping and finishing tool bit assembly of said scrapping and finishing tool assembly further includes a tool bit head that is movably mounted to said tool bit head block of said scrapping and finishing tool bit assembly of said scrapping and finishing tool assembly, and has an outermost face.

117. The tool as defined in claim 116, wherein said tool bit head of said scrapping and finishing tool bit assembly of said scrapping and finishing tool assembly further has a rectangular-parallelepiped-shaped slide block that extends perpendicularly from said outermost face of said tool bit head of said scrapping and finishing tool bit assembly of said scrapping and finishing tool assembly, and is radially movably received in said rectangular-parallelepiped-shaped recess in said innermost face of said tool bit head block of said scrapping and finishing tool bit assembly of said scrapping and finishing tool assembly.

118. The tool as defined in claim 117, wherein said tool bit head of said scrapping and finishing tool bit assembly of said scrapping and finishing tool assembly further has an allen bolt that passes freely through said clearance throughbore in said tool bit head block of said scrapping and finishing tool bit assembly of said scrapping and finishing tool assembly, from said outermost face of said tool bit head block of said scrapping and finishing tool bit assembly of said scrapping and finishing tool assembly, and threadably engages said rectangular-parallelepiped-shaped slide block of said tool bit head of said scrapping and finishing tool bit assembly of said scrapping and finishing tool assembly.

119. The tool as defined in claim 118, wherein said scrapping and finishing tool bit assembly of said scrapping and finishing tool assembly further includes a spring that is coaxially disposed on said alien bolt of said tool bit head of said scrapping and finishing tool bit assembly of said scrapping and finishing tool assembly, rests in said rectangular-parallelepiped-shaped recess in said innermost face of said tool bit head block of said scrapping and finishing tool bit assembly of said scrapping and finishing tool assembly, and biases said tool bit head of said scrapping and finishing tool bit assembly of said scrapping and finishing tool assembly away from said tool bit head block of said scrapping and finishing tool bit assembly of said scrapping and finishing tool assembly.

120. The tool as defined in claim 119, wherein said tool bit head of said scrapping and finishing tool bit assembly of said scrapping and finishing tool assembly further has an innermost face with a slot that extends therealong.

121. The tool as defined in claim 120, wherein said scrapping and finishing tool bit assembly of said scrapping and finishing tool assembly further includes a guide roller that is rotatably mounted in said slot in said innermost face of said tool bit head of said scrapping and finishing tool bit assembly of said scrapping and finishing tool assembly, by a pivot pin that extends longitudinally therethrough.

122. The tool as defined in claim 121, wherein said scrapping and finishing tool bit assembly of said scrapping and finishing tool assembly further includes a generally square-shaped scrapping and finishing tool bit that is rotatably mounted in a recess in said tool bit head of said scrapping and finishing tool bit assembly of said scrapping and finishing tool assembly, by a pivot pin.

123. The tool as defined in claim 122, wherein said generally square-shaped scrapping and finishing tool bit of said scrapping and finishing tool bit assembly of said scrapping and finishing tool assembly is forward of, and extends slightly past, said guide roller of said scrapping and finishing tool bit assembly of said scrapping and finishing tool assembly.

124. The tool as defined in claim 123, wherein said scrapping and finishing tool assembly further includes a first gear that is rotatably mounted to said second semi-cylindrically-shaped portion of said rotatable cylindrically-shaped frame, behind said ring gear of said circular-shaped and open proximal end of said rotatable cylindrically-shaped frame, and rotatably engaging said gear teeth in said circumferentially-disposed track in said circular-shaped and open distal end of said fixed cylindrically-shaped frame.

125. The tool as defined in claim 124, wherein said scrapping and finishing tool assembly further includes a second gear that is rotatably mounted in said second semi-cylindrically-shaped portion of said rotatable cylindrically-shaped frame, forward of, and rotatably engaging, said first gear of said scrapping and finishing tool assembly.

126. The tool as defined in claim 125, wherein said scrapping and finishing tool assembly further includes an eccentric that is fixedly disposed on, outward of, and for rotation with, said second gear.

127. The tool as defined in claim 126, wherein said second gear of said scrapping and finishing tool assembly and said eccentric of said scrapping and finishing tool assembly are accessible via a threaded cap that threadably engages said second semi-cylindrically-shaped portion of said rotatable cylindrically-shaped frame.

128. The tool as defined in claim 127, wherein said scrapping and finishing tool assembly further includes a reciprocating rod that is pivotally mounted at one end to said eccentric of said scrapping and finishing tool assembly, and extends into said space in said scrapping and finishing tool assembly.

129. The tool as defined in claim 128, wherein said scrapping and finishing tool assembly further includes a reciprocating flat arm that is pivotally attached to another end of said reciprocating rod of said scrapping and finishing tool assembly for reciprocation therewith, and is movably disposed in said space in said scrapping and finishing tool assembly.

130. The tool as defined in claim 129, wherein said scrapping and finishing tool assembly further includes a release assembly that has a cylindrically-shaped rod that passes movably through said elongated, slender, and cylindrically-shaped guide bore in said rectangular-parallelepiped-shaped housing of said scrapping and finishing tool assembly and movably through said corner longitudinal throughbore in said rectangular-shaped plate of said scrapping and finishing tool assembly.

131. The tool as defined in claim 130, wherein said cylindrically-shaped rod of said release assembly of said scrapping and finishing tool assembly is biased from extending past said rectangular-shaped plate of said scrapping and finishing tool assembly, by a spring that is disposed coaxially around said cylindrically-shaped rod of said release assembly of said scrapping and finishing tool assembly, and is positioned in said space in said scrapping and finishing tool assembly.

132. The tool as defined in claim 131, wherein said scrapping and finishing tool assembly further includes a resistance assembly that has a plunger that passes movably into said threaded bore in said rectangular-parallelepiped-shaped housing of said scrapping and finishing tool assembly.

133. The tool as defined in claim 132, wherein said resistance assembly of said scrapping and finishing tool assembly further has a spring that biases said plunger of said resistance assembly of said scrapping and finishing tool assembly inwardly in said threaded bore in said rectangular-parallelepiped-shaped housing of said scrapping and finishing tool assembly.

134. The tool as defined in claim 133, wherein said resistance assembly of said scrapping and finishing tool assembly further has a set screw that threadably engages said threaded bore in said rectangular-parallelepiped-shaped housing of said scrapping and finishing tool assembly, and whose rotation regulates biasing of said spring of said resistance assembly of said scrapping and finishing tool assembly.

135. The tool as defined in claim 134, wherein said scrapping and finishing tool assembly further includes a cylindrically-shaped collar that is disposed coaxially in, for reciprocating movement in, said centrally-disposed and cylindrically-shaped longitudinal throughbore in said rectangular-parallelepiped-shaped housing of the scrapping and finishing tool assembly.

136. The tool as defined in claim 135, wherein said cylindrically-shaped collar of said scrapping and finishing tool assembly has a cylindrically-shaped inner surface with a ratchet surface disposed therearound.

137. The tool as defined in claim 136, wherein said cylindrically-shaped collar of said scrapping and finishing tool assembly further has a proximal end.

138. The tool as defined in claim 137, wherein said scrapping and finishing tool assembly further includes a tab that extends outwardly from said proximal end of said cylindrically-shaped collar of said scrapping and finishing tool assembly, is disposed in said space in said scrapping and finishing tool assembly, and is pivotally mounted to said reciprocating flat arm of said scrapping and finishing tool assembly, by a pivot pin.

139. The tool as defined in claim 138, wherein said scrapping and finishing tool assembly further includes an engagement assembly that passes coaxially through said cylindrically-shaped collar of said scrapping and finishing tool assembly, and selectively engages and disengages said scrapping and finishing tool assembly.

140. The tool as defined in claim 139, wherein said engagement assembly of said scrapping and finishing tool assembly includes an elongated, slender, and cylindrically-shaped shaft that has a proximal end and a threaded distal portion that extends longitudinally through said narrow and rectangular-parallelepiped-shaped recess in said rectangular-parallelepiped-shaped housing of said scrapping and finishing tool assembly and threadably engages said threaded throughbore in said collar of said rectangular-shaped and T-shape in profile plate of said scrapping and finishing tool assembly.

141. The tool as defined in claim 140, wherein said engagement assembly of said scrapping and finishing tool assembly further includes a fixed and cylindrically-shaped clutch part that has a flat distal end and a serrated proximal end, and is fixedly attached to, for rotation with, said threaded distal portion of said elongated, slender, and cylindrically-shaped shaft of said engagement assembly of said scrapping and finishing tool assembly, with said flat distal end of said fixed and cylindrically-shaped clutch part of said engagement assembly of said scrapping and finishing tool assembly abutting against said intermediate face in said rectangular-parallelepiped-shaped housing of said scrapping and finishing tool assembly.

142. The tool as defined in claim 141, wherein said engagement assembly of said scrapping and finishing tool assembly further includes a rotatable and cylindrically-shaped clutch part that contacts said ratchet surface on said cylindrically-shaped inner surface of said cylindrically-shaped collar of said scrapping and finishing tool assembly, and rotates via reciprocating movement of said cylindrically-shaped collar of said scrapping and finishing tool assembly, by virtue of said plunger of said resistance assembly of said scrapping and finishing tool assembly being biased, by said spring of said resistance assembly of said scrapping and finishing tool assembly, against said rotatable and cylindrically-shaped clutch part of said engagement assembly of said scrapping and finishing tool assembly and thereby preventing said rotatable and cylindrically-shaped clutch part of said engagement assembly of said scrapping and finishing tool assembly from rotating back and reciprocating with said cylindrically-shaped collar OL said scrapping and finishing tool assembly as said ratchet surface on said cylindrically-shaped inner surface of said cylindrically-shaped collar of said scrapping and finishing tool assembly reciprocates.

143. The tool as defined in claim 142, wherein said rotatable and cylindrically-shaped clutch part of said engagement assembly of said scrapping and finishing tool assembly has a serrated distal end and a flat proximal end, and is rotatably and coaxially attached to, for rotation with when said scrapping and finishing tool assembly is engaged, said elongated, slender, and cylindrically-shaped shaft of said engagement assembly of said scrapping and finishing tool assembly, with said serrated distal end of said rotatable and cylindrically-shaped clutch part of said engagement assembly of said scrapping and finishing tool assembly being in selective engagement with, and disengagement from, said serrated proximal end of said fixed and cylindrically-shaped clutch part of said engagement assembly of said scrapping and finishing tool assembly.

144. The tool as defined in claim 143, wherein said engagement assembly of said scrapping and finishing tool assembly further includes a first spring that is coaxially disposed on said elongated, slender, and cylindrically-shaped shaft of said engagement assembly of said scrapping and finishing tool assembly, between said fixed and cylindrically-shaped clutch part of said engagement assembly of said scrapping and finishing tool assembly and said rotatable and cylindrically-shaped clutch part of said engagement assembly of said scrapping and finishing tool assembly, and biases said rotatable and cylindrically-shaped clutch part of said engagement assembly of said scrapping and finishing tool assembly away from said fixed and cylindrically-shaped clutch part of said engagement assembly of said scrapping and finishing tool assembly.

145. The tool as defined in claim 144, wherein said engagement assembly of said scrapping and finishing tool assembly further includes a rotatable and cylindrically-shaped cam part that has a flat distal end and a cammed proximal end with flats thereon, and is rotatably and coaxially attached to, for rotation with when said scrapping and finishing tool assembly is engaged, said elongated, slender, and cylindrically-shaped shaft of said engagement assembly of said scrapping and finishing tool assembly, with said flat distal end of said rotatable and cylindrically-shaped cam part of said engagement assembly of said scrapping and finishing tool assembly abuttable against, for rotation with when said scrapping and finishing tool assembly is engaged, said flat proximal end of said rotatable and cylindrically-shaped clutch part of said engagement assembly of said scrapping and finishing tool assembly.

146. The tool as defined in claim 145, wherein said engagement assembly of said scrapping and finishing tool assembly further includes a second spring that is coaxially disposed on said elongated, slender, and cylindrically-shaped shaft of said engagement assembly of said scrapping and finishing tool assembly, between, and biases apart, said rotatable and cylindrically-shaped clutch part of said engagement assembly of said scrapping and finishing tool assembly and said rotatable and cylindrically-shaped cam part of said engagement assembly of said scrapping and finishing tool assembly.

147. The tool as defined in claim 146, wherein said engagement assembly of said scrapping and finishing tool assembly further includes a flat and elongated arm that extends fixedly and outwardly from, for rotation with, said rotatable and cylindrically-shaped cam part of said engagement assembly of said scrapping and finishing tool assembly, and has a free end.

148. The tool as defined in claim 147, wherein said flat and elongated arm of said engagement assembly of said scrapping and finishing tool assembly has a first pin that extends fixedly and substantially perpendicularly from said free end of said flat and elongated arm of said engagement assembly of said scrapping and finishing tool assembly, towards said proximal end of said elongated, slender, and cylindrically-shaped shaft of said engagement assembly of said scrapping and finishing tool assembly.

149. The tool as defined in claim 148, wherein said flat and elongated arm of said engagement assembly of said scrapping and finishing tool assembly further has a second pin that extends fixedly and perpendicularly from said flat and elongated arm of said engagement assembly of said scrapping and finishing tool assembly, towards said proximal end of said elongated, slender, and cylindrically-shaped shaft of said engagement assembly of said scrapping and finishing tool assembly, and is inboard of, parallel to, and longer than, said first pin of said flat and elongated arm of said engagement assembly of said scrapping and finishing tool assembly.

150. The tool as defined in claim 149, wherein said engagement assembly of said scrapping and finishing tool assembly further includes a flat and circular-shaped disk that has a distal surface, a proximal surface, and a circular-shaped periphery, and is attached to said proximal end of said elongated, slender, and cylindrically-shaped shaft of said engagement assembly of said scrapping and finishing tool assembly.

151. The tool as defined in claim 150, wherein said flat and circular-shaped disk of said engagement assembly of said scrapping and finishing tool assembly further has a cammed part that is fixedly and coaxially attached to said distal surface of said flat and circular-shaped disk of said engagement assembly of said scrapping and finishing tool assembly, and has flats thereon.

152. The tool as defined in claim 151, wherein said cammed part of said flat and circular-shaped disk of said engagement assembly of said scrapping and finishing tool assembly is complementary to said cammed proximal end of said rotatable and cylindrically-shaped cam part of said engagement assembly of said scrapping and finishing tool assembly, with said flats of said cammed part of said distal surface of said flat and circular-shaped disk of said engagement assembly of said scrapping and finishing tool assembly being abuttable against, for rotation with when said scrapping and finishing tool assembly is engaged, said flats of said cammed proximal end of said rotatable and cylindrically-shaped cam part of said engagement assembly of said scrapping and finishing tool assembly.

153. The tool as defined in claim 152, wherein said flat and circular-shaped disk of said engagement assembly of said scrapping and finishing tool assembly further has an arcuate-shaped throughslot that extends therethrough, in proximity and parallel to, said circular-shaped periphery of said flat and circular-shaped disk of said engagement assembly of said scrapping and finishing tool assembly, and selectively receives said second pin of said flat and elongated arm of said engagement assembly of said scrapping and finishing tool assembly when said scrapping and finishing tool assembly is disengaged.

154. A method of operating a parting tool assembly of a portable pipe machining tool to progressively cut a pipe with ends without requiring access to the ends of the pipe, comprising the steps of:

a) grabbing a first pin of a flat and elongated arm of a engagement assembly of said parting tool assembly in one hand of a user;

b) grabbing a flat and circular-shaped disk of said engagement assembly in another hand of the user;

c) rotating said flat and circular-shaped disk;

d) causing a cammed part of a distal surface of said flat and circular-shaped disk to ride along a cammed proximal end of a rotatable and cylindrically-shaped cam part of said engagement assembly, until flats of said cammed part abut against, for rotation with, flats of said cammed proximal end of said cylindrically-shaped cam part;

e) causing a second pin of said flat and elongated arm to leave an arcuate-shaped throughslot in said flat and circular-shaped disk;

f) causing said rotatable and cylindrically-shaped cam part to separate from said cammed part of said flat and circular-shaped disk, against biasing of a first spring of said engagement assembly and against biasing of a second spring of said engagement assembly;

g) causing said first spring to compress;

h) causing said second spring to compress;

i) causing a serrated distal end of said rotatable and cylindrically-shaped clutch part to engage, for rotation with, a serrated proximal end of a fixed and cylindrically-shaped clutch part of said engagement assembly, so that said parting tool assembly is now engaged and ready to progressively cut the pipe;

j) rotating a rotatable cylindrically-shaped frame of said portable pipe machining tool relative to a fixed cylindrically-shaped frame of said portable pipe machining tool;

k) causing a first gear of said parting tool assembly to rotate, by virtue of its rotative engagement with gear teeth in a circumferentially-disposed track in a circular-shaped and open distal end of said fixed cylindrically-shaped frame;

l) causing a second gear of said parting tool assembly to rotate, by virtue of its rotative engagement with said first gear;

m) causing an eccentric of said parting tool assembly to rotate, by virtue of it being fixedly attached to said second gear;

n) causing a reciprocating rod of said parting tool assembly to reciprocate in an elongated, slender, and cylindrically-shaped guide bore in a rectangular-parallelepiped-shaped housing of said parting tool assembly, by virtue of it being pivotally mounted at one end to said eccentric;

o) causing a reciprocating block of said parting tool assembly to reciprocate in a cubic-shaped internal chamber in said rectangular-parallelepiped-shaped housing, by virtue of it being pivotally attached to another end of said reciprocating rod;

p) causing a pin of said reciprocating block to reciprocate in said cubic-shaped internal chamber, by virtue of it being attached to said reciprocating block;

q) causing a cylindrically-shaped collar of said parting tool assembly to reciprocate in a centrally-disposed and cylindrically-shaped longitudinal throughbore in said rectangular-parallelepiped-shaped housing of said parting tool assembly, by virtue of a threaded yoke of said parting tool assembly threadably engaging a radially-oriented and threaded bore in a cylindrically-shaped outer surface of said cylindrically-shaped collar which is pivotally mounted to said pin of said reciprocating block by a pivot pin;

r) causing said rotatable and cylindrically-shaped clutch part to rotate, via reciprocating movement of said cylindrically-shaped collar, by virtue of a plunger of a resistance assembly of said parting tool assembly being biased, by a spring of said resistance assembly, against said cylindrically-shaped clutch part and thereby preventing said rotatable and cylindrically-shaped clutch part from rotating back and reciprocating with said cylindrically-shaped collar as a ratchet surface on a cylindrically-shaped inner surface of said cylindrically-shaped collar reciprocates;

s) causing said fixed and cylindrically-shaped clutch part to rotate, by virtue of its engagement with said rotatable and cylindrically-shaped clutch part;

t) causing an elongated, slender, and cylindrically-shaped shaft of said parting tool assembly to rotate, by virtue of it being fixedly attached to said fixed and cylindrically-shaped clutch part;

u) causing an end gear on a distal end of said elongated, slender, and cylindrically-shaped shaft to rotate, by virtue of it being fixedly attached to said elongated, slender, and cylindrically-shaped shaft;

v) causing a large gear of said parting tool assembly to rotate, by virtue of its rotatable engagement with said gear on said distal end of said elongated, slender, and cylindrically-shaped shaft;

w) causing a gear shaft of said parting tool assembly to rotate, by virtue of it being fixedly attached to said large gear;

x) causing a small gear of said parting tool assembly to rotate, by virtue of it being fixedly attached to said gear shaft;

y) causing a rack gear of said parting tool assembly to traverse radially inwardly, by virtue of its engagement with said small gear;

z) causing a generally trapezoidal-shaped upper cover of said parting tool assembly to slide radially along a rectangular-shaped and T-shape in profile intermediate plate of said parting tool assembly, by virtue of it being fixedly attached to said rack gear and having a T-shaped track thereacross that slidingly engages said rectangular-shaped and T-shape in profile intermediate plate;

aa) causing a parting tool bit of said parting tool assembly to move radially inwardly, by virtue of it being fixedly attached to said generally trapezoidal-shaped upper cover;

bb) causing a wide portion of a cylindrically-shaped release assembly of said parting tool assembly to move radially outwardly in an elongated and slender stop recess in said trapezoidal-shaped upper cover, against biasing of a spring of said cylindrically-shaped release assembly, until said wide portion of said cylindrically-shaped release assembly reaches a tapered portion therein;

cc) causing said wide portion of said cylindrically-shaped release assembly to move, against said biasing of said spring of said cylindrically-shaped release assembly;

dd) causing said spring of said cylindrically-shaped release assembly to compress;

ee) causing a narrow portion of said cylindrically-shaped release assembly to extend past a throughbore in a rectangular-shaped upper cover of said rectangular-parallelepiped-shaped housing;

ff) causing said narrow portion of said cylindrically-shaped release assembly to obstruct said flat and elongated arm, and stop its rotation;

gg) causing said flats of said cammed part of said distal surface of said flat and circular-shaped disk to ride along said flats of said cammed proximal end of said rotatable and cylindrically-shaped cam part;

hh) causing said cammed part of said distal surface of said flat and circular-shaped disk to engage said cammed proximal end of said rotatable and cylindrically-shaped cam part;

ii) causing said second pin of said flat and elongated arm to enter said arcuate-shaped throughslot in said flat and circular-shaped disk;

jj) causing said second spring of said parting tool assembly to expand;

kk) causing said first spring of said parting tool assembly to expand; and ll) causing said serrated distal end of said rotatable and cylindrically-shaped clutch part to disengage from said serrated proximal end of said fixed and cylindrically-shaped clutch part, by virtue of said first spring of said parting tool assembly expanding, so that said parting tool assembly is now disengaged and the pipe has been progressively cut.

155. A method of operating a scrapping and finishing tool assembly of a portable pipe machining tool to scrap and finish a longitudinal outer surface of a pipe with ends without requiring access to the ends of the pipe, comprising the steps of:

a) loosening a pair of wing nuts of a scrapping and finishing tool bit assembly of said scrapping and finishing tool assembly;

b) rotating a crank of said scrapping and finishing tool bit assembly;

c) causing a crank gear of said scrapping and finishing tool bit assembly to rotate, by virtue of it being fixedly attached to said crank;

d) causing a generally rectangular-parallelepiped-shaped body of said scrapping and finishing tool bit assembly to move radially inwardly on a rectangular-shaped and T-shape in profile plate of said scrapping and finishing tool assembly, by virtue of a rack gear of said scrapping and finishing tool bit assembly being fixedly attached to said generally rectangular-parallelepiped-shaped body which in turn engages said crank gear, until a guide roller of said scrapping and finishing tool bit assembly contacts the longitudinal outer surface of the pipe and a generally square-shaped scrapping and finishing tool bit of said scrapping and finishing tool bit assembly pierces the longitudinal outer surface of the pipe, by virtue of it extending slightly past said guide roller;

e) tightening said pair of wing nuts so as to secure said scrapping and finishing tool bit assembly to said rectangular-shaped and T-shape in profile plate;

f) grabbing a first pin of a flat and elongated arm of an engagement assembly of said scrapping and finishing tool assembly in one hand of a user;

g) grabbing a flat and circular-shaped disk of said engagement assembly in another hand of the user;

h) rotating said flat and circular-shaped disc;

i) causing a cammed part of a distal surface of said flat and circular-shaped disk to ride along a cammed proximal end of a rotatable and cylindrically-shaped cam part of said engagement assembly, until flats of said cammed part abut against, for rotation with, flats of said cammed proximal end of said rotatable and cylindrically-shaped cam part;

j) causing a second pin of said flat and elongated arm to leave an arcuate-shaped throughslot in said flat and circular-shaped disk;

k) causing said cammed proximal end of said rotatable and cylindrically-shaped cam part to separate from said cammed part of said distal surface of said flat and circular-shaped disk, against biasing of a first spring OL said engagement assembly and against biasing of a second spring of said engagement assembly;

l) causing said first spring to compress;

m) causing said second spring to compress;

n) causing a flat distal end of said rotatable and cylindrically-shaped cam part to abut against, for rotation with, a flat proximal end of a rotatable and cylindrically-shaped clutch part of said engagement assembly;

o) causing a serrated distal end of said rotatable and cylindrically-shaped clutch part to engage, for rotation with, a serrated proximal end of a fixed and cylindrically-shaped clutch part of said engagement assembly, so that the scrapping and finishing tool assembly is engaged;

p) rotating a rotatable cylindrically-shaped frame of said portable pipe machining tool relative to a fixed cylindrically-shaped frame of said portable pipe machining tool;

q) causing a first gear of said scrapping and finishing tool assembly to rotate, by virtue of its rotative engagement with gear teeth in a circumferentially-disposed track in a circular-shaped and open distal end of said fixed cylindrically-shaped frame;

r) causing a second gear of said scrapping and finishing tool assembly to rotate, by virtue of its rotative engagement with said first gear;

s) causing an eccentric of said scrapping and finishing tool assembly to rotate, by virtue of it being fixedly attached to said second gear;

t) causing a reciprocating rod of said scrapping and finishing tool assembly to reciprocate in a space in said scrapping and finishing tool assembly, by virtue of it being pivotally mounted at one end to said eccentric;

u) causing a reciprocating flat arm of said scrapping and finishing tool assembly to reciprocate in said space in said scrapping and finishing tool assembly, by virtue of it being pivotally attached to another end of said reciprocating rod;

v) causing a tab of said scrapping and finishing tool assembly to reciprocate in said space in said scrapping and finishing tool assembly, by virtue it being pivotally attached to said reciprocating flat arm;

w) causing a cylindrically-shaped collar of said scrapping and finishing tool assembly to reciprocate in a centrally-disposed and cylindrically-shaped longitudinal throughbore in a rectangular-parallelepiped-shaped housing of said scrapping and finishing tool assembly, by virtue of it being attached to said tab of said scrapping and finishing tool assembly;

x) causing said rotatable and cylindrically-shaped clutch part to rotate, via reciprocating movement of said cylindrically-shaped collar, by virtue of a plunger of a resistance assembly of said scrapping and finishing tool assembly being biased, by a spring of said resistance assembly, against said rotatable and cylindrically-shaped clutch part and thereby preventing said rotatable and cylindrically-shaped clutch part from reciprocating with said cylindrically-shaped collar as a ratchet surface on a cylindrically-shaped inner surface of said cylindrically-shaped collar reciprocates;

y) causing a fixed and cylindrically-shaped clutch part of said engagement assembly to rotate, by virtue of its engagement with said rotatable and cylindrically-shaped clutch part of said engagement assembly;

z) causing a threaded distal portion of an elongated, slender, and cylindrically-shaped shaft of said engagement assembly to rotate, by virtue of it being fixedly attached to said fixed and cylindrically-shaped clutch part;

aa) causing a collar of said rectangular-shaped and T-shape in profile plate to thread along said threaded distal portion of said elongated, slender, and cylindrically-shaped shaft, by virtue of it threadably receiving said threaded distal portion of said elongated, slender, and cylindrically-shaped shaft, and slide longitudinally in a narrow and rectangular-parallelepiped-shaped recess in said rectangular-parallelepiped-shaped housing, by virtue of it being longitudinally slidably mounted in said narrow and rectangular-parallelepiped-shaped recess in said rectangular-parallelepiped-shaped housing;

bb) causing said rectangular-shaped and T-shape in profile plate to slide longitudinally in a wide and rectangular-parallelepiped-shaped recess in said rectangular-parallelepiped-shaped housing, by virtue of it being fixedly attached to said collar of said rectangular-shaped and T-shape in profile plate and being longitudinally slidable in said wide and rectangular-parallelepiped-shaped recess in said rectangular-parallelepiped-shaped housing;

cc) causing said scrapping and finishing tool bit assembly to slide longitudinally in said wide and rectangular-parallelepiped-shaped recess in said rectangular-parallelepiped-shaped housing, by virtue of it being secured to said rectangular-shaped and T-shape in profile plate;

dd) causing a guide roller of said scrapping and finishing tool bit assembly to move longitudinally and roll along the longitudinal outer surface of the pipe, by virtue of it being rotatably mounted in a tool bit head of said scrapping and finishing tool bit assembly;

ee) causing a generally square-shaped scrapping and finishing tool bit of said scrapping and finishing tool bit assembly to move longitudinally and rotate and scrap and finish the longitudinal outer surface of the pipe, by virtue of it being rotatably mounted in said tool bit head of said tool bit assembly of said scrapping and finishing tool assembly, until said generally rectangular-parallelepiped-shaped body contacts a cylindrically-shaped rod of a release assembly;

ff) causing said cylindrically-shaped rod to move longitudinally in a elongated, slender, and cylindrically-shaped guide bore in said rectangular-parallelepiped-shaped housing and to move longitudinally in a corner longitudinal throughbore in a rectangular-shaped plate of said scrapping and finishing tool assembly, and extend past said rectangular-shaped plate, against the biasing of a spring of said release assembly;

gg) causing said spring of said release assembly to compress;

hh) causing said cylindrically-shaped rod of said release assembly to obstruct said flat and elongated arm, and stop its rotation;

ii) causing said flats of said cammed part of said distal surface of said flat and circular-shaped disk to ride along said flats of said cammed proximal end of said rotatable and cylindrically-shaped cam part;

jj) causing said cammed part of said distal surface of said flat and circular-shaped disk to engage said cammed proximal end of said rotatable and cylindrically-shaped cam part;

kk) causing said second pin of said flat and elongated arm to enter said arcuate-shaped throughslot in said flat and circular-shaped disk;

ll) causing said second spring to expand;

mm) causing said first spring to expand; and nn) causing said serrated distal end of said rotatable and cylindrically-shaped clutch part to disengage from said proximal end of said fixed and cylindrically-shaped clutch part, by virtue of the first spring expanding, so that said scrapping and finishing tool assembly is disengaged and the longitudinal outer surface of the pipe is scrapped and finished.

156. A method of selectively simultaneously cutting a pipe and scraping and finishing a longitudinal outer surface of the pipe that has a pair of ends without requiring access to the pair of ends of the pipe, comprising the step of selectively simultaneously cutting the pipe and scraping and finishing the longitudinal outer surface of the pipe with a portable pipe machining tool which comprises:

a) a fixed cylindrically-shaped frame fixedly attachable to a portion of the pipe and having a circular-shaped and open distal end with a circumferentially-disposed track disposed circumferentially therearound, a first semi-cylindrically-shaped portion, and a second semi-cylindrically-shaped portion being pivotally mounted to said first semi-cylindrically-shaped portion of said fixed cylindrically-shaped frame; said circumferentially-disposed track in said circular-shaped and open distal end of said fixed cylindrically-shaped frame having gear teeth disposed circumferentially therearound and extending longitudinally therein;

b) fixed frame pivoting means for pivotally mounting said second semi-cylindrically-shaped of said fixed cylindrically-shaped frame to said first semi-cylindrically-shaped portion of said fixed cylindrically-shaped frame and allowing said fixed cylindrically-shaped frame to have an open position where said fixed cylindrically-shaped frame is placable around the pipe without having to have an end of the pipe accessible and a closed portion where said fixed cylindrically-shaped frame is fixedly abutted against, and supported only by, the pipe;

c) fixed frame securing means for selectively maintaining said fixed cylindrically-shaped frame in said closed position;

d) a rotatable cylindrically-shaped frame rotatably attachable to an adjacent portion of the pipe and rotatably connected to said fixed cylindrically-shaped frame and having a first semi-cylindrically-shaped portion, a second semi-cylindrically-shaped portion being pivotally mounted to said first semi-cylindrically-shaped portion of said rotatable cylindrically-shaped frame, and a circular-shaped and open proximal end with a collar disposed circumferentially therearound and extending longitudinally outwardly therefrom;

e) a ring gear disposed circumferentially around, and extending coaxially and longitudinally from, said collar on said circular-shaped and open proximal end of said rotatable cylindrically-shaped frame;

f) a track disposed circumferentially around, and extending coaxially and longitudinally from, said ring gear and having at least a portion thereof rotatably engaging said circumferentially-disposed track in said circular-shaped and open distal end of said fixed cylindrically-shaped frame so as to allow said rotatable cylindrically-shaped frame to rotate relative to said fixed cylindrically-shaped frame;

g) rotatable frame pivoting means for pivotally mounting said second semi-cylindrically-shaped portion of said rotatable cylindrically-shaped frame to said first semi-cylindrically-shaped portion of said rotatable cylindrically-shaped frame and allowing said rotatable cylindrically-shaped frame to have an open position where said rotatable cylindrically-shaped frame is placable around the adjacent portion of the pipe without having to have an end of the pipe accessible and a closed portion where said rotatable cylindrically-shaped frame is rotatably abutted against, and supported only by, the adjacent portion of the pipe;

h) rotatable frame securing means for selectively maintaining said rotatable cylindrically-shaped frame in said closed position;

i) a parting tool assembly extending radially along said first semi-cylindrically-shaped portion of said rotatable cylindrically-shaped frame and being selectively engagable and disengagable, and when engaged having a portion thereof moving radially inwardly through said first semi-cylindrically-shaped portion of said rotatable cylindrically-shaped frame and progressively cutting into the adjacent portion of the pipe as said rotatable cylindrically-shaped frame rotates relative to said fixed cylindrically-shaped frame until the pipe has been cut; and j) a scrapping and finishing tool assembly extending radially along said second semi-cylindrically-shaped portion of said rotatable cylindrically-shaped frame, diametrically opposing said parting tool assembly, and being selectively engagable and disengagable, and when engaged having a portion thereof moving longitudinally through said second semi-cylindrically-shaped portion of said rotatable cylindrically-shaped frame and longitudinally along the longitudinal outer surface of the adjacent portion of the pipe and scraping and finishing the longitudinal outer surface of the adjacent portion of the pipe as said rotatable cylindrically-shaped frame rotates relative to said fixed cylindrically-shaped frame so as to facilitate the bonding of the pipe, and being selectively simultaneously operable with said parting tool assembly if so desired, so as to cut, scrape, and finish the adjacent portion of the pipe simultaneously as said rotatable cylindrically-shaped frame rotates relative to said fixed cylindrically-shaped frame.

\* \* \* \* \*